United States Patent [19]

Sharpe, Jr. et al.

[11] Patent Number: 6,094,600
[45] Date of Patent: *Jul. 25, 2000

[54] SYSTEM AND METHOD FOR MANAGING A TRANSACTION DATABASE OF RECORDS OF CHANGES TO FIELD DEVICE CONFIGURATIONS

[75] Inventors: Richard R. Sharpe, Jr., Lakeville; Craig R. Tielens, Minneapolis; Jon Westbrock, Richfield; Gene H. Olson, Minneapolis; Robert Bruck, Apple Valley, all of Minn.

[73] Assignee: Fisher-Rosemount Systems, Inc., Austin, Tex.

[*] Notice: This patent issued on a continued prosecution application filed under 37 CFR 1.53(d), and is subject to the twenty year patent term provisions of 35 U.S.C. 154(a)(2).

[21] Appl. No.: 08/599,371

[22] Filed: Feb. 6, 1996

[51] Int. Cl.[7] .................................................. G05B 11/01
[52] U.S. Cl. .............................. 700/19; 702/187; 700/83
[58] Field of Search .......................... 702/187; 711/161; 707/204; 700/11–28, 47–55, 40, 67, 75, 83–88; 345/963

[56] References Cited

U.S. PATENT DOCUMENTS

| | | | |
|---|---|---|---|
| 4,586,151 | 4/1986 | Buote | 364/513 |
| 5,282,128 | 1/1994 | Braude | 364/148 |
| 5,307,491 | 4/1994 | Feriozi et al. | 395/681 |
| 5,319,751 | 6/1994 | Garney | 395/442 |
| 5,386,360 | 1/1995 | Wilson et al. | 364/188 |
| 5,406,176 | 4/1995 | Sugden | 315/292 |
| 5,459,867 | 10/1995 | Adams et al. | 395/651 |
| 5,465,364 | 11/1995 | Lathrop et al. | 395/681 |
| 5,469,352 | 11/1995 | Yukutomo et al. | 364/192 |
| 5,586,324 | 12/1996 | Sato et al. | 395/652 |
| 5,613,123 | 3/1997 | Tsang et al. | 395/651 |

FOREIGN PATENT DOCUMENTS

| | | |
|---|---|---|
| 0 434 288 A2 | 6/1991 | European Pat. Off. . |
| 0 434 986 A2 | 7/1991 | European Pat. Off. . |
| 0 560 226 A2 | 9/1993 | European Pat. Off. . |
| 2 692 701 | 12/1993 | France . |
| 2 713 360 | 6/1995 | France . |
| 42 10 376 A1 | 10/1992 | Germany . |
| WO 95/04314 | 2/1995 | WIPO . |
| WO 95/09387 | 4/1995 | WIPO . |
| WO 95/26527 | 5/1995 | WIPO . |
| WO 96/07957 A1 | 3/1996 | WIPO . |
| WO 9607957 A1 | 3/1996 | WIPO . |

OTHER PUBLICATIONS

PCT International Search Report for PCT/US97/01480 mailed Jun. 30, 1997, 4 pgs.
PCT International Search Report for PCT/US97/01534 mailed Jun. 20, 1997, 4 pgs.

(List continued on next page.)

*Primary Examiner*—William Grant
*Assistant Examiner*—Steven R. Garland
*Attorney, Agent, or Firm*—Marshall, O'Toole, Gerstein, Murray & Borun

[57] ABSTRACT

A computer-based database management method permits management of a configuration database associated with one of a plurality of devices. Each device has a variable configuration which includes at least one adjustable parameter. The method includes the steps of selecting a particular device, selecting a particular parameter of the particular device, assigning a particular value for the particular parameter at a particular time, communicating the particular value for the particular parameter to the particular device at the particular time, creating a transaction record, and storing the transaction record in a configuration database. The transaction record includes an identifier uniquely identifying the particular device and further specifies the particular parameter of the particular device, the particular value for the particular parameter, and the particular time at which the particular value is to be applied to the particular parameter.

22 Claims, 24 Drawing Sheets

OTHER PUBLICATIONS

Arnold, et al., "Object–Oriented Design Environments in Process Control," 8131 Advance in Instrumentation and Control 44(1989), Part 3.

Fisher, "Fieldvue Instruments: Opening A Window To The Process," *Fisher Controls International, Inc.,* pp. 1–8 (1994).

Fisher, "Fieldvue Digital Valve Controller Type DVC5000 Series," *Fisher Controls International, Inc.,* Bulletin 62.1:DVC5000, pp. 1–12 (Jun. 1994).

Fisher, "Fieldvue Digital Valve Controller Type DVC5000 Series Remotely Accessible Information," *Fisher Controls International, Inc.,* Bulletin 62.1:DVC5000(S1), pp. 1–2 (Jun. 1994).

Fisher, "Fieldvue Digital Transducer DT4000 Remotely Accessible Information," *Fisher Controls International, Inc.,* Bulletin 62.1:DT4000(S1), pp. 1–2 (Jun. 1994).

Fisher, "Type VL1000 Fieldvue Valve Link," *Fisher Controls International, Inc.,* Bulletin 62.1:VL1000, pp. 1–2 (Jun. 1994).

Fisher, "Fieldvue Digital Transducer Type DT4000," *Fisher Controls International, Inc.,* Bulletin 62.1:DT4000, pp. 1–12 (Jun. 1994).

Fisher, "Type HF100 Fieldvue HART Filter Instruction Manual," *Fisher Controls International,* Form 5340, pp. 1–6 (Dec. 1993).

Fisher, "HART Communicator Manual for Fieldvue Instruments," *Fisher–Rosemount,* Form 5345, pp. 1–40 (Apr. 1995).

Fisher, "Fieldvue Digital Valve Controller Type DVC5000 Series," *Fisher–Rosemount,* Form 5335, pp. 1–38 (Jun. 1995).

Fisher, "Fieldvue Digital Transducer Type DT4000," *Fisher–Rosemount,* Form 5334 pp. 1–24 (Jun. 1995).

ISP, "InterOperable Systems (ISP) Device Description Services (DDS) User's Guide," ISP–94–110, Rev. 1.0, 60 pages (Jun. 1984).

ISP, "InterOperable Systems Project Fieldbus Specification Device Description Language," *ISP Foundation,* pp. 1–101 (Dec. 1993).

Leeney, "Instrument Remotely Verifies Valve's Stem Position," *Chemical Processing,* Form 8238, pp. 1–2 (Dec. 1993).

PCT/US97/01534 International Preliminary Examination Report dated Mar. 31, 1998.

FIG. 6

| | | |
|---|---|---|
| BlockKey | | 204 |
| TimeKey | | 205 |
| ParamName | | 206 |
| ParamKind | | 207 |
| ValueMode | | 208 |
| ParamDataType | | 209 |
| ParamDataSize | | 210 |
| ParamData | | 211 |
| Archived | | 212 |
| Expected | | 213 |

202

6,094,600

SYSTEM AND METHOD FOR MANAGING A TRANSACTION DATABASE OF RECORDS OF CHANGES TO FIELD DEVICE CONFIGURATIONS

TECHNICAL FIELD

The present invention relates generally to database management and, more particularly, to a database management system and method for maintaining a database of transaction records for changes made to parameters of smart field devices within a process.

BACKGROUND OF THE INVENTION

Typically, process plants (such as chemical refinery plants and drug manufacturing plants, for example) include many field devices which control and measure parameters within the process. Each field device may be a control device (such as a flow valve controller), a measurement device (such as a temperature gauge, pressure gauge, flow meter, etc.) and/or any other device that affects or determines a value associated with a process. Until the past decade or so, field devices have typically been rather simple devices which were controlled either manually or electronically and which produced output readings either electronically or on a gauge connected to the device. However, these devices typically only provide limited information to a controller such as analog signals pertaining to the readings or measurements made by these devices.

More recently, so called "smart" field devices have been developed. Smart field devices are capable of communicating with a process controller and/or a management system associated with the device. Typical smart field devices are capable of transmitting an analog signal indicative of the value associated with the device, for example, a measurement value, and of storing and also digitally transmitting detailed device-specific information, including calibration, configuration, diagnostic, maintenance and/or process information. Some smart devices may, for example, store and transmit the units in which the device is measuring, the maximum ranges of the device, whether the device is operating correctly, troubleshooting information about the device, how and when to calibrate the device, etc. Furthermore, a smart field device may be able to perform operations on itself, such as self-tests and self-calibration routines. Exemplary smart devices include devices which follow the HART (Highway Addressable Remote Transducer) protocol (HART devices), the Fieldbus protocol (Fieldbus devices), the Modbus protocol, and the DE protocol. However, other smart device protocols may exist or be developed in the future to support different types of smart devices.

Currently, every conventional and smart device is capable of performing one or more specific input and/or output functions with respect to a process. An input function is any function which measures or reads a value associated with a process, such as the function performed by a temperature or pressure measurement device. An output function is any function that changes something within a process, such as the functions performed by a valve or flow controller. Furthermore, some smart devices, such as Fieldbus devices, can perform control functions which are functions associated with the control of a process. Each input, output and control sub-function performed by a device is referred to as a "block." By definition, therefore, each device includes at least one, and maybe more, blocks. Fieldbus devices usually include multiple blocks (e.g., one or more input, output, and control blocks), and while HART devices do not include blocks, per se, the contents of a HART device are often conceptualized by those skilled in the art as constituting one and only one block (a "conceptual" block).

Each block and, therefore, each device includes one or more "parameters." A parameter is an attribute of a block which characterizes, affects or is somehow otherwise related to the block. Parameters may include, for example, the type of the block, the maximum operating or measurement range of a block, the mode of a block, the value of a block measurement, etc.

Likewise, each parameter has one or more properties associated therewith, and each of those properties defines or describes the information within the parameter. For example, the temperature parameter of a temperature measuring device has a label property which stores the name of the parameter (e.g., "temperature"), a value property which stores the value of the parameter (e.g., the actual measured temperature), and a units property which stores the units in which the temperature value is expressed (e.g., degrees centigrade or degrees fahrenheit). A device or a block configuration comprises a set of values for each of the properties of each of the parameters associated with a device or a block.

As noted above, smart field devices are developed so that communication therewith must be performed in one of several available protocols (the HART and Fieldbus protocols, for example). These protocols allow device manufacturers to provide device-specific types of information for a device and, of course, the particular types of information are different for each type of smart field device. Consequently, these protocols are complex and difficult to use in device programming. More particularly, some of these protocols do not provide a completely consistent method for communicating with every smart device conforming thereto. Instead, these protocols, such as the HART protocol, merely provide a way for device manufactures to specify what information is available from each smart field device and how to retrieve that information.

Communication with smart devices has been simplified to some extent with the advent of device description languages (DDL) and device description services (DDS) which are provided by the manufacturers of smart field devices. A DDL is a human-readable language that provides a protocol for describing the data available from a smart device, the meaning of the data associated with the smart device and retrieved therefrom, the methods available for implementation of the smart device, the format for communicating with the smart device to obtain data, user interface information about the device such as edit displays and menus, and for handling or interpreting other information pertaining to a smart device.

DDL source files comprise human-readable text written by device developers. These files specify all the information available about a device between the device and a bus or a host to which the device is connected. Basically, in developing a DDL source file for a device, a developer uses the DDL language to describe core or essential parameter characteristics of the device as well as to provide group-specific, and vendor-specific definitions relating to each block, parameter, and special feature of a smart device.

A DDL source file is compiled into a binary format to produce a machine-readable file known as a device description (DD) which can be provided to a user by the device manufacturer or a third-party developer to be stored in a host system, such as a management system. In some cases, for example in Fieldbus devices, DDL source files may be stored in a smart device and transferred from the smart device to a host system. When the host system receives a DD object file for a smart device, it can decode and interpret the DD to derive a complete description of the interface with the device.

DDS is a general software system developed and provided by Fisher-Rosemount Systems, Inc. and/or Rosemount, Inc. for automatically decoding and interpreting the DD's of smart devices. More particularly, DDS is a library of routines which, when called by a host, interprets the DD of a smart device to provide the host with information pertaining to the smart device, including information pertaining to: (1) the setup and configuration of the smart device; (2) communication with the smart device; (3) user interfaces; and (4) methods available for use in conjunction with the smart device. One extremely useful application of DDS is in providing a consistent interface between a host system and one or more smart devices having associated DDL source files (and corresponding DD object files).

Although DDS, DDL and DD's are generally known in the art, more information pertaining to the specific function and format of DDL's, and of Fieldbus DDL in particular, can be found in the InterOperable Systems Project Foundation's manual entitled "InterOperable Systems Project Fieldbus Specification Device Description Language" (1993), which is hereby incorporated by reference herein. A similar document pertaining to the HART DDL is provided by the HART foundation.

A management system is a system which interacts with one or more smart field devices to read any of the device, block, parameter, variable, or configuration information associated with those devices. Typically, a management system comprises a personal computer having appropriate communication ports which allow it to interconnect to, communicate with, and reconfigure a smart device. Management systems may be on-line, that is, have a hard-wired or other permanent connection with a smart device, management systems may be portable and capable of being periodically connected to a smart device to reconfigure that smart device.

Management systems typically perform a wide variety of functions with respect to smart devices within a system. For example, management systems may be used to provide users with information (e.g., values of variables or parameters) pertaining to the state of a process and to each of the smart field devices associated with or connected to the process. Management systems may also be used to enable a user to monitor a process and control the process by reconfiguring smart devices within the process as necessary.

The software routines which are used to perform functions within a management system using features provided by the system are typically referred to as applications. Typically, management systems implement applications provided by individual smart device manufacturers to implement changes on, and read data from, a particular smart device. As a result, various applications within a management system often do not share a common or consistent interface, and the transition from one application to another is therefore cumbersome and time-consuming. Further, smart device configuration data, configuration logs, and smart device diagnostic data created and stored by different applications are decentralized and cannot be cross-referenced because this data may be stored in diverse formats, in different databases and, in some cases, in proprietary formats. Consequently, tasks that could be common to each device within a system must be duplicated in separate applications.

A management system which implements such separately developed applications typically has no way to view information pertaining to all the smart devices in a plant or a process simultaneously because the applications for each device must be run separately. Furthermore, it is difficult for users to write applications that provide a comprehensive view of data pertaining to multiple, different devices in a process because users typically do not have a great familiarity with DDS or with the DDL and DD's associated with each of the devices within a process. Even if a user does have such familiarity, such applications are time-consuming and expensive to develop and must be updated each time a new smart device is added to the system.

The need for an integrated management system is particularly great in processes or systems which must be certified by government agencies such as the EPA and the FDA, which regulate, for example, certain chemical and pharmaceutical processes to ensure that the products manufactured by those processes meet stringent standards, that emissions remain below a predetermined level, and that safety procedures were followed. The easiest way for a plant implementing a regulated process to maintain its certification is to maintain records sufficiently thorough to prove to government auditors that the values of critical process parameters have remained at specified values or within specified ranges that comply with the regulatory requirements of interested governmental agencies and safety procedures. An integrated management system coupled to the smart devices of a process can be used to automatically record these values in a database. Thereafter, the data stored in the database of the integrated management system can be used to prove that these critical values remained within respective required ranges.

Previously, whenever a management system changed the state of a field device in the control system (i.e., changed any information in the field device), the management system stored, in an internal "state database," a complete new or current "state" for the device. The "state" of a device includes (1) an indication of the time when the change was made (i.e., when the device was put in the new state) and (2) data corresponding to all information stored in the device. The state databases of prior management systems may also have included additional information together with the states of devices (e.g., information about who made the changes to device states or why, etc.).

Maintaining a state database in this fashion, and storing a complete set of variables corresponding to a new state every time a change is made to any field device in the control system, requires a significant amount of storage and processing time. Further, multiple on-line management systems are typically interconnected, and data from each system is combined to form a unified historical database reflecting the state of the entire control system. Although the presence of an indication in the records of the multiple interconnected state databases of the time corresponding to each new state does permit reconciliation of the multiple databases to develop such a unified historical database, it does not overcome the well-known inability of prior-art management systems to interface directly with hand-held communicators and to then reconcile data transferred to the management system from hand-held communicators into the management system database. The reason is that present hand-held communicators, which are quite primitive instruments, do not have internal real-time clocks and therefore cannot apply a time stamp to the state records that the hand-held communicators return to the management system. Consequently, the management system cannot determine the particular point in the chronological, historical database at which to insert a record of a given new state received from the hand-held communicator in order to reconcile that new state with the existing chronological database.

Integrated management systems also can be used to reconfigure smart devices more regularly to maintain the certifiability of the process in which the devices are used. Currently, most management systems which support more than one smart field device include particularized software written for each supported smart device to allow communication with that smart device. Adding a new smart device to a process therefore requires the management system for that process to be reprogrammed. Once again, this programming is time-consuming and can be expensive because it must be performed by a person knowledgeable not only in the management system software, but also in the smart device protocol and the new smart device.

Although hand held communicators exist which interface with different smart devices following a particular protocol, these devices only read and write data from and to the device and are not capable of processing that data in any significant manner.

Another cumbersome aspect of developing applications is programming the application to perform the numerous tasks relating to and necessary for communication between a user and each smart device within a system. A developer not only must be attentive to details involving how to communicate with each separate device, but that developer must also pay particular attention to how information is presented to a user via, for example, a display. This task is made more difficult because typical applications do not use consistent user interface protocols. Each of these functions requires much programming time and effort, which must be repeated each time a new smart device is added to the system.

Still further, applications typically allow a user to view a current configuration of a device, block, or parameter within a process, but those applications do not allow the user to view past configurations or to display multiple configurations simultaneously to compare such configurations.

SUMMARY OF THE INVENTION

According to one aspect of the present invention, a computer-based database management system is provided for managing a configuration database associated with one of a plurality of field devices, each of which has a changeable configuration which includes at least one adjustable parameter. The system includes initializing means for setting the adjustable parameter to a first value at a first time, updating means for setting the adjustable parameter to a second value at a second time, and a transaction memory responsive to the initializing means and the updating means for storing a plurality of transactions. Each transactions includes a particular value of a particular adjustable parameter and a corresponding time at which the particular adjustable parameter attains the particular value.

In accordance with another aspect of the present invention, a computer-based database management system is provided for managing a configuration database associated with one of a plurality of devices, each of which has a variable configuration including at least one adjustable parameter. The system includes first selecting means for selecting a particular device, second selecting means for selecting a particular parameter of the particular device, assigning means for assigning a particular value for the particular parameter at a particular time, means coupled to the assigning means for communicating the particular value for the particular parameter to the particular device at the particular time, and recording means for creating a transaction record. The transaction record includes an identifier uniquely identifying the particular device and further specifies the particular parameter of the particular device, the particular value for the particular parameter, and the particular time at which the particular value is to be applied to the particular parameter. The system further includes means for storing the transaction record in a configuration database.

BRIEF DESCRIPTION OF THE DRAWINGS

FIG. 6 is a diagrammatic view of a record of the transaction database of FIG. 5;

DETAILED DESCRIPTION

Figure 1:
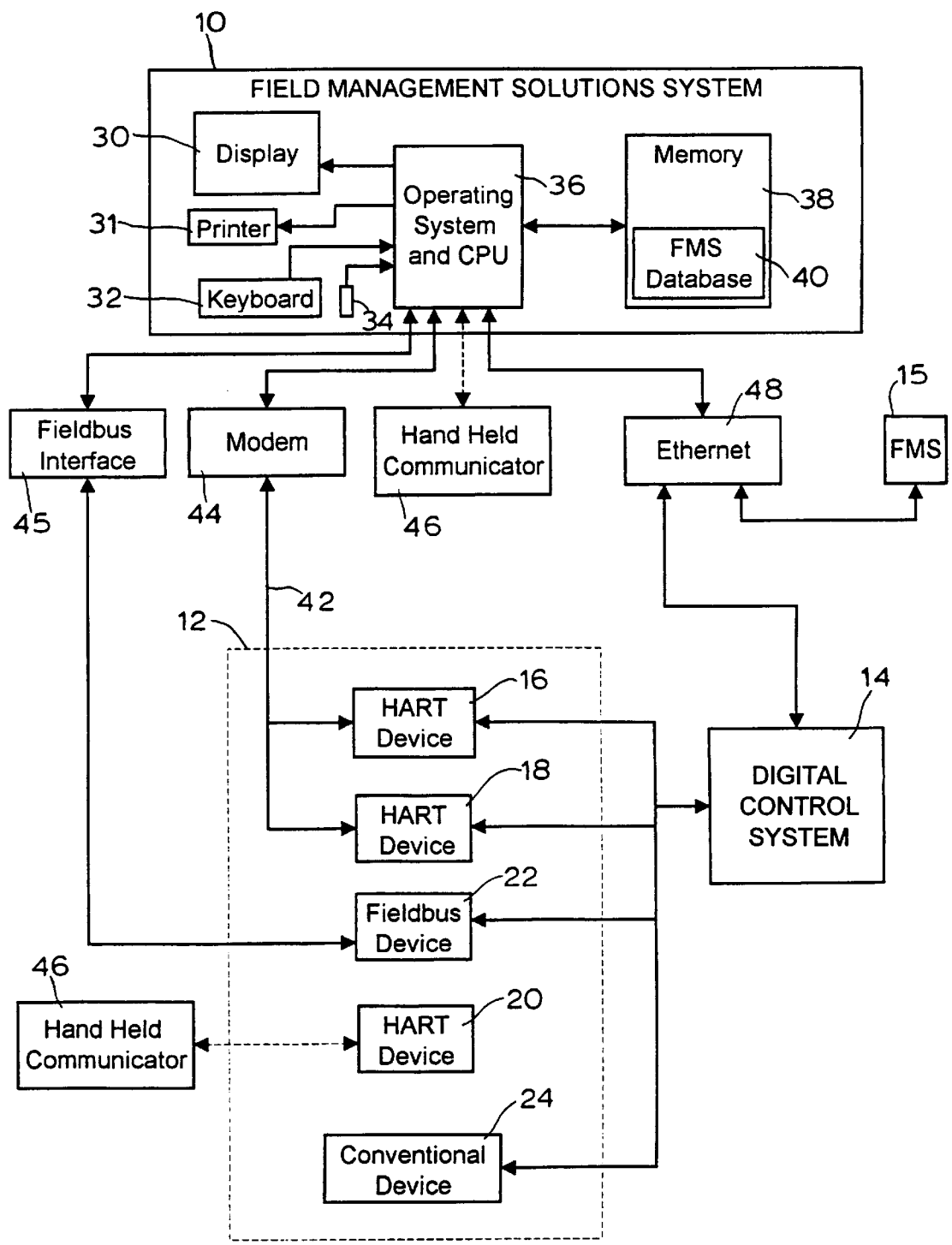
FIG. 1 is a block diagram illustrating the interconnections between a process, a digital control system and a management system.

FIG. 1 illustrates a management system 10, referred to hereinafter as a Field Management Solutions system (an FMS system), interconnected with a process 12, a digital control system 14 (DCS) which controls the process 12, and a further management system such as another FMS system 15. The process 12 may comprise any desired type of process, such as a manufacturing or refinery, process, etc., and is illustrated as including four smart field devices, including three HART devices 16, 18 and 20 and one Fieldbus device 22, and a conventional (i.e., non-smart) device 24. The devices 16, 18, 20, 22 and 24 are controlled in any desired manner by the digital control system 14.

Generally, the FMS system 10 is a PC-based software tool that includes applications which perform field-device management tasks. The FMS system 10 integrates device management for each of the devices within the process 12 by helping users to, for example, configure, calibrate, monitor and troubleshoot any and all of the smart field devices associated with the process 12.

The FMS system 10, which may comprise any type of computer- or microprocessor-based system, may include a display 30, a printer 31, a keyboard 32 and a mouse 34 connected to an operating system and CPU 36. A memory 38 having an FMS database 40 is coupled to the operating system and CPU 36. The memory 38, including the FMS database 40, stores software and data used by the FMS system 10 in performing tasks related to displaying information to a user via the display 30 or the printer 31 and communicating with the smart devices 16, 18, 20 and 22. In addition, the FMS database 40 stores device-related information which is not available from the smart devices, for example, information pertaining to past configurations of the devices, information pertaining to off-line devices, such as off-line smart devices and conventional devices, and information pertaining to service notes including when the next service is needed; who performed service procedures; any favored replacement devices, etc. Data pertaining to off-line smart devices may be stored within the database 40 in a format identical to the format in which that data is actually stored within the off-line devices so that, to the FMS system 10, off-line devices appear to be available through the database 40 in the same way they would be available if those devices were on-line.

The smart devices 16, 18 are on-line devices which are connected to the FMS system via a communication line 42 and a modem 44. The smart device 22 is an on-line device which is connected to the FMS system via a Fieldbus Interface 45. The smart device 20 is an off-line device which is not permanently connected to the FMS system 10. However, the smart device 20 may communicate with the FMS system 10 via a hand-held communicator and/or secondary (laptop) FMS 46 which, as described in more detail below, may be periodically connected to the device 20 and/or any of the other smart devices to read data from, and write data to, the device 20 and/or the other smart devices. Thereafter, the hand-held communicator and/or secondary FMS 46 may be connected to the FMS system 10 to upload data pertaining to the smart device 20 and/or any other smart devices to which it was attached and store such data in the FMS database 40.

If desired, the operating system and CPU 36 of the FMS system can be connected through, for example, an ethernet communication link 48 and/or other network link to the digital control system 14 and other FMS systems, for example, the other FMS system 15.

Figure 2:
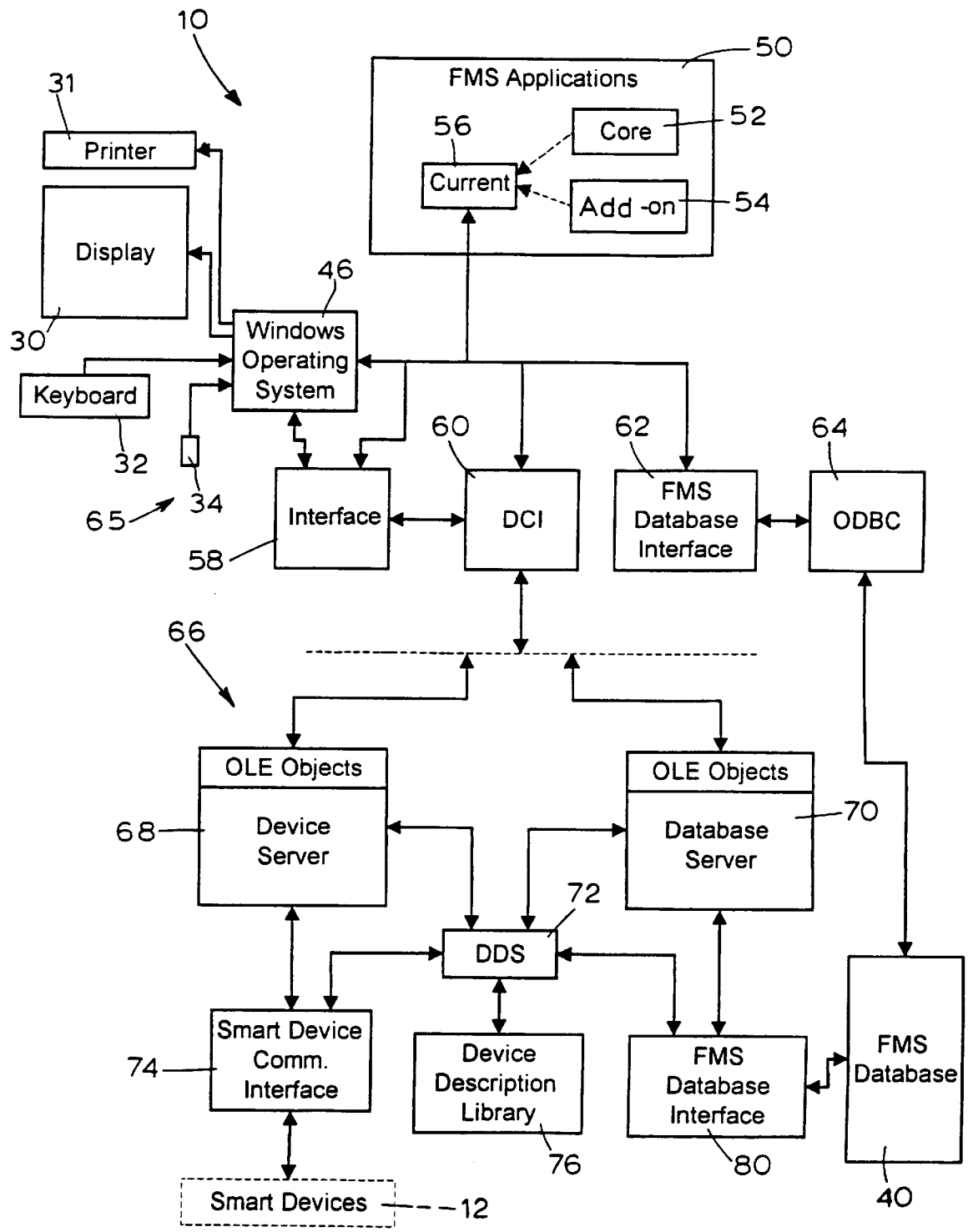
FIG. 2 is a block diagram of the management control system of FIG. 1 having a device communication interface and controls which operate according to the present invention.

FIG. 2 illustrates the interconnections between various component parts of the FMS system 10, including hardware and software components, and will be used to describe how the various software components stored in the memory 38 of the FMS system 10 interact with each other, with the display 30, the printer 31, the keyboard 32, the mouse 34, the FMS database 40 and the smart devices within the process 12. It is understood that the software components of the FMS system 10 are stored in the memory 38 and are run on the operating system and CPU 36.

The FMS system 10 preferably operates in a Microsoft Windows environment (such as a Windows 95™ environment) and, therefore, includes a standard Windows operating system 46, which is used to display data and information on the display 30 and the printer 31 and to retrieve data and information from the keyboard 32 and the mouse 34. Thus, information provided to, or retrieved from, the Windows operating system 46 is preferably provided in a standard Windows call format of any desired type, as is known to those skilled in the art. However, the FMS system 10 could be implemented according to the present invention using any other desired Windows-based or non-Windows-based interface format (whether or not a graphical user interface) including, for example, MacIntosh, Xwindows or IBM DOS formats.

The FMS system 10 includes a set of FMS applications 50 comprising core applications 52 and add-on applications 54. The core applications 52 are essentially programs written by the FMS system provider to perform predetermined and frequently used operations. The add-on applications are applications which are developed by a user or a third-party developer and imported to the FMS system 10 to perform customized functions.

As used hereinafter, an application refers to any software routine implemented by the FMS system 10 which displays to a user information pertaining to or about the process 12 or one or more devices, blocks, parameters, or other information associated with the devices connected to, or associated with, the FMS system 10, and/or which allows a user to reconfigure one or more of the devices associated with or connected to the FMS system 10. The information used by an application typically is either stored in, or developed by, the smart devices within the process 12, or is stored in the FMS database 40.

Thus, for example, the FMS system 10 may include core or other applications which allow a user to interact with the data within the FMS database 40 and/or the smart devices within the process 12 to view the present state of one or more of the devices within the process 12, to change the configuration of one or more of the smart devices within the process 12, to view multiple devices in a simultaneous or sequential manner, to perform common smart device control and configuration functions, to run browsers that locate devices on the network, to monitor the status of devices and generate alarm lists, and to implement device calibration and testing routines.

Other typical core applications may include configuration applications, configuration-management applications, alarm scanning applications, history event-log applications, reporting applications, trend-analysis applications and diagnostic applications. A configuration application displays the values of the variables associated with one or more parameters of a device within a process and allows a user to change appropriate ones of those parameter values. A configuration management application allows a user to manage the configuration of the device as a whole, for example, resetting a device, initializing a device, and calibrating a device. An alarm scanning application checks all of the devices being serviced by the FMS system 10 to determine if those devices are operating correctly or if an error has occurred within any of the devices. A history event-log application provides an event log having, for example, user log-in information, time-stamped messages which indicate changes that have been made to the configurations of the devices being serviced by the FMS system 10, alarms associated with the devices being serviced the FMS system 10 and other events. A reporting application automatically generates a report showing, for example, all past, present or desired future configurations of one or more devices. A trend-analysis or "trending" application records data measured by devices within the process 12 to identify trends which may be occurring within particular devices or across a process as a whole. As is evident, any other desired applications can be created and provided to the FMS system 10.

During operation of the FMS system 10, a user selects one or more of the applications for execution. The selected application is identified in FIG. 2 as the current application or applications 56. Because multiple applications may be executed simultaneously by the FMS system 10, there may be multiple current applications 56. Any current application 56 may interface directly with the Windows operating system 46, an interface block 58, a digital control interface (DCI) 60 and an FMS database interface 62. If desired, the current application 56 can also interface with an Open DataBase Connectivity (ODBC) block 64 (a well-known Microsoft database application interface (API) system that enables communication with nearly all databases) and a server network 65. For many applications, however, such connections are not necessary or desirable. Furthermore, any current application 56 may indirectly interface with the Windows operating system 46, the smart devices within the process 12, and the database 40 via the interface block 58.

The interface block 58 is essentially a software package having for example, specifically configured Windows custom controls, OCX controls or VBX controls, which automatically perform functions relating to the communication of particular, frequently used information between a current application 56, the smart devices within the process 12, the database 40, and a user interface 65 comprising the Windows operating system 46, the display 30, the printer 31, the keyboard 32, and the mouse 34. The interface block 58 can be used by a current application 56 to perform these interfacing functions without the application designer knowing the specifics of the protocols involved therewith. As a result, the interface block 58 enables an application to be designed more easily and provides a consistent user interface.

Preferably, current applications 56 and the interface block 58 interface and communicate with the smart devices within the process 12, other FMS systems or digital control systems and/or the database 40 through the DCI 60 and a server network 66 comprising servers 68 and 70. While typically the server network 66 will be located in, and associated with, the FMS system 10, the dotted line between the DCI 60 and the servers 68 and 70 in FIG. 2 indicates that the DCI 60 can also access server networks of other FMS systems through, for example, the ethernet connection illustrated in FIG. 1.

Essentially, the DCI 60 is a convenience layer which comprises a library of routines which perform functions necessary for communicating with, and retrieving data from, and other functions pertaining to the database 40, the smart devices associated with the process 12 and/or other FMS systems. In operation, the DCI 60 converts commands and messages sent from the current application 56 and the interface block 58 into a format recognized and used by server network 66 and, likewise, converts data provided by the server network 66 into a form recognized and used by the current application 56 and the interface block 58.

While the DCI 60 can use any desired protocol to perform these communication functions, the DCI 60 preferably uses an object-oriented protocol and, most preferably, uses an object linking and embedding protocol such as the Object Linking and Embedding (OLE) protocol developed and documented by MicroSoft, Inc. The MicroSoft OLE (2.0) protocol is used in the MicroSoft Windows 95™ operating system and is well-known in the art.

Generally, an object-oriented protocol is a programming paradigm which models the world as a collection of self-contained objects that interact by sending messages. Objects include data (a state) and methods (algorithms) that can be performed on the data. In addition, objects are related to one another through an interface connection and may communicate with other objects in the hierarchy through messages. When an object receives a message, it responds by using its own methods which are responsible for processing the data in that object and sending messages to other objects to perform specific tasks and possibly return appropriate results.

Because the DCI 60 communicates with the server network 66 through an OLE hierarchy, the DCI uses standard OLE procedures or calls relating to reading and writing values of OLE objects, enumerating a set of enumerated values in an OLE object, getting and setting properties in OLE objects, calling and implementing methods of OLE objects and retrieving property data stored in the OLE collection objects in conjunction with OLE Item methods (a particular type of OLE method). However, other OLE procedures can be implemented by the DCI 60 on OLE objects to communicate with the server network 66.

As described in more detail below, the particular OLE hierarchy which is preferably used by the FMS system 10 is an OLE object hierarchy which has been developed to categorize all of the different types of information and the interrelationships between the different types of information available for, or used by, each of the different DDL's associated with each of the DD's which, in turn, are associated with the devices within the process 12 being serviced by the FMS system 10. This determined hierarchy defines a set of OLE objects, each of which stores a particular set of properties as defined by the hierarchy and a particular set of methods which can be used to manipulate the property data and to communicate with other OLE objects according to the relationships defined by the hierarchy. This hierarchy will be discussed in more detail in conjunction with FIGS. 3 and 4A–4C.

Essentially, the DCI 60 communicates with the server network 66 as if all the OLE objects identified for the determined hierarchy exist within the memory of the server network 66. The DCI 60 implements a simple set of calls necessary for communicating with the OLE objects in the OLE protocol. In reality, however, the data and methods of each OLE object are not actually stored or placed in the memory of the server network 66 until a call, such as a read or write call, is sent to the server network 66 for such OLE object by, for example, the DCI 60, the DDS 72, the smart device communication network 74, or the FMS database interface 80. At that time, the server network 66 recognizes that the data and methods pertaining to the OLE object must be retrieved and stored in memory associated with one of the servers 68 or 70 and automatically performs the functions necessary to retrieve the data and methods of that OLE object.

When the server network 66 receives a call relating to the reading or writing of data or methods within one of the OLE objects stored in its memory, the server network 66 returns the requested information or performs the requested function to the OLE object data according to its stored routines so as to read data from, and write data to, the OLE object, the DDS 72, the smart devices within the process 12 and the FMS database 40.

Likewise, the DCI 60 recognizes or receives changes in OLE objects stored within the memory associated with the server network 66 and performs functions based thereon to implement communication with the current application 56 and the interface block 58. The server network 66 interfaces with the OLE objects in the determined OLE hierarchy and includes a device server 68 and a database server 70. The device server 68 is essentially a set of software routines which have a specified correspondence with the set of OLE objects in the determined OLE hierarchy. These routines are specifically developed to communicate with a DDS 72, a smart device communication interface 74, and the OLE objects of the defined hierarchy. Such routines may, for example, transmit, retrieve, and change particular types of data and information stored within, or available from, the smart devices within the process 12 and/or from DD's (which are files) associated with the smart devices within the process 12. Likewise, the database server 70 is essentially a set of software routines associated with the OLE objects in the determined OLE hierarchy. These routines communicate with the DDS or API 72 and/or an FMS database interface 80 to, for example, transmit, retrieve, or change particular types of data and information stored within, or available from, the FMS database 40 and/or from the DD's which are associated with the smart devices for which data is stored in the FMS database 40. As indicated in FIG. 2, the DD's used by the DDS 72 are stored in a device description library 76 coupled to the DDS library 72.

The routines of the servers 68 and 70 are associated with each of the OLE objects in such a way that the routines which perform the particular read functions required for retrieving the data of an OLE object from the DDS 72, from smart devices, or from the database 40 are automatically implemented by a request for such data from the DCI 60. Likewise, the routines of the servers 68 and 70 are associated with each of the OLE objects in such a way that the routines which perform the particular writing functions required for changing the configuration of smart devices or storing information in the database 40 are automatically implemented by a request made by the DCI 60 to write such data in the OLE object.

For example, a request made by the DCI 60 to write the value property within an OLE object representing data within or associated with a smart device, will cause the server 68 to implement the routine which writes new property values to the smart device. Likewise, a request to read from any OLE object property values stored in, or associated with, a smart device will automatically call the server routine which retrieves the property values associated with that OLE object from the DDS and/or the smart device and store such property values in the memory (not shown) associated with the server 68 as the OLE object. Similarly, a request made by, for example, the DCI 60 to write the property values within an OLE object associated with data stored in the database 40 will automatically implement the server 70 routine which writes new property values to the locations within the database 40 with which that OLE object is associated. Likewise, a request to read property values from an OLE object will cause the server 70 to retrieve the data associated with that OLE object from the DDS and/or the location in the database 40 associated with those property values and store such property values in the memory (not shown) of the server 70 as the OLE object.

These server routines are simple, straightforward, and easy to write by those skilled in the art and thus are not provided herein. However, those familiar with OLE and DDL's can create such routines in a straightforward manner using any desired programming language. If desired, the routines may be written or optimized in any desired way to perform in as high-speed a manner as possible to thereby increase the operating speed of the current application within the FMS system 10.

Generally, to retrieve specific data from, or pertaining to, one of the on-line devices of the process 12, the server 68 asks the DDS 72 for the specific data. If that data is stored in the DD for a smart device, the DDS 72 then consults the DD for the referenced device or the DD associated with a block of the referenced device and returns the requested data to the server 68.

If the specific data was available from the DD, the server 68 stores and maintains that data in the OLE object to which the retrieved data is related. If however, the requested specific data is not available from the DD for a device or a block of a device but is stored, instead, in the on-line device, the server 68 sends a command to the smart device communication interface 74 (which may comprise any known smart device communication interface including, for example, a Fieldbus device interface developed by SoftIng, a German company located in Karlsruhe, or the HART device interface of Micromotion, located in Boulder, Colorado) to retrieve the specific data from the on-line device.

The smart device communication interface 74 then sends a request to the DDS 72 for information on how to get the specific on-line device for the data requested by the server 68. The DDS 72 retrieves this instruction information from the DD for the on-line device and returns the instruction information to the smart device communication interface 74 which, in turn, sends a proper request to the on-line smart device. The smart device then responds with a data stream including the specific data. The smart device communication interface 74 then sends a request to the DDS 72 for information on how to interpret the data stream received from the on-line smart device. The DDS 72 then retrieves interpretation instructions from the DD for the on-line smart device and returns them to the smart device communication interface 74 which, in turn, interprets the data stream from the on-line device in accordance with the interpretation instructions in order to extract the specific data requested by the server 68. The smart device communication interface then returns the specific data to the server 68 which provides the retrieved data to the OLE object with which that data is associated.

The process of writing data to an on-line device is similar to the process of reading data from that device except that the server 68 first sends a request to the DDS 72 for write information, e.g., whether the data is writable, what type, what specific values and, what range of data can be written, etc. If the data is writable, the server 68 sends a write command to the smart device communication interface 74 which, in turn, interfaces with the DDS 72 for write protocols for the on-line device and sends the proper write command to the on-line device in response to the information. The smart device communication interface 74 can also interpret other data from the on-line devices, such as write verifications, response codes, data or value changes which occur in the device, etc. and sends such data to the server 68 for storage in the proper OLE object.

In some instances, the DDS 72 will inform the server 68 that it needs more information to answer a request for data. For example, the DDS 72 may determine that the handling property of a parameter (i.e., whether the parameter is readable and/or writable) is dependent on the mode parameter of a particular device. The DDS 72 sends a request to the server 68 for the mode parameter of the device. In response thereto, the server 68 sends a request for the mode parameter of a device to the smart device communication interface 74 which operates as described above to retrieve the mode parameter of the device. When the server 68 receives the mode parameter of the device from the smart device communication interface 74, it sends this information to the DDS 72 which, thereafter, determines the handling property of a parameter of a device and returns such property to the server 68 which, in turn, places that value in the proper OLE parameter object.

Communication between the server 70, the DDS 72 and the FMS database interface 80 is similar to that described above, except that the FMS database interface 80 is programmed to read and write information to and from the FMS database 40 instead of a smart device. Generally, however, the FMS database interface 80 mimics the functions of the smart device communication interface 74 as they relate to communications between the DDS 72 and the server 70.

It is possible to have the FMS database interface 80 store information pertaining to, for example, values associated with off-line devices and data pertaining to changes made to on-line and off-line devices in the database 40 in a DDL format, i.e., in a format that mimics how such data is stored in on-line devices. In such a situation, the FMS database interface 80 may need to access the DDS 72 to determine how the data is stored in the FMS database 40. For example, in some instances, the database 40 stores parameter values, such as past parameter values in order to, for example, mimic the state of a device. Consequently, the FMS database interface 80 may have to access the DDS 72 to retrieve this information to know what type of data is stored in the database, i.e., integer, enumerated, etc. However, information stored in the database 40 need not be stored in a DDL format. Therefore, to service a command from the server 70 to read data from, or write data to, the database 40, the FMS database interface 80 may not need to access the DDS 72 for device values. Instead, the FMS database interface 80 may write data to, and read data from, the database 40 directly.

The FMS database interface 80 is preferably an application program interface (API) of any conventional type which is specifically set up and configured for retrieving information from the database 40 according to any desired or known method. Thus, the FMS database interface 80 automatically keeps track of where and how data is stored in, and retrieved from the database 40.

As indicated above, the current application 56 and, if desired, the interface block 58 can also interface with the database 40 through the FMS database interface 62 and the ODBC block 64. The FMS database interface 62 may comprise any desired or known applications program interface (API) having a library of routines developed to convert data and requests from a format recognizable or used by the current application 56 into a form recognizable and usable by the ODBC block 64 and vice-versa. Using the FMS database interface 62 (API) to write to the database 40, as opposed to using the ODBC block 64 directly, helps maintain database integrity and consistency and makes applications easier to write because the application is then shielded from database management. Typically, the FMS database interface 62 and the ODBC block 64 (or any other open database accessing system) will be used when an application needs to store data in the database 40 in a format that is inaccessible or incompatible with the OLE object hierarchy communication scheme discussed herein.

FIGS. 3 and 4A–4C illustrate a particular hierarchy of OLE objects which has been developed to represent all of the information defined within or available from one or more DDL's, a set of smart devices which follow the protocols of those DDL's and a database which stores information related to devices using those DDL's. The hierarchy of FIGS. 3 and 4A–4C also represents the relationships between those OLE objects. This hierarchy can be used within an OLE environment to enable an application to retrieve information associated with a DDL, smart devices which use that DDL, and a database which stores information pertaining to smart devices which use that DDL. Thus, the hierarchy of FIGS. 3 and 4A–4C represents not only an arrangement of DDL information (i.e., information available from DD's of DDL's and/or information available from a device or a database associated with devices using one or more DDL's), but also a way of defining an interface between the DCI 60 and the servers 68 and 70 of FIG. 2 in order to access, retrieve, and change this information.

Figure 3:
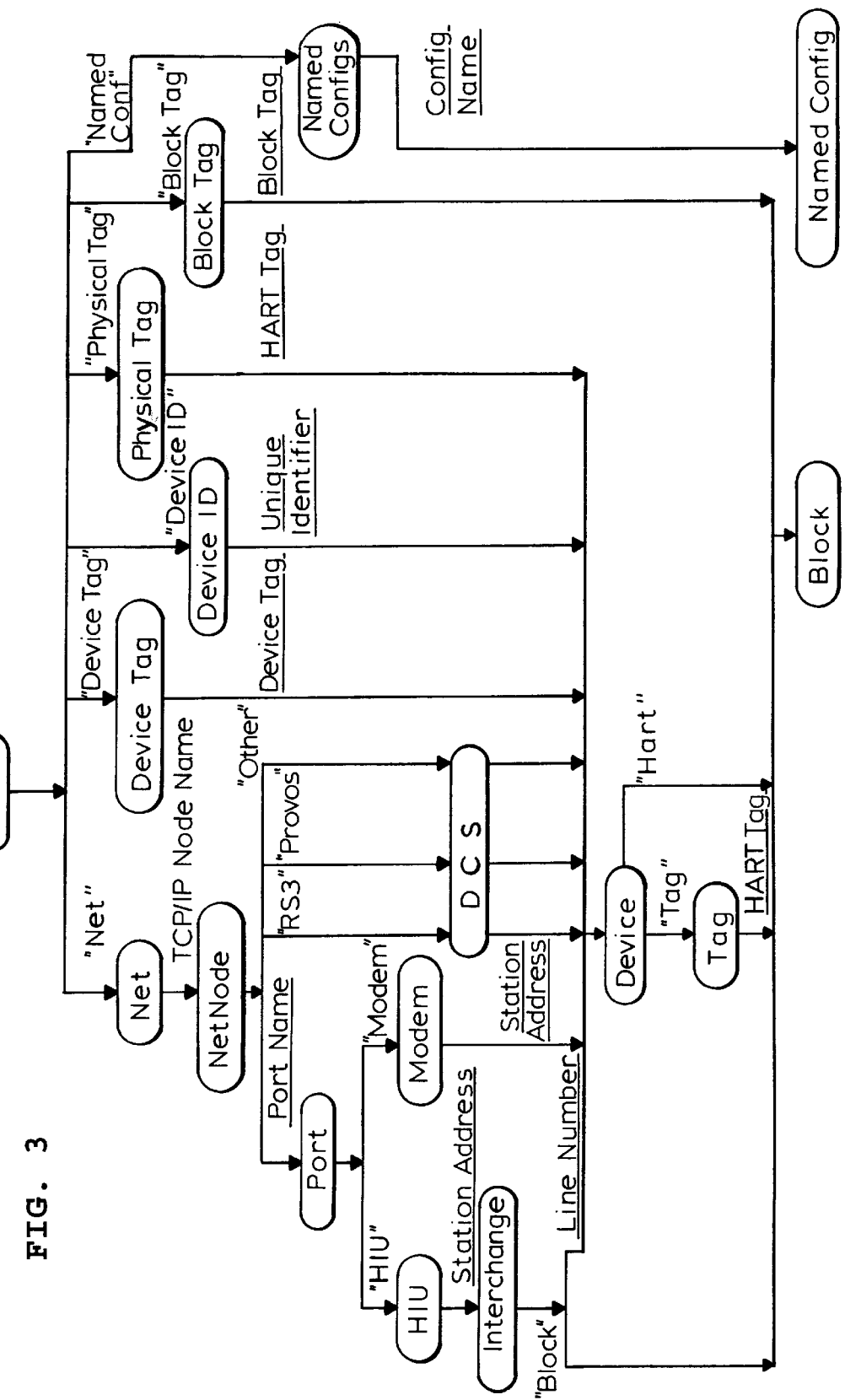
FIG. 3 is an upper hierarchy of object information according to the present invention.
Figure 4A:
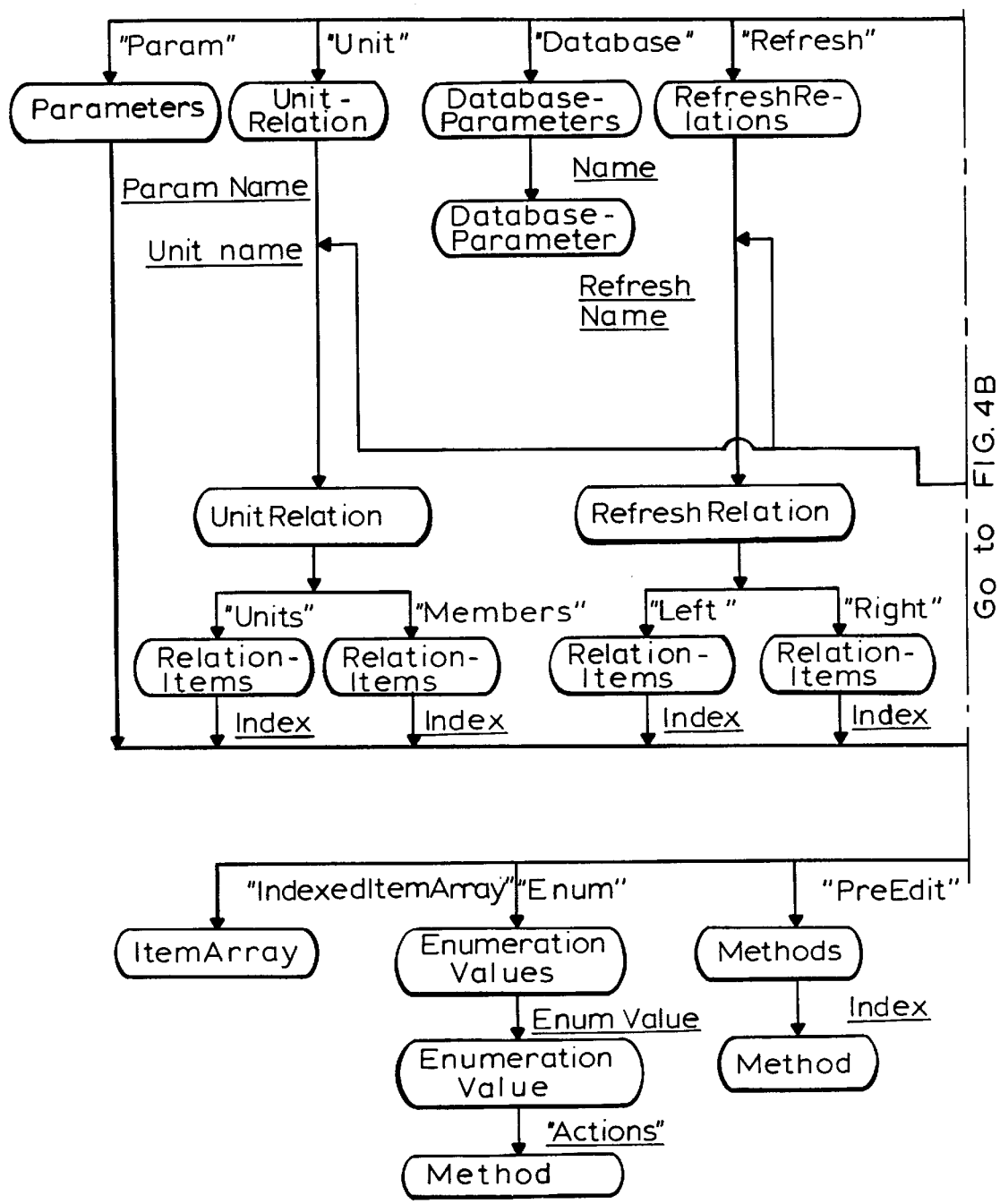
FIGS. 4A–4C is a lower hierarchy of object information according to the present invention.
Figure 4B:
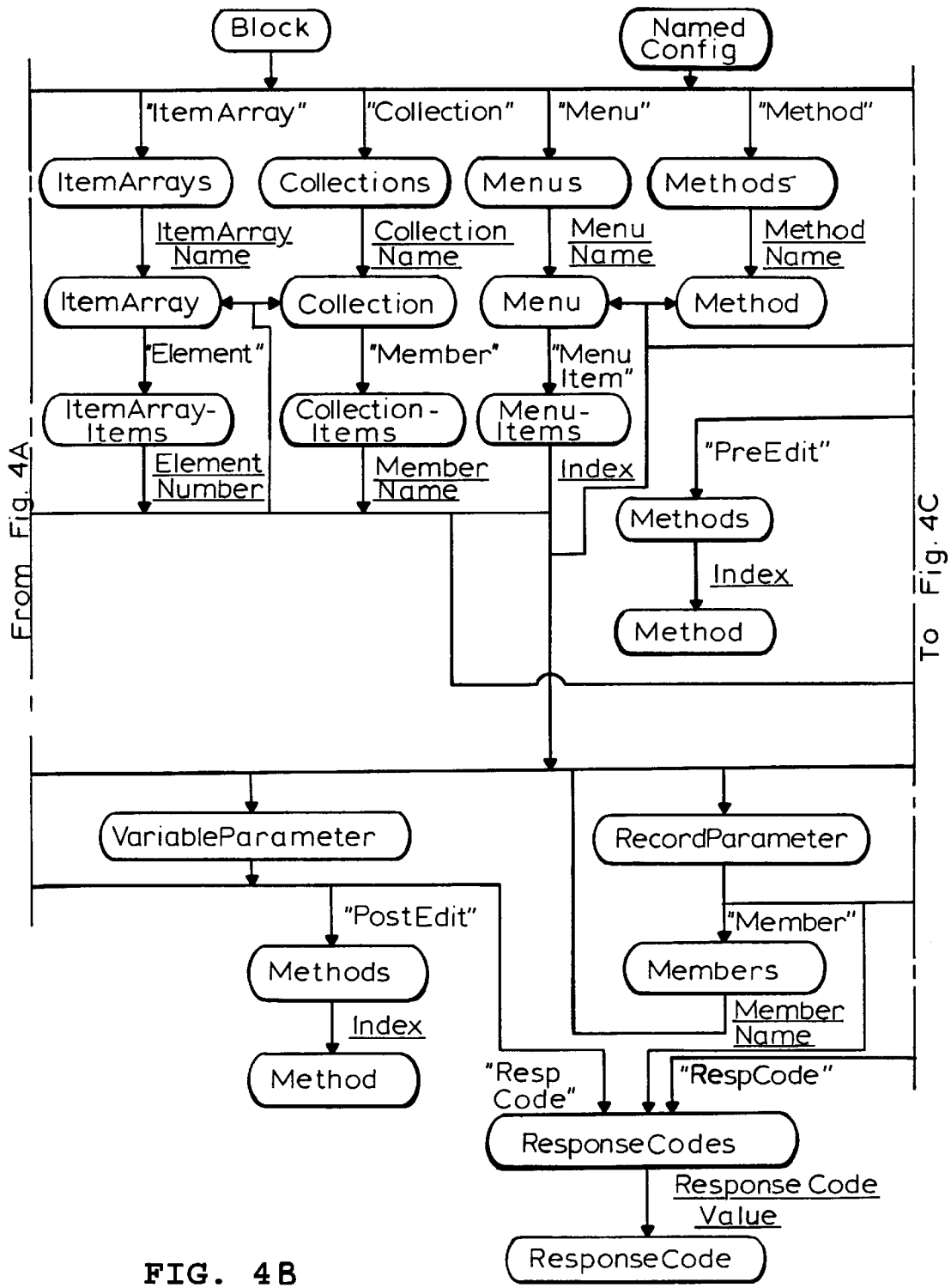
Figure 4C:
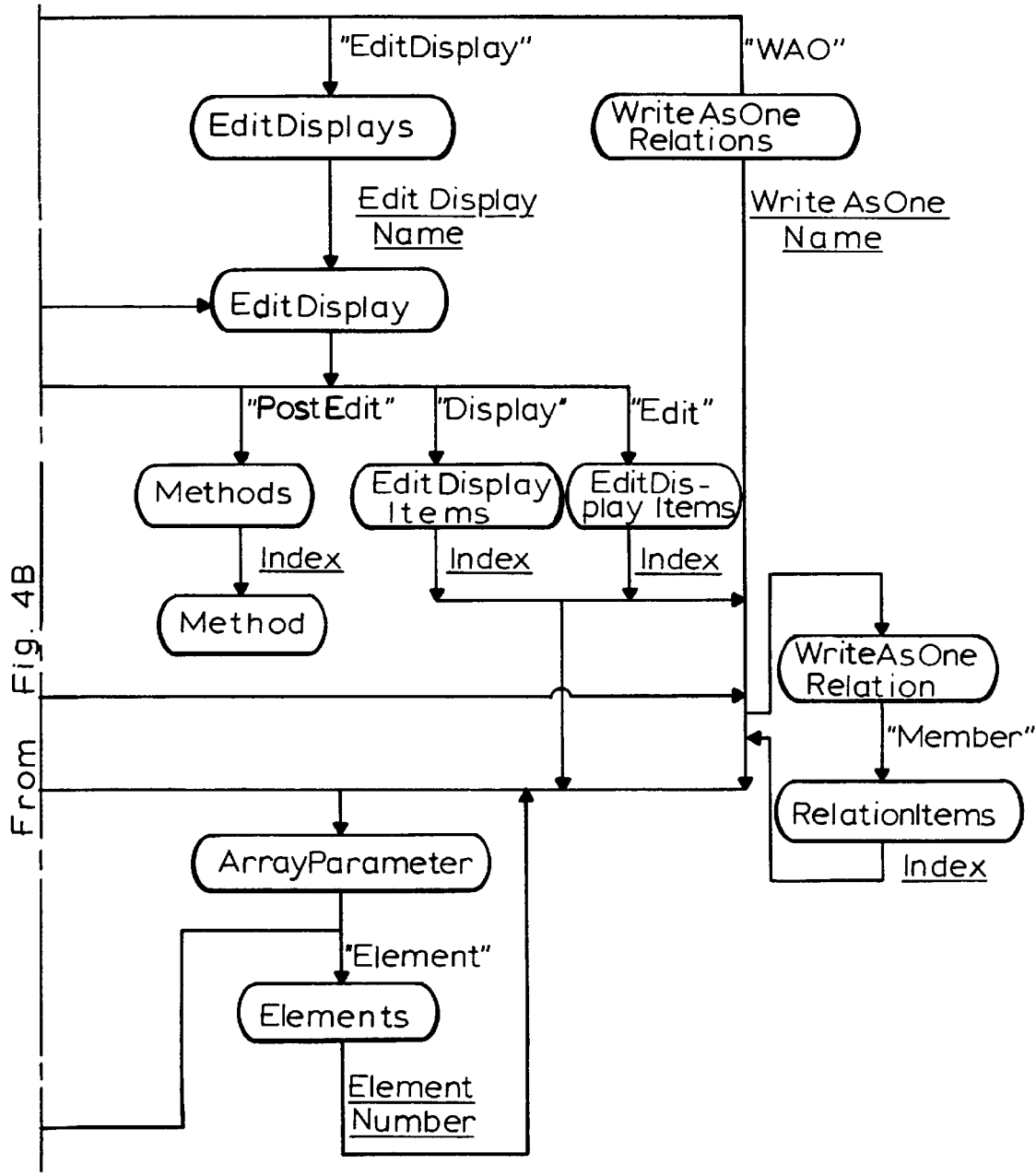

Each of the OLE objects in the hierarchy of FIGS. 3 and 4 is preferably an OLE automation object and is represented as an oval having the type of OLE object identified therein. Each of the OLE objects of FIGS. 3 and 4A–4C includes, or is associated with, a subset of the information defined within or used by one or more DDL's and available from DD's, smart devices and databases which store information pertaining to smart devices.

Generally, each of the OLE automation objects of FIGS. 3 and 4A–4C includes properties (or attributes), methods and interfaces. Because the OLE objects within FIGS. 3 and 4A–4C are automation objects, they have an IDispatch interface (a well-known interface of the OLE protocol) associated therewith. The IDispatch of the OLE automation objects of FIGS. 3 and 4A–4C can be used by, for example, the DCI 60 and the server network 66 to retrieve information pertaining to the properties and the methods of that OLE object and to communicate with other OLE objects.

The properties of an OLE object comprise data pertaining to the objects. Each property also has functions which can be used, for example, to get the property value and to set the property value of the OLE object. Example OLE object properties include the name of the object, a count of the number of items within or associated with the object, a label associated with the object, and help associated with the object.

OLE object methods perform actions on OLE objects, or on the data in OLE objects, implement particular routines using the data in OLE objects, and communicate with other OLE objects. For example, a method may enumerate a set of values in other OLE objects. Together, the properties and the methods of an OLE automation object define the programmable interface of that OLE object accessible by the server network 66 and the DCI 60.

The hierarchy of FIGS. 3 and 4A–4C comprises an upper hierarchy, illustrated in FIG. 3, and a lower hierarchy, illustrated in FIGS. 4A–4C. The upper hierarchy of FIG. 3 corresponds to and illustrates the physical or defined connectivity of devices such as HART, Fieldbus, and other smart or conventional devices, and blocks, such as Fieldbus blocks, connected within a process. The lower hierarchy of FIGS. 4A–4C illustrates relationships among the data which is available from, or referenced by, DDL's such as the HART and Fieldbus DDL's, and the data which is stored in and/or available from DD's, smart devices and/or a database pertaining to smart or other devices.

In order to facilitate a complete understanding of the hierarchy of FIGS. 3 and 4A–4C, a table (entitled "OLE Object DDL Equivalents") is provided at the end of the present specification. The OLE Object DDL Equivalents table identifies, for each of the OLE objects illustrated in the lower hierarchy of FIGS. 4A–4C, the functionally equivalent data, definitions and/or constructs of the Fieldbus DDL that correspond to the OLE object. It should be recognized, however, that the OLE objects of FIGS. 3 and 4A–4C similarly have functionally equivalent types of data, definitions, and constructs available in other DDL's, such as the HART DDL, and that the hierarchy of FIGS. 3 and 4A–4C therefore can be applied to any DDL. Another table (entitled "OLE Object Definitions"), also appearing at the end of the present specification, provides a list of some important properties and methods associated with each of the OLE objects illustrated in FIGS. 3 and 4A–4C, and provides a short description of those properties and methods.

Once again, the properties of the OLE objects of FIGS. 3 and 4A–4C represent, and correspond to, similar types of data available from, or defined by, DDL's (for example, the HART and Fieldbus DDL's) because, as noted above, the OLE objects of FIGS. 3 and 4A–4C have been developed to map onto and represent the data available from or defined by these DDL's. Thus, for example, the Block object of FIG. 3 represents and corresponds to the block entity recognized and used by the Fieldbus DDL, while the Device object of FIG. 3 and the Parameter object of FIGS. 4A–4C represent and correspond to the device and parameter entities, respectively, recognized and used by both the HART and Fieldbus DDL's. The methods identified in the OLE Object Definitions table are standard OLE methods.

Each OLE object within the hierarchy of FIGS. 3 and 4A–4C can be accessed or defined by traversing a path through the hierarchy to that OLE object. Beginning at the top of FIG. 3, every path through the hierarchy of FIGS. 3 and 4A–4C includes a Root object. Root objects define, among other things, the ViewTime to which the data within any of the OLE objects below the Root object pertains. More specifically, the Root object is associated with a ViewTime, which may be "past," "present," or "future" and, in some instances, which specifies a particular time. If the ViewTime is present, the time is the actual time. If the ViewTime is past, the time may be set to any historical time but, preferably, is set to a time at which a change was made to one or more parameter values. Preferably these changes are stored in the database 40 in, for example, an event log. If the ViewTime is future, the time may be set to any future time or may be set to indicate only that it refers generally to the future.

The Item method of the Root object includes a set of collections, as identified in the OLE Object Definitions table, which defines the next layer in the hierarchy of FIG. 3. Generally, the collections of the Item method of an OLE object define interconnections between that OLE object and the OLE objects below that OLE object within the hierarchy of FIGS. 3 and 4A–4C. Each collection of an Item method of an OLE object is illustrated in the hierarchy of FIGS. 3 and 4A–4C by the quoted name of that collection below the OLE object which includes that collection. The generic name of the members within a collection are identified in the hierarchy of FIGS. 3 and 4A–4C by unquoted and underlined expressions located beneath the OLE object associated with the collection type and above the OLE object which has information pertaining to this expression as one of the properties thereof.

Thus, for example, the Root object has a collection of BlockTag objects (identified as the "BlockTag" collection), each of which has a particular name illustrated generally in FIG. 3 as Block Tag. Generally, a block tag is a unique identifier assigned to a particular block within the FMS system by a technician installing/configuring the FMS system in order to identify a particular block. A BlockTag object having a name of Block Tag, therefore, uniquely defines a Block object, as illustrated in FIG. 3. As is evident, the actual number of BlockTag objects within the hierarchy of FIGS. 3 and 4A–4C is dependent on the number of blocks (as that name is used in the Fieldbus DDL protocol) connected to or associated with the FMS system 10.

The PhysicalTag, DeviceID, and DeviceTag objects relate to or are associated with the "PhysicalTag," "DeviceID," and "DeviceTag" collections of the Root object, respectively, and are used to uniquely define a particular device connected to or associated with the FMS system 10. A device ID typically includes a triplet of information comprising the name of the device manufacturer, the model number of the device, and the serial number of the device. Device tags and physical tags usually refer to a location of the device in a plant or a process such as the process 12. The value of a physical tag and/or a device tag can be, for example, an alphanumeric code associated with a specific physical location in the plant or any other description of a physical location. For HART devices, the physical tag is considered the same as the device tag whereas, for Fieldbus devices, the physical tag can have a different value than the device tag. The OLE objects in FIGS. 3 and 4A–4C immediately below a quoted collection name, such as the PhysicalTag object, the DeviceTag object, and the DeviceID object, are also referred to as collections because they are related to constructs which a DDL considers or defines as collections.

In lieu of, or in addition to having a device tag, a physical tag and/or a device ID, a device can be identified by its physical communication connection to an FMS system. Specifically, each device is connected to an FMS network (illustrated in FIG. 3 by the Network object which is a "Net" collection of the Root object) through one of a number of networks, each of which is identified generically by the expression TCP/IP Node Name.

Each network includes a series of nodes, identified in FIG. 3 by the NetNode object. A network node includes a set of ports (illustrated by the Port object) which may have names of, for example, "Com1" or "Com2". The port may connect to a device through a modem (identified by the Modem object) and at one of sixteen station addresses, each of which is identified by a different Station Address.

The port of a network node may also connect to a device through one or more HART interface units (HIU's) (identified by an HIU object) having a Station Address. Each HIU includes one or more interchanges (identified by the Interchange object) each of which typically includes 8 lines identified by Line Number. Interchange objects also include a method (which, contrary to the above-stated general rule about quoted name, is identified by the label "Block") which returns an interface to the particular Block object that describes the HIU.

A network node can also be coupled to a device through one or more different DCS's, for example, the RS3, Provox, or other DCS's. Although FIG. 3 illustrates each of these as connected through a generic DCS object, the actual connection to an RS3 DCS, for example, would be made and could be identified in FIG. 3 by a node number, a card number, a port (typically one of four ports in a card) and a line (typically four lines per port). However, because the configurations of these DCS systems are not yet fully developed, the actual connections with each are not shown and the DCS object is not mentioned in the OLE Object Definitions table.

Furthermore, a network node may be coupled to one or more Fieldbus interface cards. However, because the Fieldbus devices are not yet being sold, the exact connection to a device is not yet known and, therefore, this connection is not represented in the hierarchy of FIG. 3. However, such a Fieldbus connection could easily be added by showing a Fieldbus object and any other OLE objects related to the components required for a Fieldbus connection from between a network node and a device between the NetNode object and the Device object.

Once a device is identified in any manner specified above, a block within the device can be uniquely determined by the "Tag" collection, illustrated as the Tag object, having the HART Tag name. If the device the contents of is a HART device, which are represented by one only one conceptual block, the block is already uniquely identified and can simply be specified by the "HART" collection. The names of the tags related to the Tag object are specified as HART Tag in FIG. 3 because the HART tag of HART devices is used as this identifier. However, other tags for other types of devices could be used instead.

As suggested above, a Block object and, correspondingly, a block of a process, can be uniquely identified by traversing any of the above defined paths through the upper hierarchy of FIG. 3. Likewise, every other OLE object within the hierarchy of FIGS. 3 and 4A–4C can be identified by a unique moniker derived by traversing a path from the Root object at the top of the hierarchy of FIG. 3 through to the particular OLE object. Thereafter, the properties and methods of any of the OLE objects within the hierarchy of FIGS. 3 and 4A–4C can be referenced and obtained using the moniker developed for that OLE object.

More particularly, a moniker can be determined from the hierarchy of FIGS. 3 and 4A–4C by compiling a string comprising the quoted and the unquoted/underlined expressions encountered in traversing a path from the Root object in FIG. 3 to the OLE object of interest, and seperating these expressions with an exclamation point ("!"). For example, the moniker for a Block object can be any of the following:

Root!BlockTag!Block Tag!

Root!PhysicalTag!HART Tag!Tag!HART Tag

Root!DeviceID!Unique Identifier!HART

Root!Net!TCP/IP Node Name!Port Name!Modem!Station Address!Tag!HART Tag

As will be evident, monikers for other OLE objects illustrated in FIGS. 3 and 4A–4C can be developed using this format. The "NamedConfig" collection of the Root object of FIG. 3 (represented by the NamedConfigs object) relates to objects which are stored in the FMS database 40 and which are not available from a device. Each Named-Configs object is identified by a ConfigName to specify a particular NamedConfig object. A NamedConfig object may include, for example, a "recipe" or particular configuration of a block necessary for implementing a particular function within a process, a past configuration of a block within a process, or for that matter, any other desired user information related to Block objects. However, to the server network 66 of FIG. 2, each NamedConfig object looks similar to a Block object except that the parameter value data of a NamedConfig object is retrieved from the FMS database 40 as opposed to being retrieved from a device. NamedConfig objects may have a subset of the information typically associated with a Block object.

The lower hierarchy of FIGS. 4A–4C illustrates an inter-relationship among the data associated with each block of a system. Therefore, as illustrated in FIG. 4, each Block object (and each NamedConfig object) includes a set of collections denominated "Param," "Unit," "Database," "Refresh," "ItemArray," "Collection," "Menu," "Method," "EditDisplay," and "WAO," each having an associated (although slightly differently named) OLE object. Each of these OLE objects, in turn, have other OLE objects related thereto as defined in FIGS. 4A–4C. Thus, for example, a Parameter object identified by a Param Name may be a VariableParameter object, a RecordParameter object or an ArrayParameter object. If it is a VariableParameter object, it includes collections of "IndexedItemArray," "Enum," "PreEdit," and "PostEdit," all having associated OLE objects. The EnumerationValues object (a collection of the VariableParameter object for variables of the enumerated type) has particular enumerated values identified by the Enumeration Value object which, in turn, includes a collection of Method objects. These Method objects may, for example, include methods of getting or changing enumerated values of a VariableParameter object.

The property, data, and methods stored in, or associated with, all of the OLE objects within FIGS. 4A–4C, except for the DatabaseParameters and DatabaseParameter objects, represent information which is available from or through the use of DD's or a device conforming to a DDL. The data and method of the DatabaseParameters objects and DatabaseParameter objects are stored in a database.

As with FIG. 3, any OLE object in FIGS. 4A–4C can be uniquely identified by a moniker developed by tracing a path from the Root object of FIG. 3 down to the particular OLE object of interest. Thus, for example, the moniker for a pre-edit Method block could be constructed by adding onto the end of the moniker for any Block object of FIG. 3, which is also represented by the Block object of FIGS. 4A–4C, the expression !param!Param Name!PreEdit!Index.

Once a moniker is established for a particular object within the hierarchy of FIGS. 3 and 4A–4C and stored in the memory associated with the server network 66, the DCI 60 and the server network 66 can, thereafter, operate on and access that OLE object using a shorter unique "handle" generated by the server network 66. The handle may, for example, comprise a unique number identifying an OLE object which has been stored in the memory of the server network 66.

In essence, with a unique moniker or the handle, any OLE object identified by the hierarchy of FIGS. 3 and 4A–4C can be immediately accessed by the DCI 60 or the server network 66 and the methods within that OLE object can be invoked in order to accomplish communication with the DDS, a database, a smart device, or other OLE objects as necessary. Thus, for example, the software routine within the server 68 which accesses the DDS 72 to retrieve a particular parameter value from a particular device can be initiated when a call to the proper VariableParameter object is initiated by the DCI 60 using a command which tells the OLE VariableParameter object to read a parameter value.

As is evident, the server network 66 communicates with the database 40, the DDS 72, and the on-line devices transparently to the DCI 60 and the current application 56, because the server network automatically accesses the inter-relationships between the OLE objects identified by the lower hierarchy of FIGS. 4A–4C to determine which set of routines to implement in order to obtain new information requested by an OLE object or a DDS.

It should be noted that, for any OLE object of FIGS. 3 and 4A–4C to be accessed, the OLE objects above that OLE object in at least one path between that OLE object and the Root Object FIG. 3 must be stored in the server network memory. Thus, for example, when accessing a VariableParameter object of a parameter for a block, the Parameter object and the Block object associated with that parameter and that block will also be stored in the server network memory. The Device object, the DeviceID object and the Root object may also be stored in the server network memory. Without these higher level objects, the server network 66 can not access enough information to determine how to locate and retrieve the data of the VariableParameter object.

In a typical situation, the DCI 60 sends a command to get a value from an OLE object, for example, the Handling property of a VariableParameter object for a particular block of a particular device using a moniker or a handle which has been provided for that VariableParameter object. If the identified OLE object has not yet been stored in the memory of the server network 66, the server network 66 uses pre-written routines and the methods of the one or more OLE objects above that VariableParameter object to retrieve this data from, for example, one of the DDS 72, the smart device itself, or the database 40. The server network 66 then stores this data in a server memory. If needed the server network 66 first stores for example, the Root object, the DeviceID object, the Device object, the Block object, and the Parameters object, in memory.

Next, the server uses the methods of the VariableParmeter object and pre-written routines associated therewith to access the DDS 72 (because that is where the Handling information of a variable parameter of a block is located). If, as in this instance, the value of the Handling property of the variable parameter depends on the mode parameter to which the smart device is currently set, the DDS returns a message to the server 68 telling the server 68 that the DDS needs the mode parameter information pertaining to the device or block which contains that variable. At this point, the server 68 locates the Device object related to the VaribleParameter object to determine how to communicate with the device, i.e., where the device is located in the system and how to interact with that device. The server 66 then uses a prewritten routine for communicating with the device associated with the Device object to instruct the smart device communication interface 74 to retrieve the mode parameter of the device. When the smart device communication interface 74 returns the mode parameter value to the server 68, the server 68 provides this information to the DDS 72 which, thereafter, computes and returns the Handling property to the server 66 which then forwards this information to the OLE VariableParameter object and, thereby to the DCI 60 (because changes in OLE objects result in messages being sent to the host, i.e., the DCI 60 in this case). Thus, to the DCI 60, it merely appears that a request for a read of the Handling property of a parameter was sent to an OLE object and that a message was returned with the Handling property. The communication with the DDS and between OLE objects was accomplished automatically by the server transparently to the current application 56, and the application did not need to know any specifics regarding the type of device was accessed, the DD or DDL associated with that device, etc. Thus, using the interface defined above, an application can communicate with a number of different smart devices following the same or different DDL protocols without the need to consider any of the specifics of the DDS, DDL or DD which must be used to implement that communication.

As will be apparent to those skilled in the art, the DCI 60 may thereby operate to communicate with and retrieve information from the OLE hierarchy represented by FIGS. 3 and 4A 4C by performing relatively simple routines which, for example, (1) create an object hierarchy and associate it with the server network 66, (2) traverse the object hierarchy to explore the objects below a specified object, (3) implement standard OLE methods like Item, which traverses a specific path from one object to another, and NewEnum, which creates an interface to enumerate objects one level below, (4) implement methods related to Block objects which may include methods related to DDL operations, (5) read and write Root and Device object properties, (6) initiate and control non-blocking read and write requests from OLE objects, (7) retrieve results from blocking reads and writes, (8) control changes to the database 40, and (9) control the creation and maintenance of an event log that includes information pertaining to, for example, user changes to the system including change times, identification of the persons and the computers which made the changes, etc.

As a result, an application for the FMS system 10 does not have to be specifically programmed to interface with a DDS, database or smart devices which, in turn, allows an application developer to be much less knowledgeable with respect to DDL formats, DD's and smart device communications.

It will be noted that, using the hierarchy of FIGS. 3 and 4A–4C as described above, any application implemented by the FMS system 10 can interface with FMS devices using, for example, any OLE-compatible programming environment to gain access to the IUnknown and IDispatch interfaces associated with each object in the hierarchy. It is considered that Visual Basic programs and C++ programs are well-suited to use the above-defined OLE hierarchy.

Furthermore, although the hierarchy of FIGS. 3 and 4A–4C is specifically related to the Fieldbus DDL and to the HART DDL, which is very similar to the Fieldbus DDL, it is considered that this or a similar hierarchy can be made for other DDL's associated with other smart devices including, for example, Modbus smart devices in accordance with the present invention. Furthermore, it is considered that the hierarchy of FIGS. 3 and 4A–4C can be implemented by other object-oriented programming protocols and even by non-object oriented programming protocols.

Figure 5:
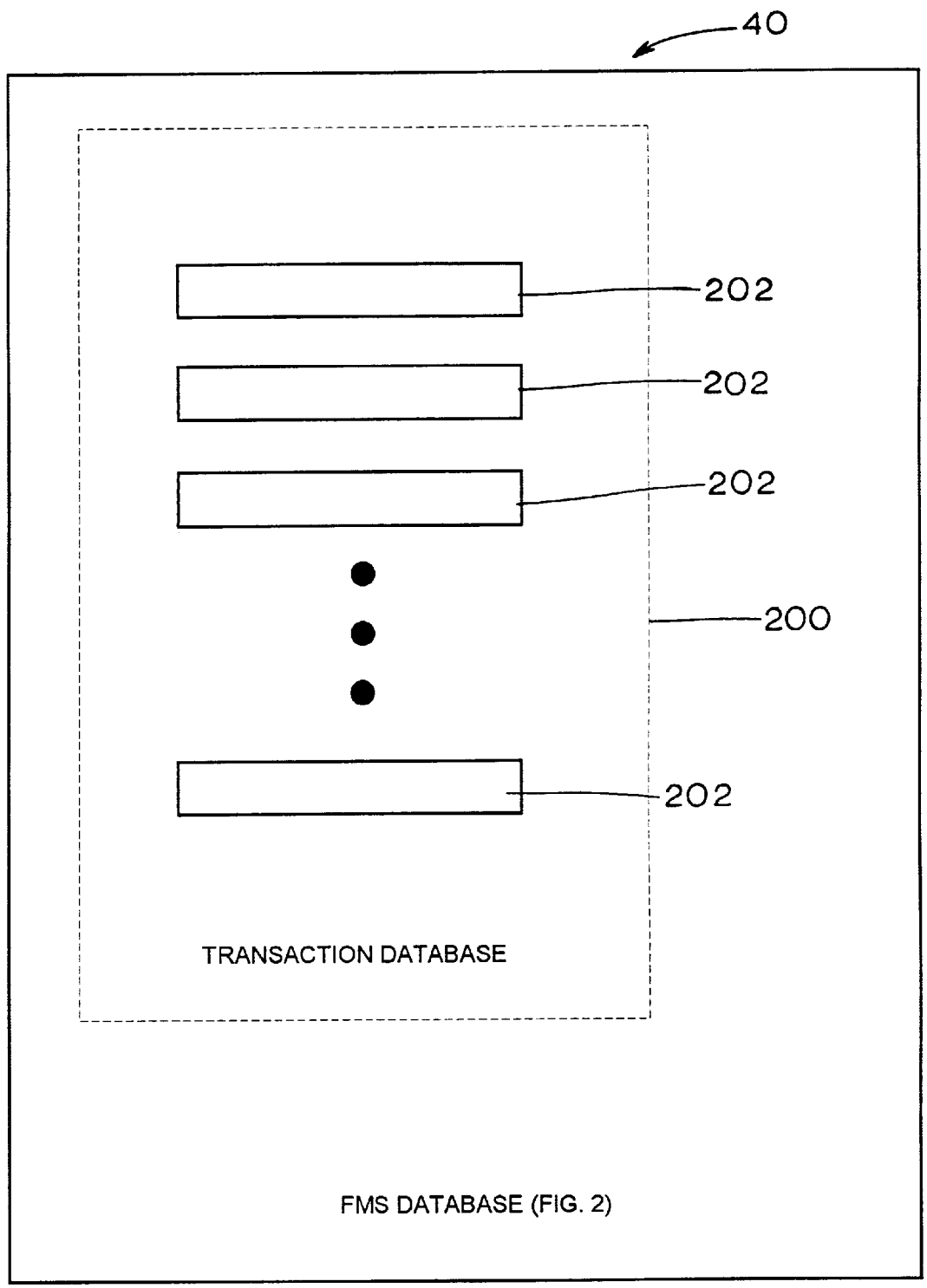
FIG. 5 is a diagrammatic view of the FMS database of FIG. 2 illustrating a transaction database included therein.

As illustrated in FIG. 5, the FMS database 40 (FIGS. 1 and 2) contains a transaction database 200 which the FMS system 10 uses to store data representing changes made to parameters of the various blocks corresponding to devices 16, 18, 20, 22 in the process 12. Specifically, the transaction database 200 is adapted for storing a transaction record 202 corresponding to each parameter change of which the FMS system 10 is or becomes aware. Each transaction record 202 includes a number of fields 204–213. Each field 204–213, in turn, stores a piece of information relating to the "transaction" (i.e., the change in the value of a parameter) which corresponds to the transaction record 202.

The fields 204–213 of the records 202 described herein, are identified as BlockKey, TimeKey, ParamName, ParamKind, ValueMode, ParamDataType, ParamSize, ParamData, Archived, and Expected. However, the particular contents of the transaction records 202 in the transaction database 200 described herein are only exemplary. In accordance with the present invention, the records 202 of the transaction database 200 can be adapted to contain any other necessary or desired information relating to the stored transactions, or other information, if desired.

The meaning of each of the particular fields 204–213 is now described in detail in relation to an exemplary change or transaction comprising the assignment of a particular value (V) to a particular parameter (P) of a particular block (B) at a particular time (T). The BlockKey field 204 contains the identifying number of the block to which the change applies, whether the change is a past, present, or future change. The identifying number stored in the BlockKey field 204 is a unique number which the FMS system 10 assigns to the block B and uses to uniquely identify the block B. The value of BlockKey for a particular block, is arbitrary. However, the FMS system 10 must maintain an index (such as in the FMS database 40) of the BlockKeys assigned to all blocks.

The TimeKey field 205 stores a number, or a collection of numbers, representing the particular time T when the change represented by the transaction record 202 is made. For example, the TimeKey could be an actual calendar date and time, expressed with as much precision as is needed (i.e., seconds, milliseconds, etc.), or can be a number derived from that information, such as the number of seconds or milliseconds that have elapsed since a particular reference date and time (e.g., since Jan. 1, 1980, at 12:00 a.m.). For convenience, the TimeKey for a change could further be expressed in two fields, one containing the date of the change, and the other containing the time of the change. Here, too, the time field could be represented either as an actual time or as a number of seconds (or milliseconds, etc.) elapsed since a reference time.

The ParamName field 206 contains the name of the particular parameter P of the particular block B to which the change stored by the transaction record 202 relates. The names stored in the ParamName fields 206 of transaction records 202 are the actual names of parameters used in the OLE parameter objects of the block B, as described above. Conveniently, these names also correspond with parameter names found in DDL's.

The ParamKind field 207 contains a single alphabetic character corresponding to the kind of the parameter P. In particular, if the parameter P is an "actual" or "real" parameter, (i.e., one which affects and/or changes the behavior of a block), then the ParamKind field 207 contains the value "P." If, instead, the parameter P is a parameter stored in the database 40 (FIG. 1), then the ParamKind field 207 contains the value "D." The latter type of parameter is stored only in the database 40 and not in a device. Additional designations of kinds of parameters can also be provided (e.g., for user-defined parameters or for parameters which contain information about a block but do not affect the block).

The ValueMode field 208 contains an alphabetic character indicating whether the value "V" of the parameter "P" is part of a "real" state of the device corresponding to the block B, or whether it is, instead, part of a "future" state of that device. Specifically, the ValueMode field 208 contains the value "H" if the transaction record 202 represents part of a real state (i.e., if the record 202 represents a past or present change to the block B). On the other hand, the ValueMode field 208 contains the value "F" if the transaction record 202 represents part of a future state (i.e., if the transaction record 202 represents a change to be made to the block B at an unspecified time in the future).

The ParamDataType field 209 contains a number corresponding to the type of the data or value "D" stored in the parameter P (e.g., 1=string, 2=integer, 3=long-integer, 4=unsigned long-integer, 5=floating-point, 6=double-precision, 7=binary, etc.). The numbers corresponding to the various available data types can be arbitrarily assigned by the FMS system 10, but the FMS system 10 must keep track of those assignments.

The ParamDataSize field 210 contains a number corresponding to the size of the data D stored in the parameter P. The value stored in the ParamDataSize field 210 is the number of bytes used to store the data D representing the value of the parameter P.

The ParamData field 211 in a transaction record 202 stores the actual data or value D assigned to the parameter P by the change represented by the transaction record 202.

The Archived field 212 is an optional field which stores an indication of whether the contents of the associated transaction record 202 have already been archived or stored to a backup storage medium. The Archived field serves to minimize the time required to complete a backup of the database 200 by identifying those transaction records 202 which have already been archived, so that those archived transaction records 202 can be skipped during subsequent archiving procedures. The Archived field also provides a safeguard against inadvertent and/or undesired deletion (e.g., by housekeeping or utility software) of transaction records 202 which have not yet been archived. The Archived field 212 of a transaction record 202 contains a one or "true" value if the transaction record 202 has already been archived, and contains a zero or "false" value otherwise.

The Expected field 213 contains an indication of whether the change or transaction represented by the transaction record 202 was identified by the FMS system 10 that made the change as an "expected" change or an "unexpected" change. As described in detail below, an FMS system 10 can use the transaction records 202 of the transaction database 200 of the present invention to reconstruct, for any particular time, an expected state of any block of any device in the process 12. An "expected" state for a device is the state that an FMS system 10 believes to be the state of the device, based on the transaction history stored in the transaction database 200 of the FMS system 10. At any given time, however, an FMS system 10 may "expect" a state for a device which is not identical to the actual state of the device. For example, a second FMS system 10, or a hand-held communicator 46, may have changed the state of the device but not yet informed the first FMS system 10 that the change was made.

Before an FMS system 10 (or a hand-held communicator) makes a change to a device (e.g., the device containing the block B), the FMS system 10 determines whether the device is in the state that the FMS system 10 "expects" or some other "unexpected" state. If the device is in the state expected by the FMS system 10, then the FMS system 10 makes the change, and stores a one (or other suitable "true" value) in the Expected field 213 of the transaction record 202 corresponding to the change (indicating that the change was expected). If, on the other hand, the FMS system 10 finds the device to be in a state other than the state in which the FMS system 10 expected the device to be, then the FMS system 10 knows that a change has been made which was not reconciled into the transaction database 200 of the FMS system 10. (The procedures by which changes are reconciled into an FMS transaction database 200 are explained in detail below.) In that case, the FMS system 10 enters a transaction record 202 in its transaction database 200 which represents the change that would have to have been made to the device in order to change the state of the device from the state expected by the FMS system 10 to the actual state in which the FMS system 10 found the device. The FMS system 10 also stores a zero (or other suitable "false" value) in the Expected field 213 for the transaction record 202 corresponding to that change, indicating that the change was unexpected. The expected field 213 is used by an FMS system 10 (such as a primary FMS) in reconciling transaction records 202 from secondary FMS's and/or hand-held communicators 46 into the primary FMS system 10 as described in more detail below in connection with FIG. 9 and 10.

The ParamKind field 207, the ValueMode field 208, the ParamDataType field 209, and the ParamDataSize field 210 of a transaction record 202 are included in the transaction record 202 simply to facilitate processing of the data stored in the ParamData field 211 of the transaction record 202, and of the parameter object corresponding to the parameter P as a whole. As noted above, any other suitable information, such as the name of the person who made the change, the reason why the change was made, or any other information which may be required by standard plant operating procedures, regulatory requirements, or user preferences, can also be stored in the transaction records 202 of the transaction database 200. Alternatively, this additional information can be stored in a second data table similar to the transaction database 200, and including transaction-identifying information (e.g., the BlockKey, the TimeKey, and the ParamName fields 204, 205, and 206) together with additional fields for the additional information. The FMS system 10 then accesses the additional information for each change by cross-referencing to the second data table using the transaction-identifying fields in the particular transaction record 202 representing the change in the transaction database 200.

The database functions performed by the FMS system 10 with respect to the transaction database 200 are now described in detail. Generally, the FMS system 10 uses the transaction database 200 to maintain historical records of changes made to smart field devices, e.g., devices 16, 18, 20, 22, in the process 12; to store current values of parameters in the various field devices; and to store records of future changes to be made to those devices. Several specific functions can be performed by the FMS system 10, with respect to the transaction database 200.

The first function is that when the FMS system 10 (sometimes referred to herein as the primary FMS system) itself makes a change to a parameter of a device or, more particularly, to a specific block of the device, the FMS system 10 adds a record 202 to the database 200 providing all of the above-described information in relation to that change. The BlockKey assigned by the FMS system 10 to the block in which the change is made is stored in the BlockKey field 204. The TimeKey corresponding to the time at which the change is made is stored in the TimeKey field 205. The name of the parameter whose value is changed is stored in the ParamName field 206. The kind of that parameter is stored in the ParamKind field 207. The mode of the value of the parameter is stored in the ValueMode field 208. The type of the data stored by the parameter is stored in the DataType field 209. The size of the data stored by the parameter is stored in the ParamDataSize field 210. The new value stored in the parameter is stored in the ParamData field 211. The Archived field 212 is set to zero, of course, because the transaction record 202, being new, cannot yet have been archived. Lastly, because the FMS system 10 itself made the change to the device, the Expected field 213 is set to one which indicates that the change is an expected one: the change clearly is "expected" because the FMS system 10 authorized and made the change itself.

In many installations, the FMS system 10 is not permanently connected to all smart devices in the process 12, because such permanent connections typically are costly to install even though they provide advantages in terms of ease of configuration of the devices by the FMS system 10 to which the devices are permanently connected. A so-called transient or temporary connection can be provided between the FMS system 10 and a smart device which is not permanently connected to the FMS system 10, so that the FMS system 10 can make a desired change in the smart device. Alternatively, a secondary FMS system 46 can first be connected to the primary FMS system 10 to receive instructions as to what change to make, and the secondary FMS system 46 can then be disconnected from the primary FMS system 10 and connected instead to the smart device so that the secondary FMS system 46 can make the change instructed by the primary FMS system 10.

When the primary FMS system 10 sends instructions to a secondary FMS system 46 for making a change, the primary FMS system 10 also sends the "expected" state of the device to the secondary FMS system 46 together with instructions for the change to be made (i.e., the name of the parameter that is to be changed, and the new value for that parameter).

Figure 7:
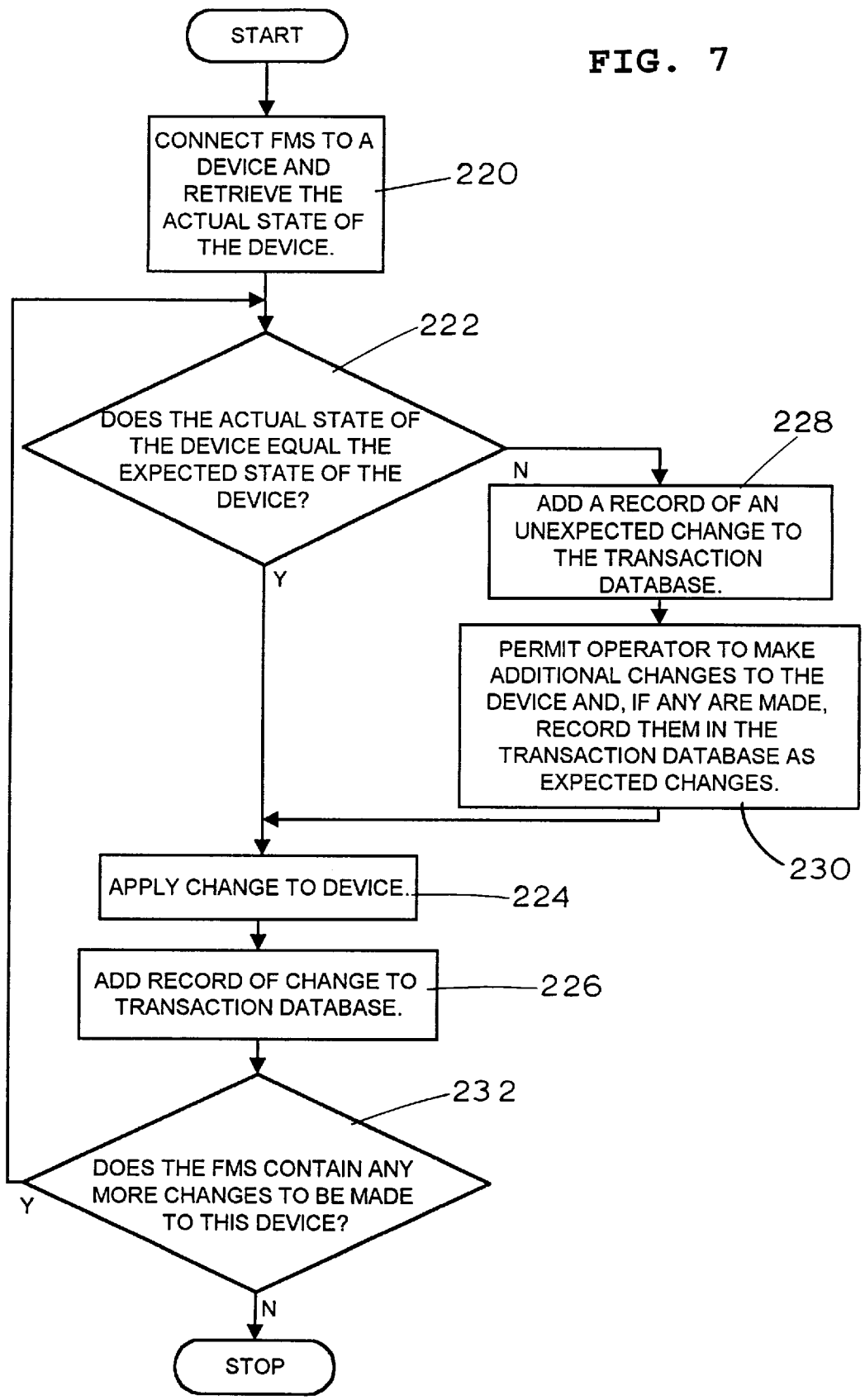
FIGS. 7–10 are flowcharts illustrating programming for a transaction database management system and method in accordance with the present invention.

After the secondary FMS system or laptop computer 46 is loaded with change instructions by the primary FMS system, a technician takes the secondary FMS system 46 into the field and connects it to the smart field devices 16, 18, 20 and/or 22, etc., of the process, to which changes are to be made and performs the following change-making operation (FIG. 7).

FIG. 7 depicts a flowchart illustrating how an FMS system 10 interacts with the transaction database 200 when making a change to a smart device 16, 18, 20, or 22 in the process 12. Of course, the FMS system 10 can change a device only if it is coupled to the device, whether electrically or via any other suitable mode of communication. As noted above, an FMS system 10 can have a permanent connection to a field device or a transient one. A transient connection between a secondary FMS system 46 and the FMS system 10 is shown by a dashed line 47 in FIG. 1, and another such connection is shown between a secondary FMS system 46 (which may additionally or alternatively represent a hand-held communicator 46) and a field device 20. If an FMS system 10 is permanently connected to a field device, it can make changes to the field device by itself. If the device is not permanently connected to the FMS system 10, the FMS system 10 can be used to make a change in the field device in two ways. First, the field device can be transported to the site of the FMS system 10 and interfaced with the FMS system 10 via a transient connection to a serial-interface or other port of the FMS system 10 so that, again, the FMS system 10 can make the change itself. Second, if interfacing the device with the FMS system 10 directly is impractical or inconvenient, a secondary FMS system 46 (FIG. 1) can be transiently connected to, or interfaced with, the FMS system 10 and instructed by the FMS system 10 to make the required changes. The secondary FMS system 46 is then disconnected from the FMS system 10 and taken by a field operator to each remote field device in which a change is to be made. The operator connects the secondary FMS system 46 to the field device, and the secondary FMS system 46 makes the change just as would the FMS system 10.

Hereinafter, for simplicity, the FMS system 10 and the secondary FMS system 46 are occasionally referred to as the primary FMS system and the secondary FMS system, respectively. It should be noted that these labels are merely arbitrary designations and that the primary and secondary FMS systems can be equivalent in structure and function, or the secondary FMS system can have reduced functionality compared to the primary, if desired.

The process by which an FMS system (whether primary or secondary) makes one or more changes to one or more parameters in a smart field device, such as the HART devices 16, 18, and 20 or the Fieldbus device 22 (FIG. 1), for example, is now described in detail with reference to FIG. 7.

The change-making process begins at a block 220 where the FMS system 10 or 46 connects to the smart field device to which a change is to be made and retrieves the actual state of that device by obtaining values from the device for all of the parameters of the particular block to which the change is to be made. A block 222 then compares the actual state of the device to the expected state of the device, which, as described above, was stored in the FMS system 10 before the FMS system 10 was connected to the device. When the primary FMS system 10 instructs a secondary FMS system 46 to make a change to a device, the primary FMS system 10 communicates the expected state of that device to the secondary FMS system 46.

If the block 222 determines that the actual state of the device equals the expected state, then a block 224 causes the FMS system 10 to apply the next change to the device, and a block 226 adds a record of that change to the transaction database 200 (FIG. 5). If the block 222 determines that the actual state of the device is not equal to the expected state of the device, then, before the block 224 applies the change to the device, a block 228 calculates an "unexpected" change and adds a record of the unexpected change to the transaction database 200 so that the transaction database 200 accurately reflects the present state of the device as it exists before the FMS system 10 makes the change.

Specifically, the unexpected change is the change that necessarily must have been made (unbeknownst to the FMS system 10) to change the state of the device from the state in which the FMS system 10 expected the device to be, on the one hand, to the actual state in which the FMS system 10 found the device, on the other hand. After the "unexpected" change record is added to the transaction database 200, a block 230 permits the operator of the FMS system 10 to make additional changes to the device and, if any such additional changes are made, the FMS system 10 stores transaction records in its transaction database 200 representing the additional changes. These additional changes are identified in the transaction database 200 as "expected" changes.

Thereafter, control passes to the block 224 which, as described above, applies the next change to the device. Once a record of that change is added to the transaction database 200 of the FMS system 10 by the block 226, a block 232 determines whether the FMS system 10 must make any further changes to the device to which it is connected. If so, control returns to the block 222 to repeat the foregoing process for the next change; if not, the process of FIG. 7 ends.

In addition to instructing a secondary FMS system to make changes, the primary FMS system 10 can download change instructions to a hand-held, intrinsically safe communicator 46, such as the Model 275-HC HART Communicator manufactured by Fisher-Rosemount Systems, Inc. Such a hand-held communicator 46 is used by a field operator to take change information to a HART field device located in an area remote from the primary FMS system and/or in a hazardous area where intrinsically safe instrumentation is required (secondary (laptop) FMS systems are unusable in such hazardous areas). The operator can connect the hand- held communicator 46 to the smart HART field device to make the changes.

The process by which a change is made to a smart field device using a hand-held communicator 46 (FIG. 1) is now described in detail in connection with FIG. 8.

Figure 8:
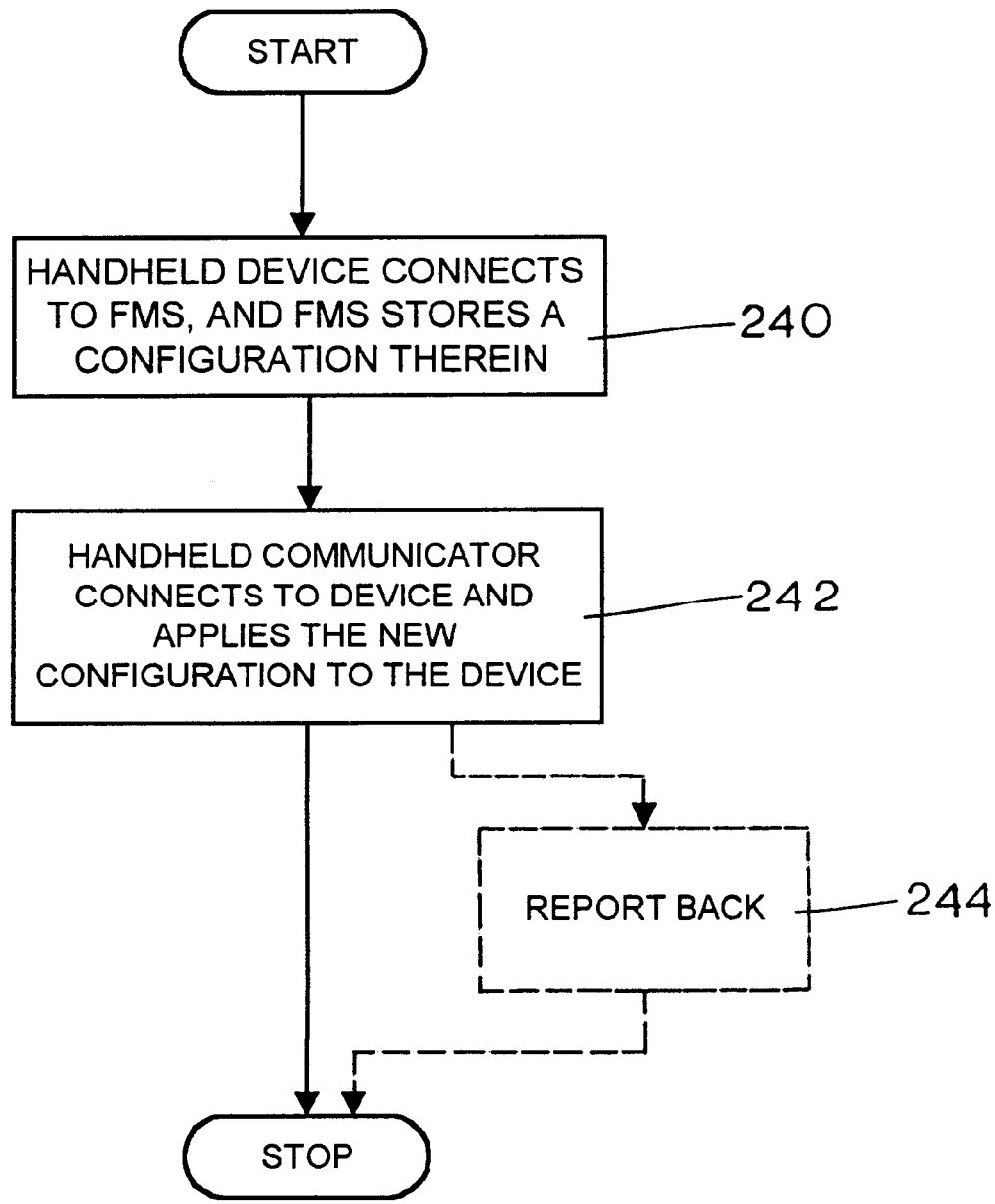

First, as shown in FIG. 1, a hand-held communicator 46 is connected to the FMS system 10, and the FMS system 10 stores a configuration for a particular device in the memory of the hand-held communicator 46, as indicated by a block 240 (FIG. 8). Of course, multiple configurations can be stored in the hand-held communicator 46 for multiple devices, if desired. In addition, the hand-held communicator 46 can receive configuration information from a secondary FMS system 46 in the same manner as it receives configuration information from the primary FMS system 10 as depicted in FIG. 1.

After the hand-held communicator 46 is loaded with configuration information for one or more smart field devices 16, 18, 20, 22, the hand-held communicator 46 is connected to one of the smart field devices where the communicator 46 applies the new configuration for that device to the device as indicated by a block 242.

A configuration includes all of the same information as a change referred to above in connection with the primary and secondary FMS systems 10 and 46. Further, a configuration can include new values for either some (a partial configuration) or all (a full configuration) of the parameters of a device. The difference between a configuration and a change is simply that a configuration, unlike a change, does not include an indication of a time. The reason for this difference is that cost constraints on hand-held communicators 46, and the desire that they be very simple to use, prevent them from providing a time-keeping function. Hence, the procedure illustrated in FIG. 8 by which a hand-held communicator 46 makes a change to a device is rather simple compared to the procedure illustrated in FIG. 7 by which an FMS system 10 makes such a change. As a result, however, the operations that can be performed by a hand-held communicator are rather unsophisticated compared to the operations of an FMS system 10.

Optionally, as indicated by a block 244, shown in phantom lines in FIG. 8, the hand-held communicator 46 can read back the entire state of the device to which it is connected, and return that state to the primary FMS system 10 (or to a secondary FMS system 46), so that the FMS system 10 or 46 can reconcile the new state of the device with the transaction database 200 of the FMS system. Typically, a plant might require this procedure as part of a standard operating procedure in situations where it is essential to ensure that the changes that an FMS system 10 instructs a hand-held communicator 46 to make are actually made. Importantly, when an FMS system 10 communicates a configuration to a hand-held communicator 46, the FMS system 10 inserts a transaction in its transaction database 200 to reflect the change corresponding to the configuration. The transaction record is designated as an expected change, because the FMS system 10 presumes that the hand-held communicator 46 will in fact make the change.

As described above, multiple FMS systems can be interconnected so that data in their respective transaction databases 200 can be merged to form a consistent global view of the plant serviced by the multiple FMS systems. This capability facilitates the review of historical information about the operation of a plant, such as by auditors responsible for ensuring the compliance of the plant with the regulatory requirements of various governmental agencies as described above, and also with the guidelines or rules established by plant safety groups.

Figure 9:
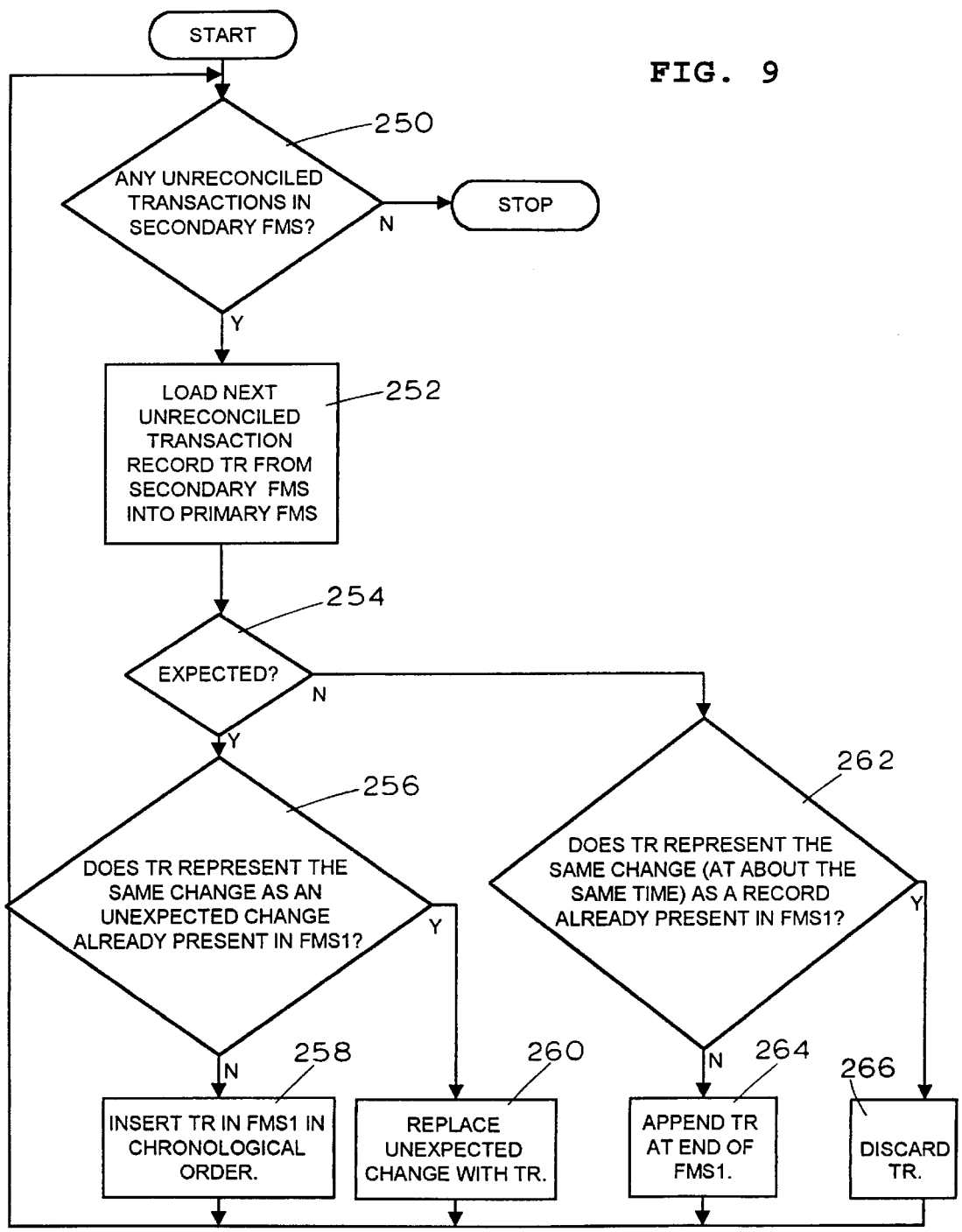
Figure 10:
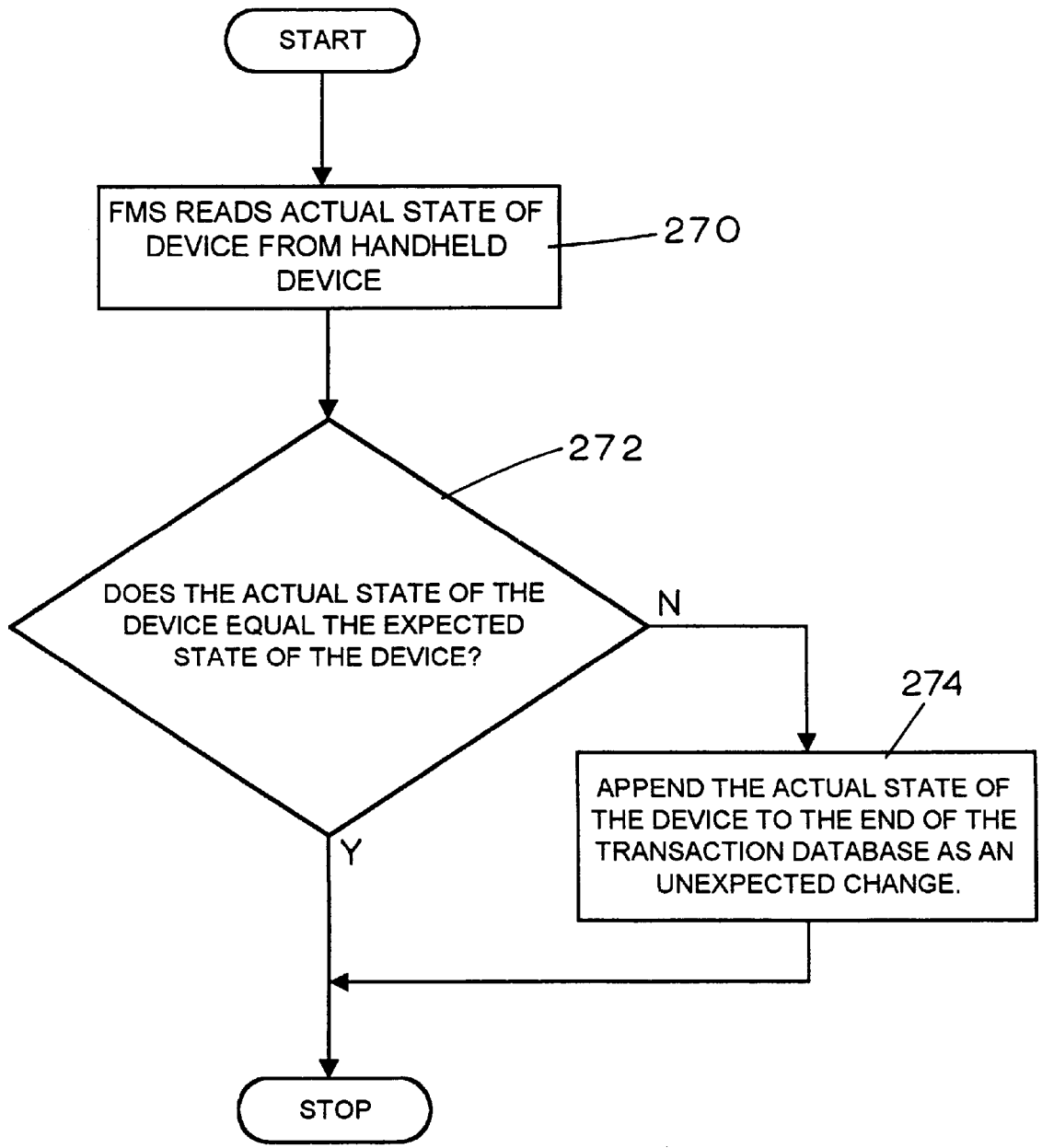

FIG. 9 depicts a flowchart illustrating a process by which the transaction database 200 of one FMS system (e.g., a secondary FMS system 46) can be merged into the transaction database 200 of another FMS system (e.g., a primary FMS system 10). As indicated previously herein, any FMS system can serve as a primary or as a secondary, but the "primary FMS" designation typically refers to a stationary system; secondary FMS systems typically reside in laptop computers which may not always be readily accessible when needed, such as for a compliance audit. In the following description, the labels FMS1 and FMS2 refer to the transaction databases 200 of the primary and secondary FMS systems, respectively.

Initially, a block 250 determines whether any unreconciled transaction records are present in the secondary FMS system 46. If not, or when all unreconciled transactions in the secondary FMS system 46 have been reconciled, the process of FIG. 9 is finished. If unreconciled transactions remain in the secondary FMS system 46 (i.e., transaction records which have not yet been reconciled into the transaction database 200 of the primary FMS system 10), then a block 252 loads the next unreconciled transaction record (referred to herein as TR) from the memory of the secondary FMS system 46 into the memory of the primary FMS system 10. A block 254 then examines the transaction record TR to determine whether the change represented by that transaction record is an expected change. If it is, then a block 256 determines whether the transaction record TR represents the same change as a change which is already present in the primary FMS transaction database FMS1 but which is designated as an "unexpected" change in FMS1. If the change represented by the transaction record TR does not match an unexpected change in FMS1, then the transaction record TR is inserted in the primary FMS transaction database FMS1 in chronological order, and control returns to the block 250 to determine whether any further unreconciled transaction records remain in the secondary FMS system 46. If the change represented by the transaction record TR does match an unexpected change present in the transaction database FMS1, as determined by the block 256, then a block 260 replaces that unexpected change with the transaction record TR (which is an expected change), and control then returns to the block 250.

If, on the other hand, the block 254 determines that the transaction record TR represents a change which is unexpected, then control passes to a block 262 which determines whether the primary FMS transaction database FMS1 contains a transaction record representing the assignment of the same value to the same parameter as the change represented by the transaction record TR, and which transaction record bears a TimeKey (field 205, FIG. 6) which approximates the TimeKey of the transaction record TR to within some predetermined acceptable temporal tolerance. If no such transaction record is present in FMS1, then a block 264 appends the transaction record TR at the end of the primary FMS transaction database FMS1 and designates the change represented by that transaction record as "unexpected" by setting the Expected field 213 of the record 202 corresponding to that change in the FMS transaction database FMS1 accordingly. Thereafter, control returns to the block 250 to check for more unreconciled transaction records 202 in the secondary FMS system 46. If the block 262 determines that a change resembling the unexpected change represented by the transaction record TR does already appear in the primary FMS transaction database FMS1, then a block 266 discards the transaction record TR, inasmuch as the actual change corresponding to the unexpected transaction record TR is already represented by a transaction record 202 in the transaction database FMS1. Again, control thereafter returns to the block 250 to check for more unreconciled transactions in the secondary FMS system 46.

Several examples of the use of the FMS transaction database 200 are described below in detail in connection with the accompanying tables. In the first example, a primary FMS system 10 (P_FMS) instructs a secondary FMS system 46 (S_FMS) to make a future change CF (i.e., a change for which no time is yet specified) to a particular smart field device (refer to the table entitled "Example 1"). This example illustrates what happens to the primary and secondary FMS systems and to the device as this instruction is carried out and the result is reported back to the primary FMS system 10 by the secondary FMS system 46.

Example 1

| Occurrence | Time | P_FMS | S_FMS | Device |
|---|---|---|---|---|
| Primary FMS database (P_FMS) and secondary FMS database (S_FMS) accurately reflect actual state of Device. | i | S(i) | S(i) | S(i) |
| Primary FMS instructs secondary FMS to make change CF to Device. | i + 1 | S(i) | S(i); also holds record of change CF | S(i) |
| Secondary FMS attempts to make change C(i + 1) to Device. Prior actual state S(i) of Device matches state S(i) expected by S_FMS so change C(i + 1) is made and is recorded in S_FMS designated as "expected." Device is now in state S(i + 1). | i + 2 | S(i) | S(i + 1) | S(i + 1) |
| Secondary FMS reports change C(i + 1) to primary FMS, which reconciles that change into P_FMS. | i+3 | S(i + 1) | S(i + 1) | S(i+1) |

The first row of the foregoing table describes the primary and secondary FMS systems in the field device at some arbitrary time i. At time i, the actual state of the device is S(i), and this state is accurately reflected in the transaction databases 200 of the primary FMS system 10 and the secondary FMS system 46.

At a later time i+1, the primary FMS system 10 instructs the secondary FMS system 46 to make a future change to the device. Therefore, at this time, the device remains in the state S(i). Further, the primary and secondary FMS transaction databases P_FMS and S_FMS continue to accurately reflect that the actual state of the device is S(i), but the transaction database 200 of the secondary FMS system 46 now holds a transaction record 202 representing the future change CF.

At yet a later time, the secondary FMS system 46 is connected to the device and attempts to make the future change, designated C(i+1), to the device. Because the secondary FMS system 46 detects that the prior actual state S(i) of the device matches the state S(i) that the secondary FMS system 46 expected for the device, the secondary FMS system 46 makes the change to the device and records in its transaction database S_FMS a transaction record 202 corresponding to the change. Because the change was made to the device, the device is now in state S(i+1), and because the transaction record for that change (which, incidentally, is designated as an expected change in the transaction database 200), the expected state of the device reflected in the transaction database 200 of the secondary FMS system 46 is also updated to S(i+1). However, because the primary FMS system 10 has not yet been informed that the secondary FMS 46 has successfully made the future change CF, the primary FMS system 10 maintains S(i) as the expected state for the device.

When the secondary FMS system 46 connects to the primary FMS system 10 at time i+3 and communicates the transaction record corresponding to the change C(i+1) to the primary FMS system 10, the primary FMS system 10 reconciles that transaction record into its primary FMS transaction database 200 as described above in connection with the process of FIG. 9. Specifically, because the incoming transaction record was designated as an expected change, and because the change had not yet been entered in the primary FMS transaction database 200 as an unexpected change (presuming that it really had not been), the transaction record for the change C(i+1) is entered into the primary FMS transaction database 200 in chronological order by the block 258 (FIG. 9) such that the expected state of the device as now reflected by the transaction database 200 of the primary FMS system 10 accurately reflects the actual state of the device, namely S(i+1).

If, instead, when the transaction record representing the change C(i+1) was reconciled with the primary FMS transaction database 200, a matching unexpected change was determined to be present in the primary FMS transaction database 200, then the transaction record for the expected change C(i+1) would have been inserted in place of the transaction record 202 for the corresponding unexpected change in the primary FMS transaction database 200.

Another example, which illustrates the reconciliation of a transaction record 202 representing an "unexpected" change into the primary FMS transaction database 200 is now described in detail with reference to the following table, entitled "Example 2."

Example 2

| Occurrence | Time | P_FMS | S_FMS1 | S_FMS2 | Device |
|---|---|---|---|---|---|
| Primary FMS database (P_FMS) and secondary FMS databases (S_FMS1 and S_FMS2) accurately reflect actual state of Device. | i | S(i) | S(i) | S(i) | S(i) |
| Secondary FMS1 instructed to make change C(i + 1) to Device. Secondary FMS2 instructed to make future change CF to Device. | i + 1 | S(i) | S(i); also holds record of change C(i + 1) | S(i); also holds record of future change CF | S(i) |
| Secondary FMS1 makes change C(i + 1) to Device. Secondary FMS2 has not yet made future change CF. | i + 2 | S(i) | S(i + 1) | S(i); also holds record of future change CF | S(i + 1) |
| Secondary FMS2 attempts to make future change CF and detects unexpected state S(i + 1) (resulting from change C(i + 1) made by secondary FMS1). Secondary FMS2 then records a corresponding unexpected change CU in S_FMS2 and makes the change CF to the Device. | i + 3 | S(i) | S(i + 1) | S(i + 2); also holds record of unexpected change CU | S(i + 2) |
| Secondary FMS2 reports unexpected change CU and authorized change C(i + 2) to primary FMS. | i + 4 | S(i + 2); CU added to P_FMS database | S(i + 1) | S(i + 2) | S(i + 2) |
| Secondary FMS1 reports change C(i + 1) to primary FMS, which reconciles that change into P_FMS database. | i + 5 | S(i + 2), CU replaced by C(i + 1) in P_FMS database | S(i + 2) | S(i + 2) | S(i + 2) |

In this example, a primary FMS system 10 and two secondary FMS systems 46 accurately reflect the actual state S(i) of a device at an initial time i.

At a later time i+1, the primary FMS system 10 instructs the first secondary FMS (FMS1) to make a change C(i+1) to a device. Also at that time, the primary FMS system 10 instructs the second secondary FMS (FMS2) to make a future change CF to the same device. Therefore, at time i+1, the transaction databases 200 of the primary FMS system and the first and second secondary FMS systems accurately reflect the actual state S(i+1) of the device. In addition, a record of the change C(i+1) is stored in the first secondary FMS system 46, and a record of the future change CF is stored in the second secondary FMS system 46.

At a later time i+2, FMS1 makes the change C(i+1) to the device according to the procedure described above in connection with FIG. 7. Consequently, at this time, FMS1 accurately reflects the actual state S(i+1) in its transaction database 200, while the primary FMS PFMS and the second secondary FMS FMS2 continue to reflect the prior state S(i) of the device in their respective transaction databases 200. Also, FMS2 still holds a transaction record for the future change CF which has not yet been made.

At a later time i+3, FMS2 attempts to make the future change CF to the device and detects that the device is in an unexpected state S(i+1) (i.e., a state other than the state S(i) which the transaction database 200 of the FMS2 reflects). FMS2 therefore computes the unexpected change CU that must have been made to change the device state from S(i) (expected by FMS2) to S(i+1) (the actual state of the device). FMS2 then records a transaction record corresponding to the unexpected change CU in its transaction database 200 and then makes the future change CF to the device and records a transaction record corresponding to the change CF together with a current TimeKey in the transaction database 200 of FMS2. Therefore, the transaction database 200 of FMS2 now accurately reflects the current state S(i+2) of the device, and the transaction database 200 of FMS2 further includes a record of the unexpected change CU which FMS2 recognized to have been made to the device.

Later still, at time i+4, the secondary FMS system FMS2 is connected to the primary FMS system 10 and reports the unexpected change CU and the now-made, authorized change C(i+2) to the primary FMS system 10. The transaction records for these two changes are then reconciled by the primary FMS system 10 into its transaction database 200 according to the procedure of FIG. 9, so that the transaction database 200 of the primary FMS system 10 accurately reflects the actual state S(i+2) of the device and includes transaction records corresponding to the changes CU and C(i+2). The primary FMS FMS1 still reflects that it expects a state of S(i+1) for the device, while the secondary FMS FMS2 accurately reflects the actual state S(i+2) of the device.

At yet a later time i+5, FMS1 is connected to the primary FMS system 10 and reports change C(i+1) thereto. The primary FMS system 10 reconciles the transaction record for change C(i+1) into its transaction database 200 and finds that C(i+1) matches the unexpected change CU entered into the transaction database 200 of the primary FMS system 10 during time i+4. Therefore, in accordance with the block 260 (FIG. 9), the transaction record for the change C(i+1) replaces the transaction record for the unexpected change CU in the transaction database 200 of the primary FMS system 10. Therefore, at this time, all outstanding transaction records 202 have been reconciled into the primary FMS transaction database 200, which now accurately reflects the actual current state of the device S(i+2) and also, very importantly, a complete historical accounting of the configuration history of the device (i.e., a device configuration history).

The functionality of the interface block 58 will now be described in more detail. As noted above, during operation, the current application 56 calls the interface block 58 to initialize one or more specific controls which, thereafter, automatically handle all operations associated with interfacing between the Windows operating system 46, the smart devices within the process 12 and/or the FMS database 40 with respect to a device, a block, or a parameter associated with the process 12. The interface block 58 may also change the Time property of the Root object stored in the memory of the server network 66 to control displays in an advantageous manner.

Each control of the interface block 58 displays and updates information pertaining to a device, a block, a parameter, or a time on the display 30; communicates with the smart devices, the database 40, and the server network 66 in response to user or application inputs to retrieve data from, or write data to, the DDS 72, the smart devices, the database 40, or the Root object in the server network 66, without further involvement of the current application 56. Importantly, once established, a control generally appears to run independently of the current application 56 and of other controls which may have been established.

Figure 11:
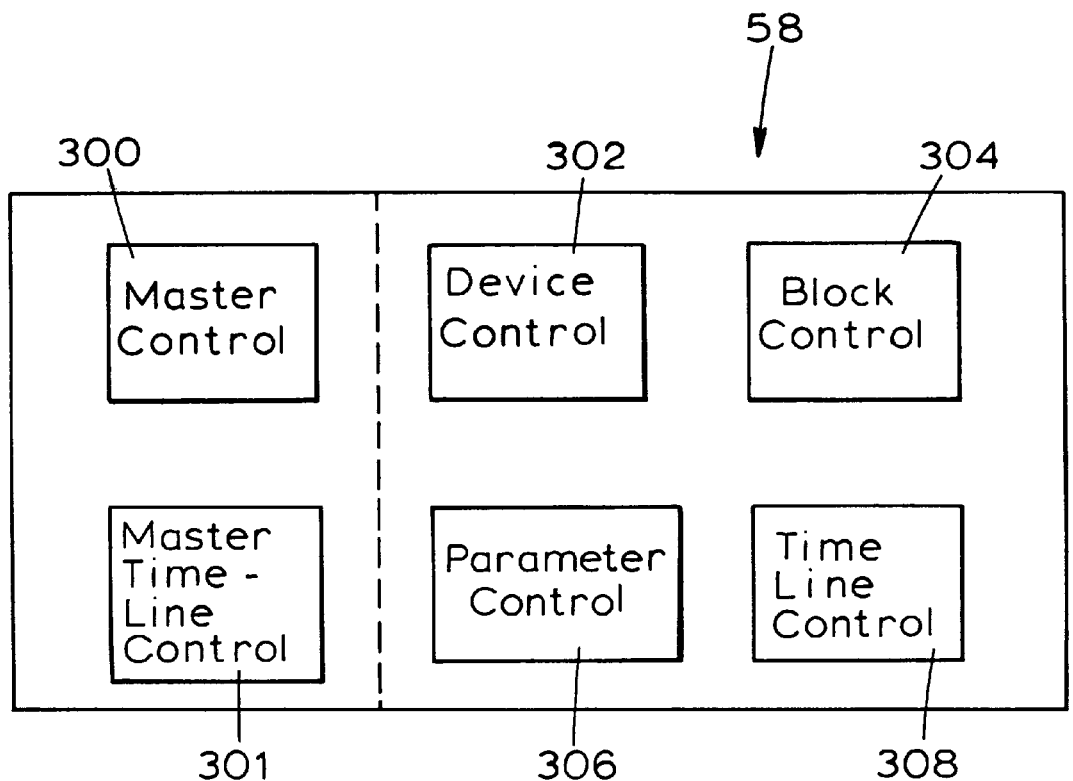
FIG. 11 illustrates the control block of FIG. 2.

As illustrated in FIG. 11, the interface block 58 includes a master control routine 300 which can be used to implement control functions, including control functions relating to a device, a block, or a parameter associated with the process 12. The interface block 58 also includes a master timeline control routine 301 which can be used to implement control functions such as reading and writing times from the Root object and changing time values from the database 40.

When the current application 56 calls the interface block 58 to implement a device, block, parameter or timeline control, one of the master control routines 300 or 301 is, in effect, copied and converted into a specific control routine or control. Such specific controls are illustrated in FIG. 11 as a device control 302, a block control 304, a parameter control 306 and a timeline control 308. The specific controls 302, 304, 306, 308 thereafter automatically handle functions related to communication between the Windows operating system 46, the current application 56, the database 40 (through the DCI 60), the DDS 72 (through the DCI 60), and the on-line smart devices (through the DCI 60) as those communications relate to the specific devices, blocks, parameters, or timelines for which the controls are created. Once established, each of the controls 302, 304, 306, 308 operates continuously and independently of the other controls and the current application 56. Any number of the same and/or different control types can be implemented to operate at the same time.

While FIG. 11 illustrates the controls 302, 304, 306, 308 as separate routines which are copies of one of the master control routines 300 or 301, controls 302, 304, 306, 308 can also contain the data necessary to implement a particular device, block, parameter, or timeline control using one of the master control routines 300 or 301.

Figure 12:
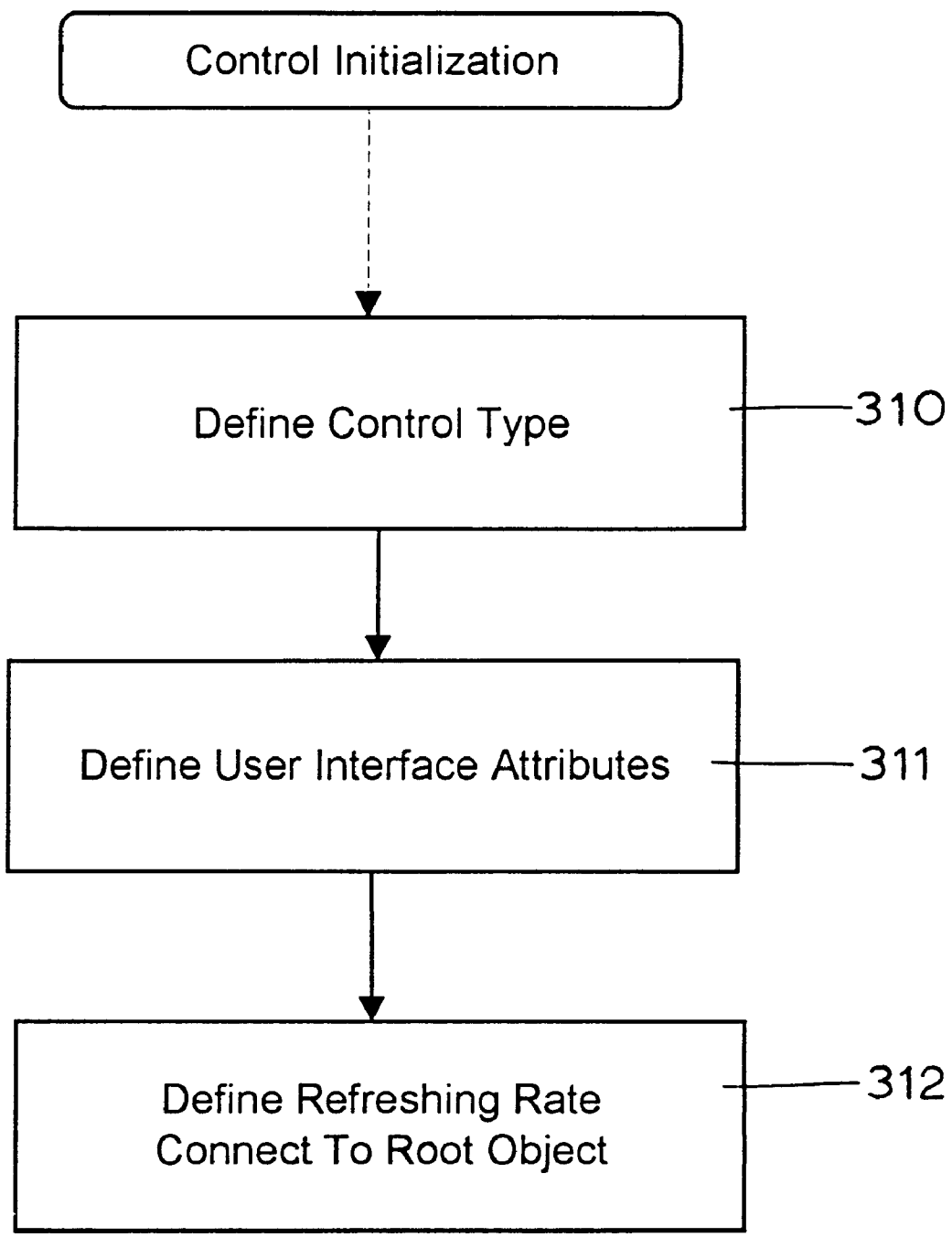
FIG. 12 is a flowchart illustrating the initialization steps associated with a control constructed according to the present invention.

FIG. 12 generally illustrates the steps that should be performed by, for example, the current application 56 to initialize a control, including any of the controls illustrated in FIG. 11. A block 310 defines the type of the control, for example, a device, a block, a parameter, or a timeline control, by providing the interface block 58 with a unique moniker pointing to the OLE object within the hierarchy of FIGS. 3 and 4A–4C with which the control is associated. Because, conceptually, an instantiation of the hierarchy of FIGS. 3 and 4A–4C exists for each time available to the FMS application, the timeline control specifies the Root object of a particular hierarchy by specifying, for example, the time and view of the Root object with which the control is associated.

A block 311 defines the user interface attributes including, for example, the fonts, sizes, etc., of display characters, the style in which the information is to be displayed, the display screen location at which the control information is to be displayed, the initial window size of the control display if the size of a control display is capable of being changed by the user, and the so-called "visibility" of the control. Control visibility defines whether the control will actually displayed or be visible on the screen. While an invisible control still operates to retrieve data from its associated OLE object and may provide such information to the current application 56, the user interface operations of that control are simply disabled.

A block 312 defines the refresh rate of the control (i.e., the rate at which the control will receive information from its associated OLE object in a periodic read). In effect, the block 312 connects the control to a particular Root object of the hierarchy in FIGS. 3 and 4A–4C, and the Root object defines the rate at which the OLE object will refresh data in response to a periodic read.

Figure 13:
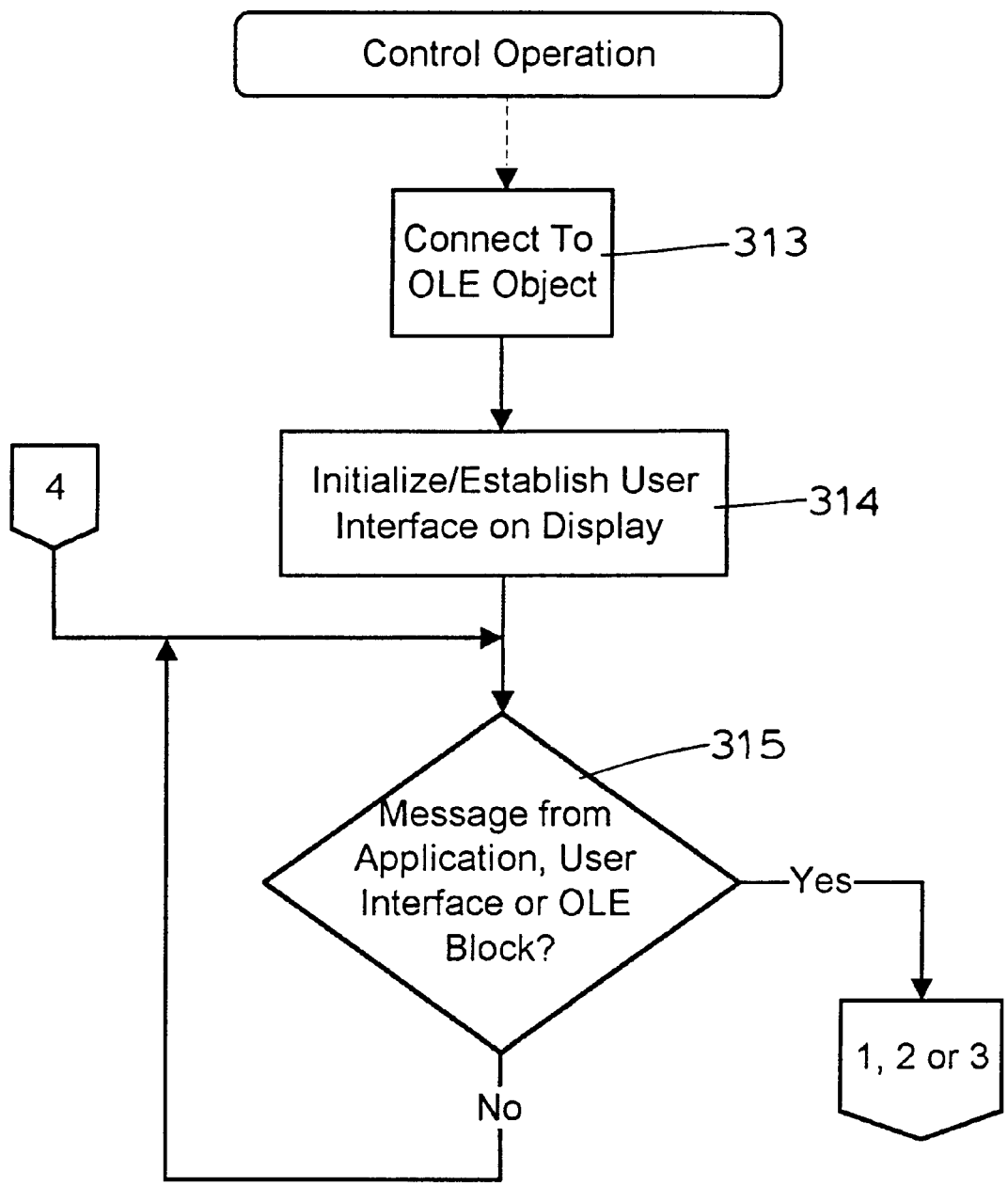
FIGS. 13–19 are flowcharts illustrating the operation of a control according to the present invention.

FIG. 13, illustrates the general operation of a control routine which can be used for the device control, the block control, the parameter control and the timeline control of FIG. 11. A block 313 connects to or establishes a connection to the proper OLE object as defined by the hierarchy of FIGS. 3 and 4A–4C and the moniker provided by the current application 56. Specifically, the control sends a command through the DCI 60 to the server network 66 to read information, for example, the properties, of the OLE object associated with the control. Preferably, this command is a periodic read which tells the OLE object, such as a device, a block or a parameter object, to periodically send the requested data to the control.

In response to the read, the server network 66 establishes a connection to the OLE object by retrieving the data thereof from the DDS 72, the smart devices and/or the database 40, and stores that data as the OLE object in a server network memory. To perform this read function, however, the server network 66 must also store in its memory the data pertaining to the Device and/or Block objects above the requested OLE object as defined by the hierarchy of FIGS. 3 and 4A–4C. When stored in the server memory, the requested OLE object data is sent to the DCI 60 and then to the interface block 58 where this data may be stored in a memory or control cache associated with the interface block 58.

Figure 20:
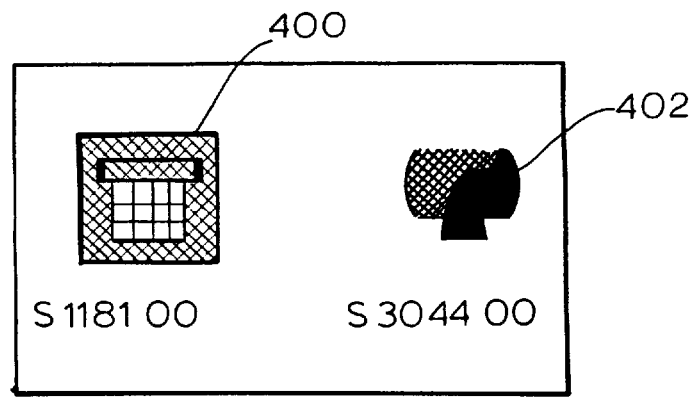
FIG. 20 is a screen display which can be generated by a set of device controls in accordance with the present invention.
Figure 21:
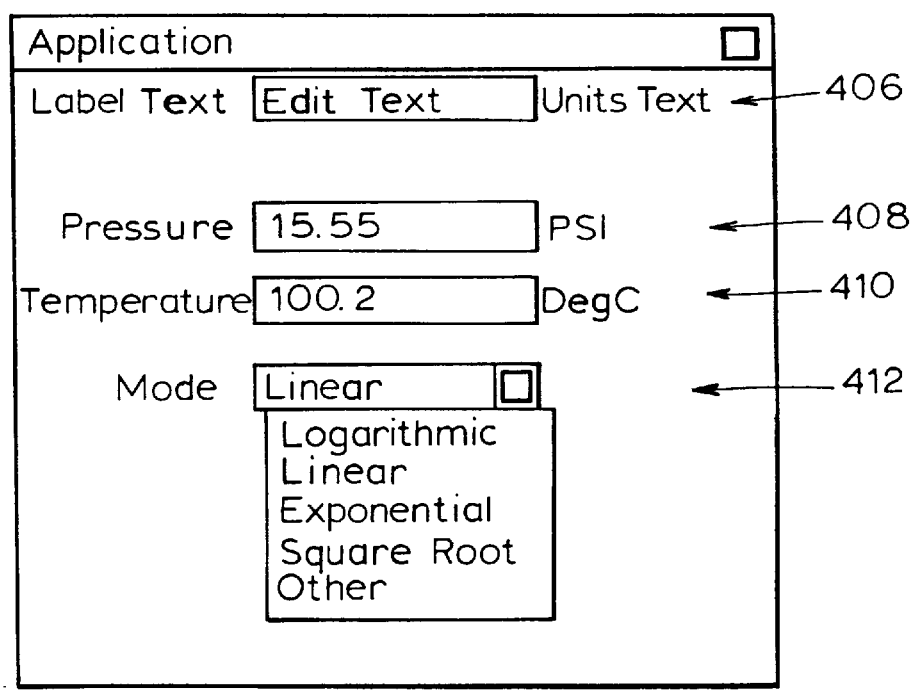
FIG. 21 is a screen display which can be generated by a set of parameter controls according to the present invention.
Figure 22:
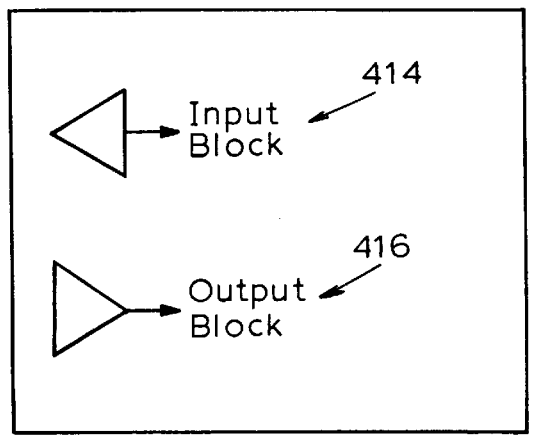
FIG. 22 is a screen display which can be generated by a set of block controls according to the present invention.

A block 314 then establishes or initializes a user interface screen on the display 30 for the particular control as defined by the user interface attributes provided to the control by the block 311 of FIG. 12. The display attributes may be configured to display control information in any desired manner using standard Windows calls and Windows formats. An exemplary screen for each of the device, parameter, block, and timeline controls is illustrated in FIGS. 20–22.

Next, a block 315 checks to see if any messages have been received from the application, the user interface via the Windows operating system 46, or an OLE block through the DCI 60. If no such messages have been received, the block 315 continually re-checks for such messages. When the block 315 receives a message, control is transferred as indicated by the identifiers labeled 1, 2, and 3.

Figure 14:
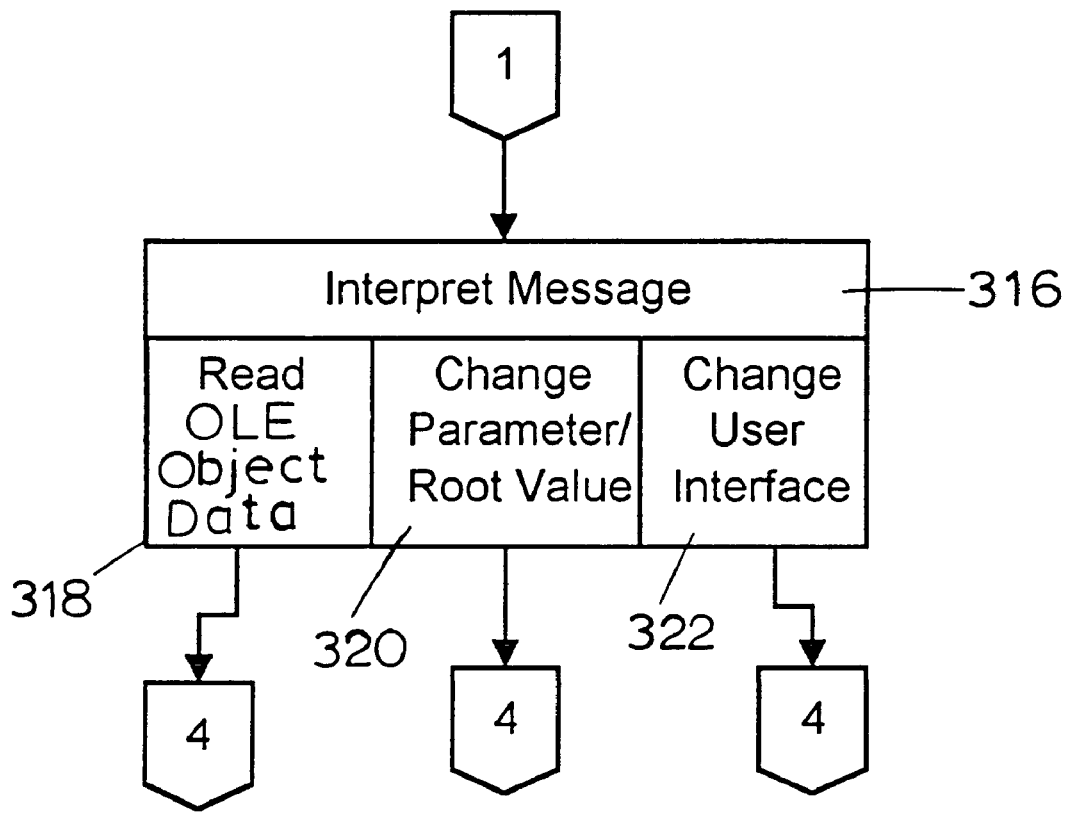

FIG. 14 illustrates the operation of a control in response to a message from the current application 56. A block 316 interprets the message which can be of three general types, including a read OLE object data message, a change Parameter object value, or a Root object value message and a change user interface message. In response to a read OLE object data message, a block 318 reads the requested data from the referenced OLE object of FIGS. 3 and 4A–4C. For example, a device control may read the DeviceID property or the "Tag" collection of a Device object while a block control may read the Name property or the "Param" collection of a Block object. A parameter control might read parameter properties such as the value or name of a VariableParameter object. A timeline control can read Root object properties and may obtain a list of times for which Root objects exist in the past from the database 40. Thereafter, the block 318 returns control to the block 315.

In response to a change-parameter or root-value message, a block 320 implements a change to the referenced parameter object, for example, the VariableParameter object, RecordParameter object, or ArrayParameter object of FIGS. 4A–4C and returns control to the block 315. In response to a change-user-interface message, a block 322 implements a change of the user interface and returns control to the block 315.

Figure 15:
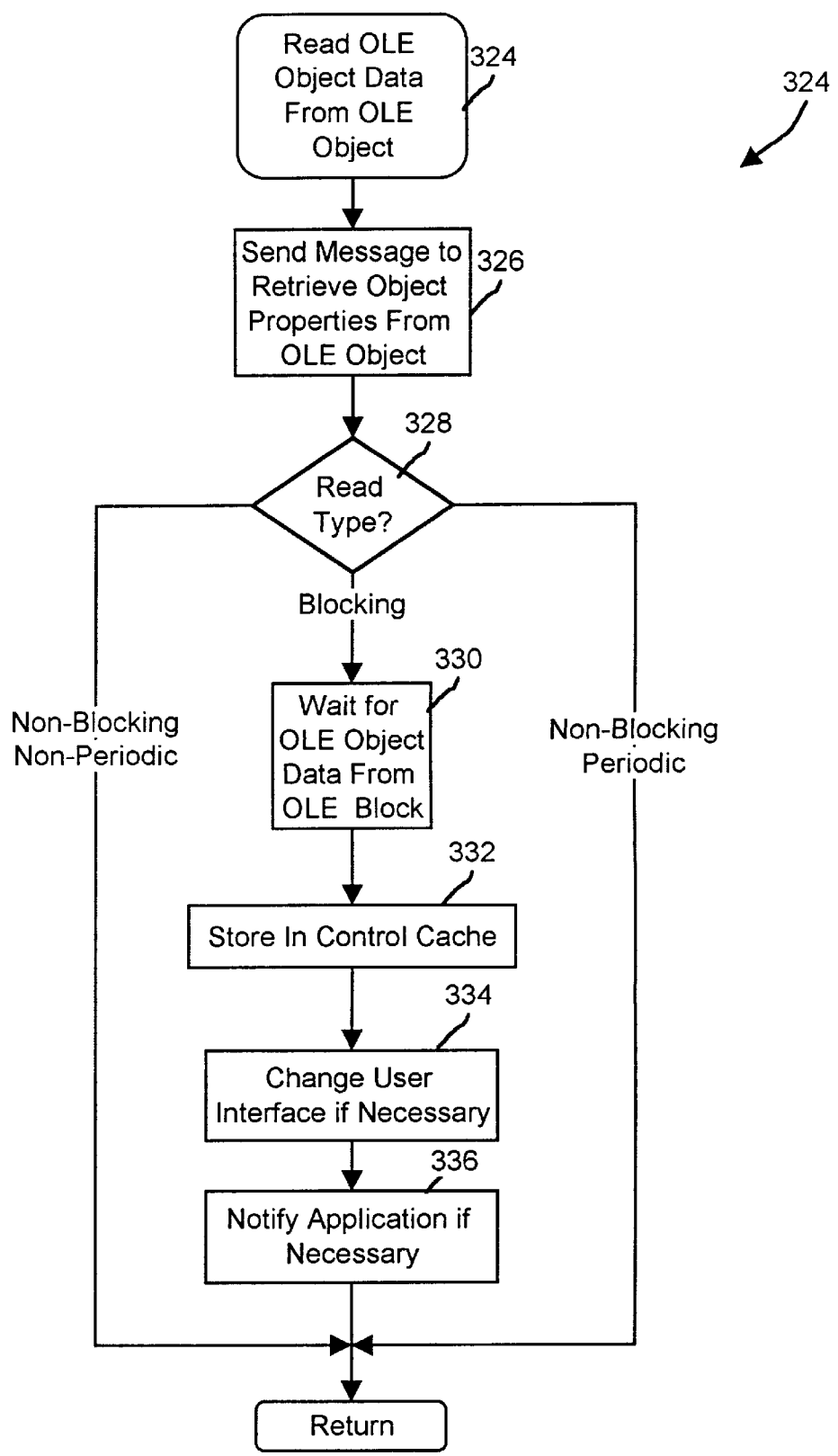

FIG. 15 illustrates a routine 324 which is implemented by a control during a read OLE object data procedure. Specifically, a block 326 sends a message through the DCI 60 to the OLE object associated with the control to retrieve data from that OLE object. Thereafter, a block 328 determines what type of read message was received. If a non-blocking, non-periodic or a non-blocking, periodic read message was received, the block 328 returns control to the block from which the routine 324 was called. A non-blocking read refers to one in which the control sends a read message to the OLE object associated with the control and does not wait for a response from the OLE object before continuing with other functions. A non-periodic read is a request for a single, one-time read from the OLE object associated with the control. A periodic read instructs the OLE object to periodically notify the control of changes which occur to data within the OLE object at a rate defined within the Root object associated with that OLE object.

If, however, the read was a blocking read, which is always a non-periodic read, a block 330 waits for the return data requested from the OLE object. Next, a block 332 stores the received OLE object data in the control cache. If necessary, a block 334 changes the user interface by calling a user interface change routine described hereinafter to reflect the new data obtained by the read. A block 336 notifies the current application 56 if the application has identified that it wants to receive messages or data changes from OLE object data reads during, for example, initialization of the control. Thereafter, control is returned to whatever block called the routine 324.

Figure 16:
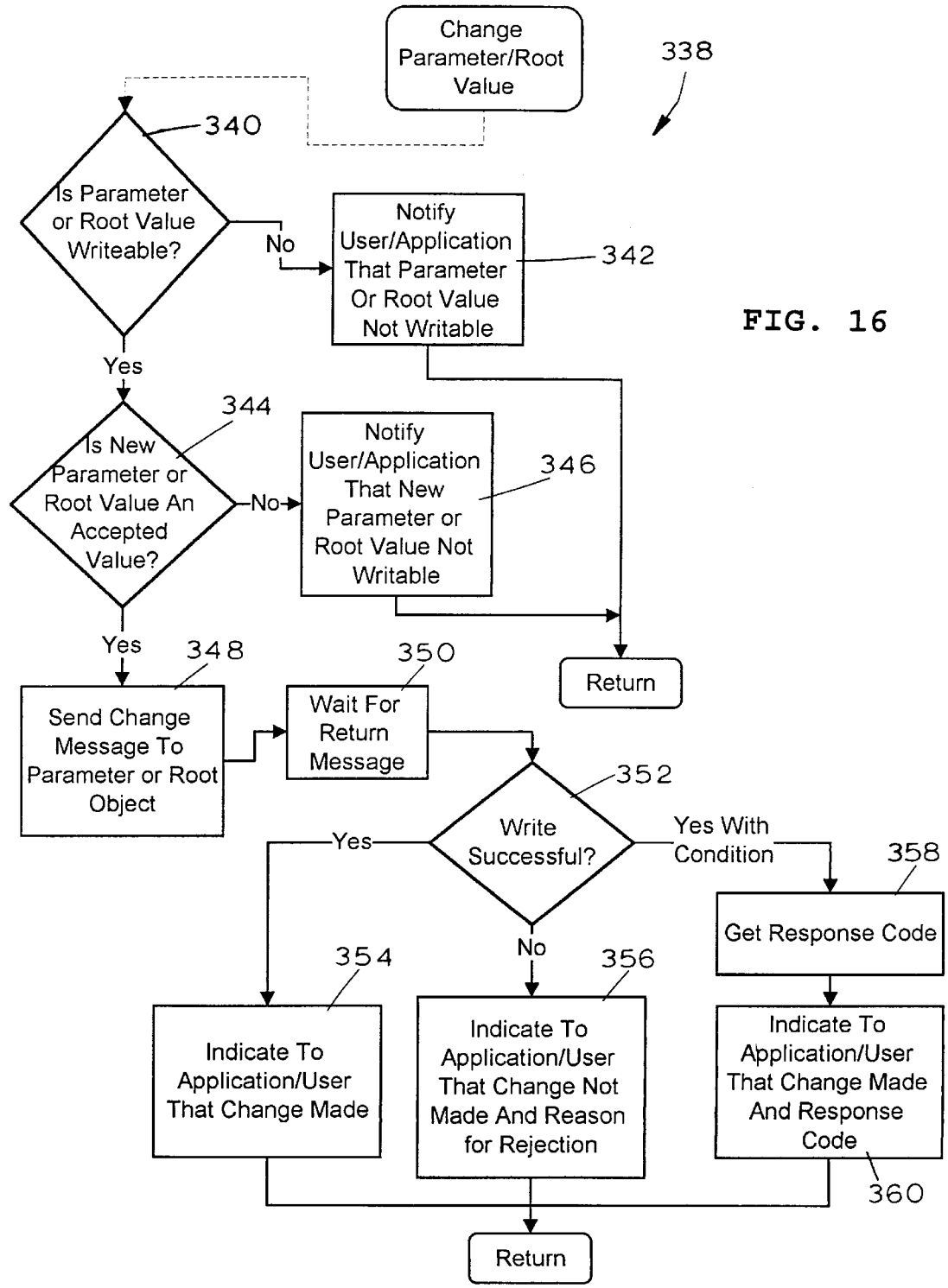

FIG. 16 illustrates a routine 338 which is implemented by a control during a change of a parameter or root value of an OLE parameter object (such as the VaribleParameter object) or a Root object. A block 340 determines whether the parameter or root value indicated to be changed is writable. In essence, the block 340 sends a message to read the handling properties of the OLE object and determines whether the parameter value is writable. If the block 340 determines that the parameter or root data value is not writable, a block 342 notifies the user or the current application 56 that the parameter or root value is not writable, such as by calling the change-user interface routine described below. Thereafter, control is returned to the block from which the routine 338 was called.

If, on the other hand, the block 340 determines that the parameter or root value is writable, a block 344 determines if the new parameter value (or root value) is an accepted value. To perform this function, the block 344 reads, for example, the value characteristics of the parameter object associated with the control such as the minimum value, the maximum value and the type of value accepted which may be, for example, a variable, an enumerated set, etc. If, thereafter, the block 344 determines that the new value is out of range or of the wrong type, a block 346 may send a message to the application and/or may change the user display to indicate that an unacceptable value has been entered. Thereafter, control is returned to the block which called the routine 338.

If the block 344 determines that the new value is an accepted value for a parameter or a root object, a block 348 sends a change message to the correct OLE parameter or root object through the DCI 60. The new value is then changed in the OLE object which, of course, may cause a corresponding change in a smart device or in the database 40.

A block 350 waits for a return message and a block 352 decodes the return message to determine if the write was successful. If the write was successful, a block 354 may indicate to the application and/or to the user via the user interface that the change was made (e.g., by changing the color of the background of the data on the screen).

If the block 352 determines that the write was not successful, a block 356 indicates to the application and/or to the user via the user interface that the change was not made (e.g., by changing the data on the screen to its original state). Incidentally, the response codes associated with an OLE object are always available to an application so that the reason for the rejection can be determined and/or displayed to the user.

If the block 352 determines that the change was made but that a write condition exists, a block 358 retrieves a response code from the OLE object by specifically initiating a proper read from the OLE object. A block 360 then indicates to the application, and/or to the user if desired, that the change was made but that a write condition exists. The block 360 may also indicate the type of condition that exists (e.g., that the OLE object property was set to the nearest available possible value). Each of the blocks 354, 356, and 360 returns control to the block which called the routine 338.

Figure 17:
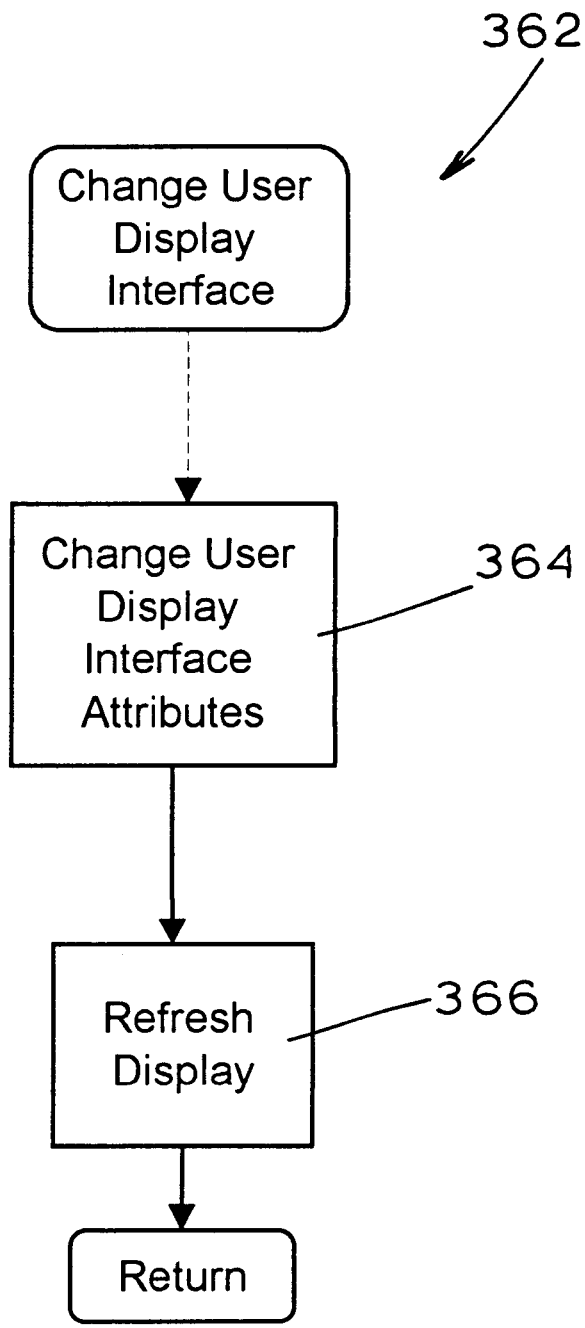

FIG. 17 illustrates a routine 362 which is implemented by a control to change the user interface display. A block 364 changes the display interface attributes in conjunction with new attributes provided by the current application 56, or in accordance with a set of attributes previously defined by the control for the condition which now exists. These previously defined attributes may be stored in a memory associated with the control, such as the control cache. A block 366 refreshes the user display using the new user display attributes and the data in the control cache which is to be displayed. Thereafter, control returns to the block from which the routine 362 was called.

Figure 18:
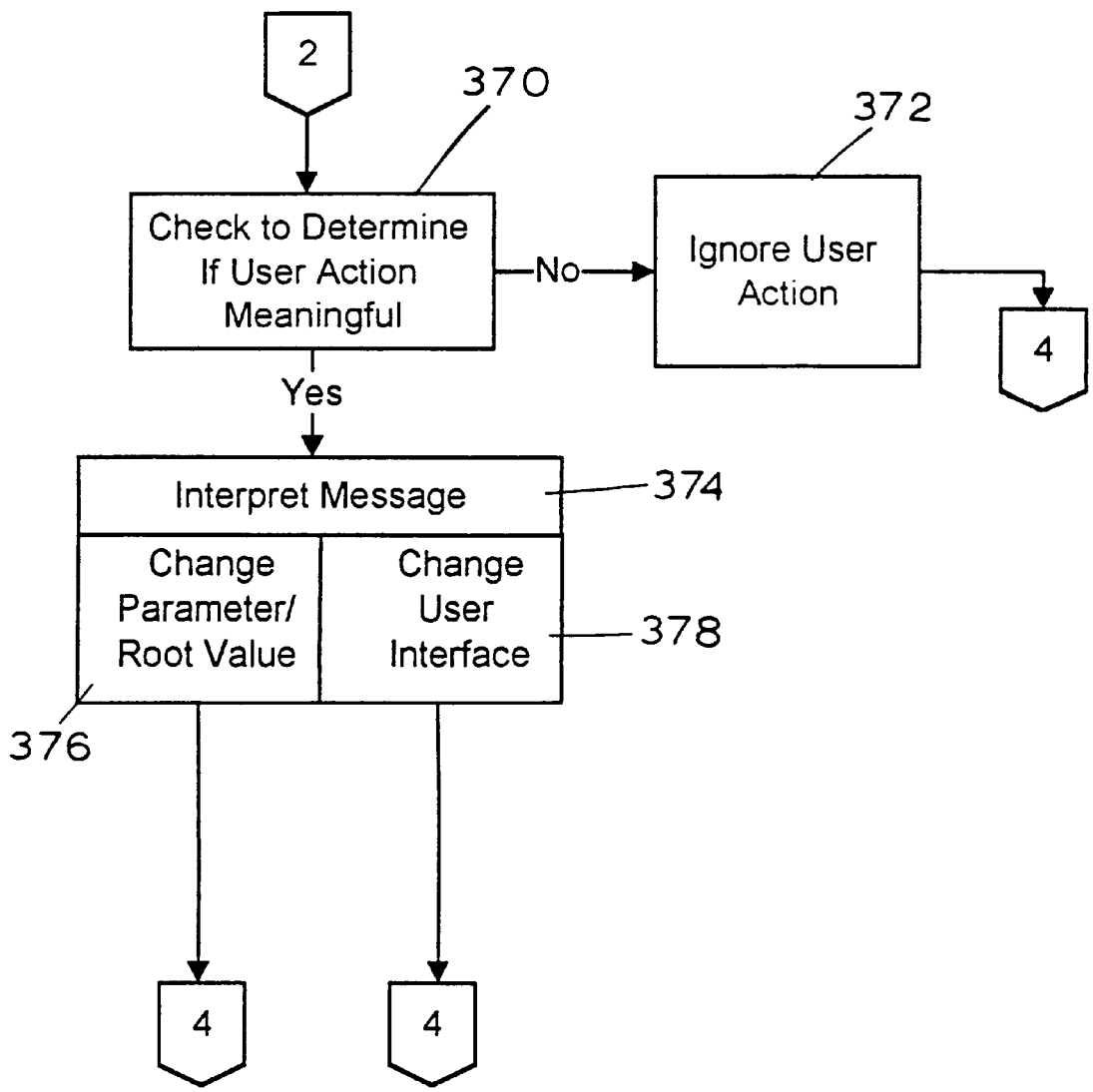

FIG. 18 illustrates the operation of a control in response to a message from the user interface. A block 370 checks to determine if the user action is meaningful. The block 370 may, for example, determine if the user clicked the proper button of the mouse or if the pointer (i.e., the cursor or arrow) was located within an area of the control display where the control recognizes the user's actions as requests for action. If the user action is not meaningful, a block 372 simply ignores the user action or gives some indication that the action has been ignored (e.g., refreshing the user display with the same display interface attributes). Thereafter, control is returned to the block 315.

On the other hand, if the user action is meaningful, a block 374 interprets the message from the user interface. If the message from the user interface indicates that the user would like to change a parameter value or a root value, a block 376 calls the change-parameter/root-value routine 338 and then returns control to the block 315. If desired the block 376 may also change the user interface, for example, to implement a color change to the background field surrounding the data to be written. Upon receiving an indication of a successful write, the block 376 may also return the background color to its original state to indicate that the value has been written (if the routine 338 has not already done so).

If, on the other hand, the block 374 determines that the user is requesting a change in the user interface, a block 378 calls the change-user-interface routine 362 and returns control to the block 315.

Figure 19:
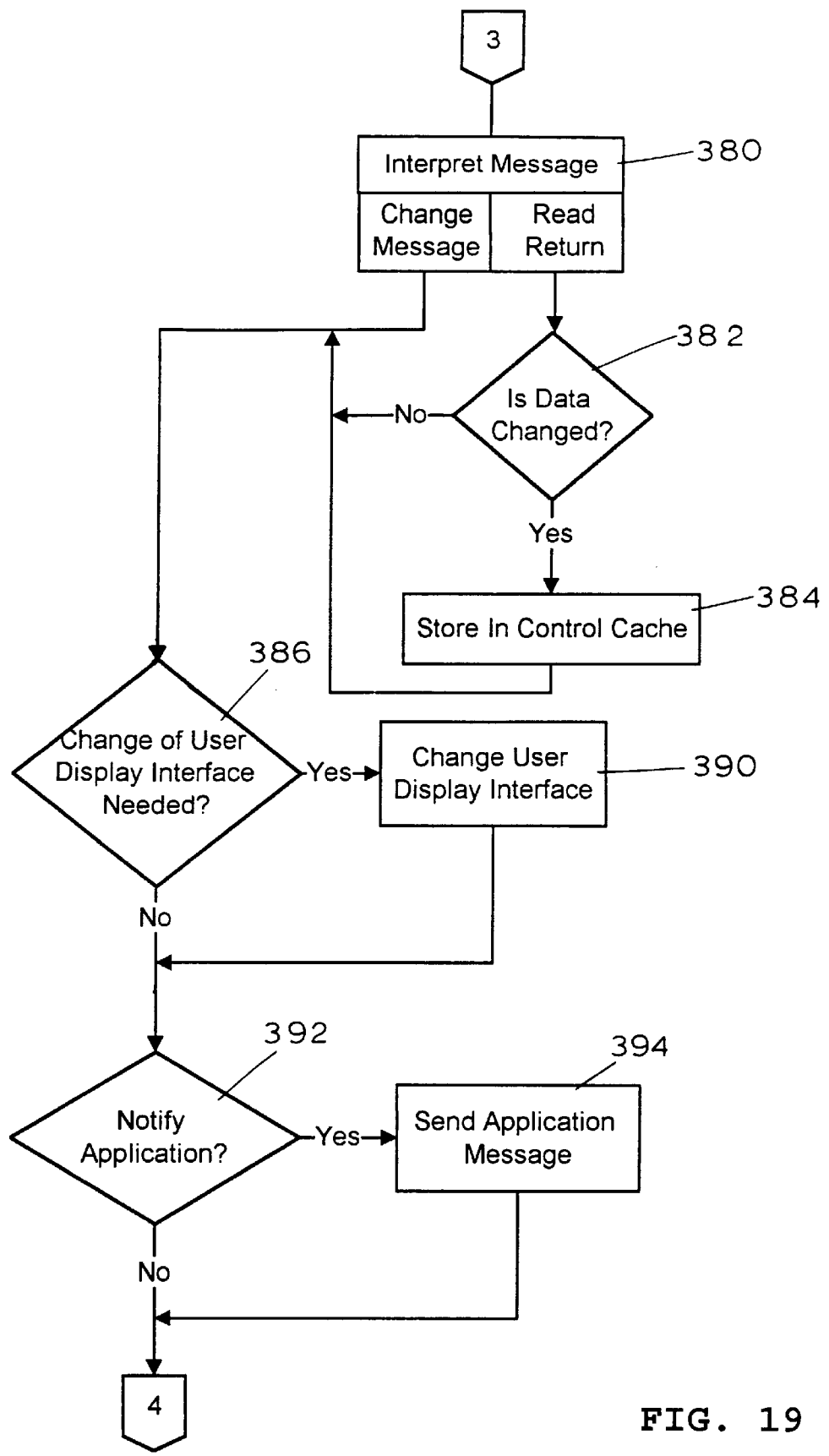

FIG. 19 illustrates the operation of a control in response to a message from the DCI 60, i.e., from an OLE object within the hierarchy of FIGS. 3 and 4A–4C. A block 380 first determines if the message from the DCI 60 is non-blocking read return or if the message indicates some other change or changed condition within the referenced OLE object of the OLE hierarchy. A condition-change message may, for example, comprise an FMS locking message which prevents multiple users from accessing a particular block within a device of a process at the same time. If, for example, a block is being accessed by a different user by a hand-held communicator or another FMS system attached to the device, the OLE object will identify such condition to the control through the DCI 60. Thereafter, the control may indicate to the user that the data of that block is no longer writable by, for example, displaying a gray background on the screen surrounding a normally writable value.

In the case of a non-blocking read return, a block 382 determines if the returned value has changed. If so, a block 384 stores this new value in the control cache. The block 384 and, if there has been no change in the data stored in the control cache, the block 382 as well, provides control to a block 386. The block 386 is also implemented if the block 380 determines that the message from the OLE object relates to a change not related to a non-blocking read.

The block 386 determines if a change to the user interface is needed, such as if the changed data or the new condition or status is to be displayed on the screen. If so, a block 390 calls the change-user-interface routine 362 to display the changed data or the condition to the user. If, however, the block 386 determines that the changed data or the condition does not need to be displayed, or if the block 390 has indicated such changed data or condition to the user, a block 392 determines if the application should be notified of the changed data or condition in accordance with pre-written instructions. If so, a block 394 sends a message to the current application 56 indicating the changed data or condition. Thereafter, control is returned to the block 315.

Generally, information accessed by a device, a block, a parameter, or a timeline control can be displayed on a screen in any desired manner including (1) the EDIT style wherein the control behaves similarly to a normal Microsoft Windows Edit control, (2) the COMBO style wherein the control behaves similarly to a normal Microsoft Windows Combo Box control (i.e., as a drop down list), (3) the LIST style wherein the control behaves similarly to a normal Microsoft Windows List Box control (i.e., such that each item in the enumeration will be represented as a list box entry), (4) the GROUP style wherein the control behaves similarly to a normal Microsoft Windows Group Box control, or (5) the PANEL style wherein the control displays either a raised or a sunken panel and/or any other desired style or format.

FIG. 20 illustrates control displays 400 and 402 associated with two device controls. Each of the device control displays 400 and 402 includes a picture or digital bitmap of the device (usually provided by a device manufacturer or the DDS provider), which is stored in a memory associated with the current application. Instead, this bitmap may be stored in the database 40 so as to be accessible by the OLE objects.

The control displays 400 and 402 may include any other desired information about a device including, for example, the name (illustrated in FIG. 20), tags, moniker, etc. of a device, or any other desired device-specific information. Furthermore, menus for the device can be provided in a pull-down window associated with the device control displays 400 and 402. Such menus may include files associated with a device, for example, the names of the collections associated with a Device object for the device, methods which can be implemented on the device, including calibration, resetting, and self-testing methods, blocks associated with the device, a list of parameters associated with the device, help for the device, service notes for the device, etc. Other information about a device which may be displayed includes the contents of every variable of each parameter in a device, the face-plate information of a device, the operational status of the device, including, for example, whether an error has occurred within the device and a side-by-side list of, for example, the values of variables of one or more parameters of a device as they exist or existed at specified times.

FIG. 21 illustrates a general parameter control display 406 along with particular parameter control displays 408, 410, and 412 associated with three specific parameter controls for the parameters of a device. Each of the parameter control displays 406–412 is located at a different portion on a screen and, in particular, the parameter control display 406 is located at the top of the screen while the parameter control displays 408, 410 and 412 are located in sequence below the parameter control display 406.

The parameter control display 406 illustrates that a parameter control display may have three fields, including a label field, which provides information pertaining to the type of information being shown, for example, "Pressure," "Temperature," or "Mode," a value field which shows the value of a parameter and a units field which indicates the units in which the value is expressed. The value of a parameter can be an integer number, a decimal number (parameter control displays 408 and 410) or an enumerated value consisting of one of an enumerated set of values, as listed in a pull-down menu associated with the parameter control display 412. The parameter control display 412 does not include a units variable because such a variable is inapplicable to the enumerated set associated therewith.

FIG. 22 illustrates two block control displays 414 and 416 associated with block controls. Similar to a device control display, a block control display typically includes a picture or other representation of a block and/or any other desired information pertaining to a block and/or the device in which the block is located including, for example, whether a block is an input, output, or control (or interface) block.

Figure 23:
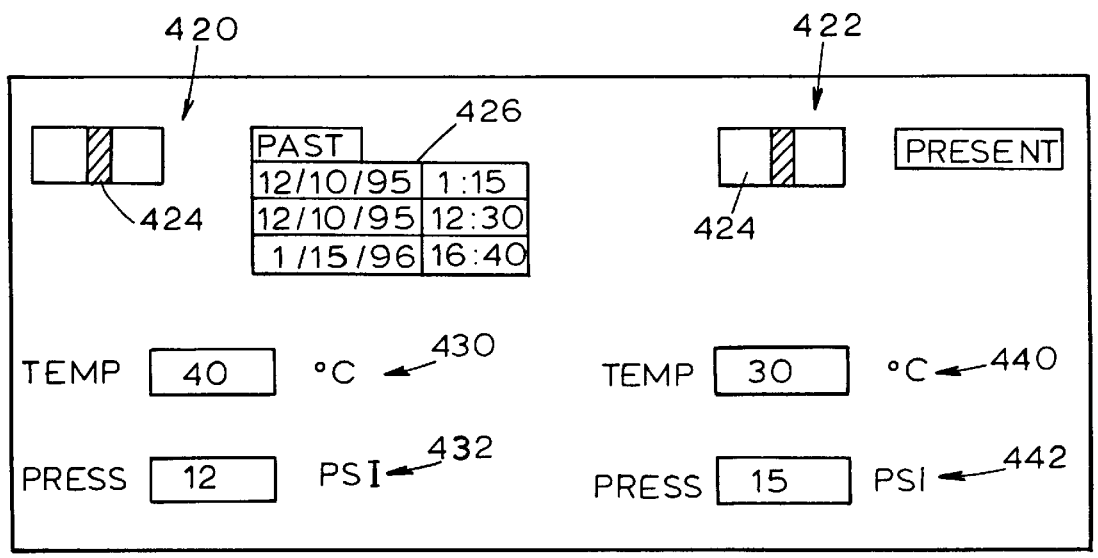
FIG. 23 is a screen display which can be generated by a set of timeline and parameter controls according to the present invention.

FIG. 23 illustrates two timeline control displays 420 and 422 which are used to control and change the time and view properties of OLE Root objects to which other controls, such as device, block, and parameter controls may be connected. Each of the timeline controls associated with the displays 420 and 422 can change the time value of its respective Root object to any of the previous times for which Root objects are available, which will typically include the past times when changes were made to the system and for which transaction records 202 are stored in the transaction database 200 (FIG. 5) of the FMS database 40 (FIG. 1). Furthermore, the timeline controls associated with the control displays 420 and 422 can change the view of a Root object between a past, a present, or a future setting.

Each timeline control display usually includes, as illustrated in FIG. 23, a slider 424 indicating which one of the past, present, and future views is selected as well as a combo box 426 which allows a user to select from a set of historical times, each having, for example, a date and a time.

By changing the timeline control slider 424, the user tells the timeline control to change the Root object View property associated with that timeline control. By changing the timeline control combo box 426, the user tells the timeline control to change the Root object time value to a specified time.

When a timeline control changes the time or view of a Root object, any other controls, such as parameter, device or block controls which are associated with that Root object will automatically be updated in response to change messages generated by the OLE objects. These change messages will be generated by the OLE objects when the OLE objects within the same hierarchy as the Root object retrieve new data pertaining to the new time or view now associated with the Root object.

FIG. 23 also illustrates temperature- and pressure-parameter control displays 430 and 432 which are connected to the same Root object as the timeline control associated with the timeline control display 420. Likewise temperature and pressure parameter control displays 440 and 442 are connected to the same Root object as the timeline control associated with the timeline control display 422. Because the timeline control displays 420 and 422 are set to different times, i.e., a past time (control display 420) and the present (control display 422), the values of the temperature parameters 430 and 440 are different and the values of the pressure parameters 432 and 442 are different. A list of such parameter control displays can be configured on the screen to display one or more complete configurations for a device, block, etc. Device and block and/or other parameter controls can also be associated with the same Root object as timeline controls and can be used to illustrate a configuration display which shows a configuration of a device, a block, or a parameter at different times in a side-by-side or other relationship on a screen. A timeline control can also be used in conjunction with other controls on a display to scroll through the settings or values of devices, blocks or parameters or a set of such device, blocks, or parameters. As is evident, any desired combination of timeline, device, block, parameter and/or other controls may be used to illustrate any desired past and or present information to a user including, for example, information related to on-line devices at the present time, i.e., on-line data, and information related to on-line devices in the past or future, and to off-line devices in the past, present or future, i.e., off-line data. Furthermore, as indicated with respect to FIG. 23, the same data, for example, the same parameter values for a device, may be illustrated for different times using timeline controls and, if desired, routines may be implemented to indicate the differences between the sets of values.

The timeline control changes the Time property of the Root object to a specific time (designated hereinafter as the ViewTime), which the user specifies using the timeline control. Consequently, the time attributes for all of the objects downstream of the Root object in the OLE hierarchy are changed to match the ViewTime as described above. In addition, the values of other properties of those objects are updated to the values corresponding to that ViewTime.

For a Block object in particular, the state of the corresponding block at any desired time (e.g., the ViewTime specified using the timeline control) is obtained using the above-described transaction database 200 (FIG. 5). More particularly, the values of the parameters of the Block object at the ViewTime (i.e., the values of the Value properties of the Parameter objects of the Block object as of the ViewTime) are obtained by searching the transaction database 200 in reverse-chronological order beginning at the ViewTime to find the values last assigned to the parameters corresponding to those Parameter objects on or before the ViewTime. This procedure is now described in detail with reference to the flowchart of FIG. 24.

Figure 24:
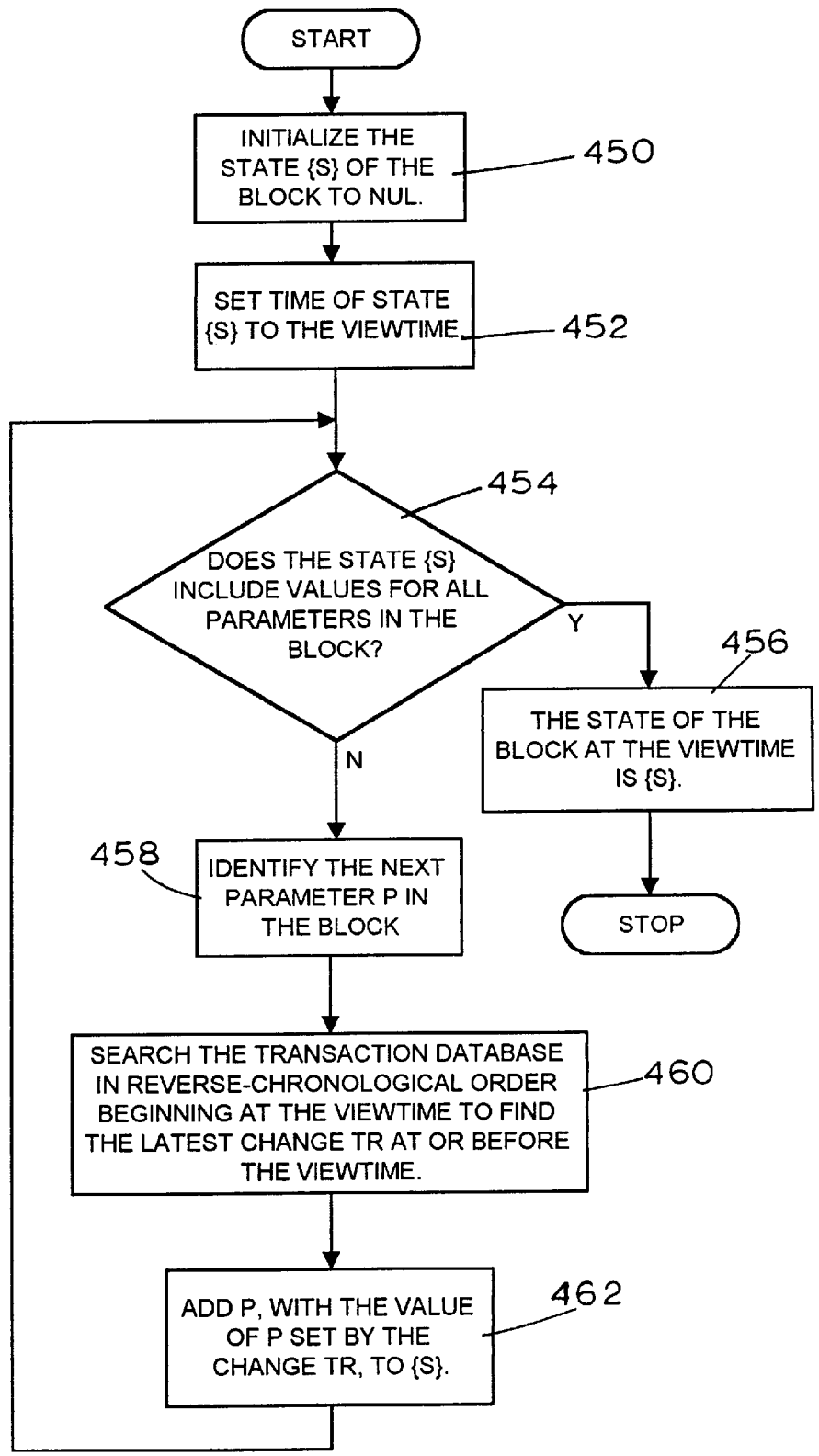
FIG. 24 is a flowchart illustrating programming for reconstructing an expected device state from the transaction database of FIG. 5.

FIG. 24 is a flowchart illustrating how a state of a particular block can be reconstructed from the transaction database 200 described above. First, a block 450 initializes a set variable {S} to null. The set variable {S} is used to accumulate the values as of the ViewTime of the parameters of the block whose ViewTime state is to be reconstructed. A block 452 then sets a time associated with the state {S} equal to the ViewTime. Thereafter, a block 454 determines whether the set variable {S} includes a value for each parameter of the Block Object. If it does, then a block 456 assigns the assembled state {S} as the state of the block at the ViewTime, and execution of the state reconstruction routine of FIG. 24 ends.

If the block 454 determines that the accumulated state (i.e, the contents of the set variable {S}) does not include values for every parameter in the block, then a block 458 identifies the next parameter P for which a current value is not included in the accumulated state {S}. A block 460 then searches the transaction database 200 in reverse-chronological order beginning at the ViewTime to find the latest-made change TR made at or before the ViewTime. A block 462 then adds the parameter P, with the value of the parameter P set by the change represented by transaction TR, to the accumulated state {S}, and control then returns to the block 454 to check, once again, whether values of all parameters in the block have now been accumulated in the state {S}.

Although the device, block, parameter, and timeline controls are illustrated and described herein, other controls according to the present invention could be constructed to illustrate other properties or data available through DDL, including data within any of the OLE objects illustrated in FIGS. 3 and 4A–4C.

While the present invention has been described with reference to specific examples, which are intended to be illustrative only, and not to be limiting of the invention, it will be apparent to those of ordinary skill in the art that changes, additions and/or deletions may be made to the disclosed embodiments without departing from the spirit and scope of the invention.

OLE OBJECT DEFINITIONS

The following tables illustrate the properties and methods of the various OLE objects and collection objects in the lower hierarchy illustrated in FIG. 4. The various properties of those objects and collection objects are not included in the following table, but those properties correspond to the attributes of the DDL objects which are equivalents of the objects. The DDL equivalents of the OLE objects and collection objects are identified in the OLE object DDL equivalents table, and are fully described in the ISP Fieldbus DDL specification document, incorporated by reference herein.

The following tables use the following symbols to denote the following information:
- (R)  Access the property via the Read/Write and Get/Set methods.
- (†)  Read/Write.
- (††) Read/Write in devices less than Rev. 5; otherwise, read-only.
- (M)  Run this method by executing the OLE method called "Method" or "CallMethod"
- (N)  Not implemented.
- (C)  Access this property via an OLE property. Get method, or a Read request containing only this property.

The values referenced in the Return Type column indicate the following VARIANT types:
- VT_EMPTY  Used when no value is available.
- VT_I4     Used for integer values and boolean values.
- VT_R4     Used for most floating point field measurement values.
- VT_R8     Used for double precision measurement values.
- VT_DATE   Used for dates and times using double precision.
- VT_BSTR   Used for character strings.
- VT_ERROR  Used for error codes.
- VT_ARRAY  Used for binary values.

All objects defined in this table have the set of Standard Properties listed below.

|  | Return Type | Description |
|---|---|---|
| Standard Properties | | |
| Property Name | | |
| Kind (R) | VT_I4 | Returns the object's kind. |
| KindAsString (R) | VT_BSTR | Returns the object's kind as a string. |
| Moniker (P) | VT_BSTR | Returns a full moniker for the object. |
| ArrayParameter Object | | |
| Property Name | | |
| Count (C) | VT_I4 | The number of items in the collection. This property blocks until all the items in the collection can be accessed without blocking. |
| ReadyCount (C) | VT_I4 | The number of items in the collection that can be accessed without blocking, which may be less than the total number of items in the collection. |
| ServerCount (N) | VT_I4 | Same as the Count property except it does not block if all the items are not immediately available. |
| Name (R) | VT_BSTR | The parameter's (or record member's) name. |
| MemberId (R) | VT_I4 | The parameter's (or record member's) member ID. |
| ItemId (R) | VT_I4 | The array's item ID. |
| ParamIndex (R) | VT_I4 | The parameter's (or array element's) index. |
| ParamLabel (R) | VT_BSTR | The parameter-specific label. |
| Label (R) | VT_BSTR | The array-specific label. |
| ParamHelp (R) | VT_BSTR | The parameter-specific help. |
| Help (R) | VT_BSTR | The array-specific help. |
| NumberOfElements (R) | VT_I4 | The number of elements in the array. |
| Method Name | | |
| Item | VT_DISPATCH | Takes one argument of type VT_BSTR and returns one of the collections provided by the object. Collections: The "Element" collection is an Elements collection and contains the array's elements. The "RespCode" collection is a ResponseCodes collection and contains the array's response codes. |
| _NewEnum | VT_UNKNOWN | Returns the IUnknown interface of an object that implements the IEnumVariant interface. |

-continued

| | Return Type | Description |
|---|---|---|
| Block Object | | |
| Property Name | | |
| Count (C) | VT_I4 | The number of items in the collection. This property blocks until all the items in the collection can be accessed without blocking. |
| ReadyCount (C) | VT_I4 | The number of items in the collection that can be accessed without blocking, which may be less than the total number of items in the collection. |
| ServerCount (N) | VT_I4 | Same as the Count property except it does not block if all the items are not immediately available. |
| Name (R) | VT_BSTR | The block's name. |
| ItemId (R) | VT_I4 | The block's item id. |
| Label (R) | VT_BSTR | The block's label. |
| Help (R) | VT_BSTR | The block's help. |
| Tag (R) | VT_BSTR | The block's internal tag. Note: For a HART block, this is the HART tag. |
| BlockTag (R) | VT_BSTR | The block's external tag. |
| PhysicalTag (R) | VT_BSTR | The internal tag of the device in which the block resides. Note: For a HART device, this is the HART tag. |
| DeviceTag (R) | VT_BSTR | The external tag of the device in which the block resides. |
| DeviceID (R) | VT_BSTR | The unique identifier of the device in which the block resides. |
| NetAddress (R) | VT_BSTR | The network address, as a moniker, of the device in which the block resides. |
| StationAddress (R) | VT_I4 | The station address of the device in which the block resides. |
| Method Name | | |
| Item | VT_DISPATCH | Takes one argument of type VT_BSTR and returns one of the collections provided by the object. Collections: The "Param" collection is a Parameters collection and contains the block's parameters. The "Database" collection is a DatabaseParameters collection and contains the database parameters for the block. The "Method" collection is a Methods collection and contains the block's methods. The "Menu" collection is a Menus collection and contains the block's menus. The "EditDisplay" collection is an EditDisplays collection and contains the block's edit displays. The "ItemArray" collection is an ItemArrays collection and contains the block's item arrays. The "Collection" collection is a Collections collection and contains the block's collections. The "Refresh" collection is a |

-continued

| | Return Type | Description |
|---|---|---|
| | | RefreshRelations collection and contains the block's refresh relations. The "Unit" collection is a UnitRelations collection and contains the block's unit relations. The "WAO" collection is a WriteAsOneRelations collection and contains the block's write as one relations. |
| _NewEnum | VT_UNKNOWN | Returns the IUnknown interface of an object that implements the IEnumVariant interface. |
| Invalidate (M) | VT_EMPTY | Invalidates the parameters in the parameter cache. This method is used to force all the parameters to be re-read from the device. |
| SendCommand (M) | VT_EMPTY | Sends a HART command. Takes two arguments of type VT_I4 which specify the command number and the transaction number. |
| SendContinuous Command (M) | VT_EMPTY | Sends two HART commands continuously. Takes six arguments of type VT_I4. The first three arguments specify the first command to be sent and the last three arguments specify the second command to sent. The first and fourth arguments specify command numbers, the second and fifth arguments specify transaction numbers, and the third and sixth arguments specify the number of times to send the specified commands. |
| FindResponseCode (M) | VT_BSTR | Returns the string associated with a response code of a HART command. Takes three arguments of type VT_I4 which specify the command number, the transaction number and the response code value. |
| BlockTag Collection | | |
| Property Name | | |
| Count (N) | VT_I4 | The number of items in the collection. This property blocks until all the items in the collection can be accessed without blocking. |
| ReadyCount (N) | VT_I4 | The number of items in the collection that can be accessed without blocking, which may be less than the total number of items in the collection. |
| ServerCount (N) | VT_I4 | Same as the Count property except it does not block if all the items are not immediately available. |
| Method Name | | |
| Item | VT_DISPATCH | Takes one argument of type VT_BSTR and returns one of the items in the collection. The Block object whose BlockTag property matches the argument is returned. |
| _NewEnum (N) | VT_UNKNOWN | Returns the IUnknown interface of an object that implements the IEnumVariant interface. |

-continued

Collections Collection

| Property Name | Return Type | Description |
|---|---|---|
| Count (C) | VT_I4 | The number of items in the collection. This property blocks until all the items in the collection can be accessed without blocking. |
| Readycount (C) | VT_I4 | The number of items in the collection that can be accessed without blocking, which may be less than the total number of items in the collection. |
| ServerCount (N) | VT_I4 | Same as the Count property except it does not block if all the items are not immediately available. |

| Method Name | Return Type | Description |
|---|---|---|
| Item | VT_DISPATCH | Takes one argument of type VT_BSTR and returns one of the items in the collection. If the argument begins with a $, the rest of the string must take the form of an integer. The DDL collection whose ItemId property matches the argument is returned. If the argument begins with a digit, the string must take the form of an integer and the DDL collection whose Index property matches the argument is returned. Otherwise, the DDL collection whose Name property matches the argument is returned. |
| _NewEnum | VT_UNKNOWN | Returns the IUnknown interface of an object that implements the IEnumVariant interface. |

CollectionItems Collection

| Property Name | Return Type | Description |
|---|---|---|
| Count (C) | VT_I4 | The number of items in the collection. This property blocks until all the items in the collection can be accessed without blocking. |
| ReadyCount (C) | VT_I4 | The number of items in the collection that can be accessed without blocking, which may be less than the total number of items in the collection |
| ServerCount (N) | VT_I4 | Same as the Count property except it does not block if all the items are not immediately available. |

| Method Name | Return Type | Description |
|---|---|---|
| Item | VT_DISPATCH | Takes one argument of type VT_BSTR and returns one of the items in the collection. If the argument begins with a $, the rest of the string must take the form of an integer. The item whose ItemMemberID property matches the argument is returned. Otherwise, the item whose ItemName property matches the argument is returned. |
| _NewEnum | VT_UNKNOWN | Returns the IUnknown interface of an object that implements the IEnumVariant interface. |

CollectionItem Object

| Property Name | Return Type | Description |
|---|---|---|
| ItemName (R) | VT_BSTR | The collection item's member name. |
| ItemMemberId (R) | VT_I4 | The collection item's member ID. |
| ItemLabel (R) | VT_I4 | The collection item's label. |
| ItemHelp (R) | VT_BSTR | The collection item's help. |

Collection Object

| Property Name | Return Type | Description |
|---|---|---|
| Count (C) | VT_I4 | The number of items in the collection. This property blocks until all the items in the collection can be accessed without blocking. |
| ReadyCount (C) | VT_I4 | The number of items in the collection that can be accessed without blocking, which may be less than the total number of items in the collection. |
| ServerCount (N) | VT_I4 | Same as the Count property except it does not block if all the items are not immediately available. |
| Name (R) | VT_BSTR | The collection's name. |
| ItemId (R) | VT_I4 | The collection's item ID. |
| Index (R) | VT_I4 | The collection's index. |
| Label (R) | VT_BSTR | The collection's label. |
| Help (R) | VT_BSTR | The collection's help. |
| Type (R) | VT_I4 | The collection's type. |
| TypeAsString (R) | VT_BSTR | The collection's type as a string. |

| Method Name | Return Type | Description |
|---|---|---|
| Item | VT_DISPATCH | Takes one argument of type VT_BSTR and returns one of the collections provided by the object. Collections: The "Member" collection is a CollectionItems collection and contains the members of the DDL collection. |
| _NewEnum | VT_UNKNOWN | Returns the IUnknown interface of an object that implements the IEnumVariant interface. |

DatabaseParameter Object

| Property Name | Return Type | Description |
|---|---|---|
| Name (R) | VT_BSTR | The parameter's name. |
| Value (R) (†) | VT_VARIANT | The parameter's value. |
| ValueAsString (R) (†) | VT_BSTR | The parameter's value as a string. |
| Size (R) | VT_I4 | The parameter's size (in bytes). |
| Type (R) | VT_I4 | The parameter's type. |
| TypeAsString (R) | VT_BSTR | The parameter's type as a string. |

DatabaseParameters Collection

| Property Name | Return Type | Description |
|---|---|---|
| Count (C) | VT_I4 | The number of items in the collection. This property blocks until all the items in the collection can be accessed without blocking. |

-continued

| | Return Type | Description |
|---|---|---|
| ReadyCount (C) | VT_I4 | The number of items in the collection that can be stressed without blocking, which may be less than the total number of items in the collection. |
| ServerCount (N) | VT_I4 | Same as the Count property except it does not block if all the items are not immediately available. |
| Method Name | | |
| Item | VT_DISPATCH | Takes one argument of type VT_BSTR and returns one of the items in the collection. The DatabaseParameter object whose Name property matches the argument is returned. |
| _NewEnum | VT_UNKNOWN | Returns the IUnknown interface of an object that implements the IEnumVariant interface. |

DeviceID Collection

| | Return Type | Description |
|---|---|---|
| Property Name | | |
| Count (N) | VT_I4 | The number of items in the collection. This property blocks until all the items in the collection can be accessed without blocking. |
| ReadyCount (N) | VT_I4 | The number of items in the collection that can be accessed without blocking, which may be less than the total number of items in the collection. |
| ServerCount (N) | VT_I4 | Same as the Count property except it does not block if all the items are not immediately available. |
| Method Name | | |
| Item | VT_DISPATCH | Takes one argument of type VT_BSTR and returns one of the items in the collection. The Device object whose DeviceID property matches the argument is returned. |
| _NewEnum (N) | VT_UNKNOWN | Returns the IUnknown interface of an object that implements the IEnumVariant interface. |

Device Object

| | Return Type | Description |
|---|---|---|
| Property Name | | |
| Count (C) | VT_I4 | The number of items in the collection. This property blocks until all the items in the collection can be accessed without blocking. |
| ReadyCount (C) | VT_I4 | The number of items in the collection that can be accessed without blocking, which may be less than the total number of items in the collection. |
| ServerCount (N) | VT_I4 | Same as the Count property except it does not block if all the items are not immediately available. |
| PhysicalTag (R) (*) | VT_BSTR | The device's internal tag. Note: For a HART device, this is the HART tag. |
| DeviceTag (R) | VT_BSTR | The device's external tag. |
| DeviceID (R) (**) | VT_BSTR | The device's unique identifier. |
| StationAddress (R) (*) | VT_I4 | The device's station address. |
| NetAddress (R) | VT_BSTR | The device's network address as a moniker. |
| Method Name | | |
| Item | VT_DISPATCH | Takes one argument of type VT_BSTR and returns one of the collections provided by the object. Collections: The "Tag" collection is a Tag collection and contains all the device's blocks. Special Case: If the argument is "HART," the IDispatch interface of the device's Block object is returned. |
| _NewEnum | VT_UNKNOWN | Returns the IUnknown interface of an object that implements the IEnumVariant interface. |

DeviceTag Collection

| | Return Type | Description |
|---|---|---|
| Property Name | | |
| Count (N) | VT_I4 | The number of items in the collection. This property blocks until all the items in the collection can be accessed without blocking. |
| ReadyCount (N) | VT_I4 | The number of items in the collection that can be accessed without blocking, which may be less than the total number of items in the collection |
| ServerCount (N) | VT_I4 | Same as the Count property except it does not block if all the items are not immediately available. |
| Method Name | | |
| Item | VT_DISPATCH | Takes one argument of type VT_BSTR and returns one of the items in the collection. The Device object whose DeviceTag property matches the argument is returned. |
| _NewEnum (N) | VT_UNKNOWN | Returns the IUnknown interface of an object that implements the IEnumVariant interface. |

EditDisplayItems Collections

| | Return Type | Description |
|---|---|---|
| Property Name | | |
| Count (C) | VT_I4 | The number of items in the collection. This property blocks until all the items in the collection can be accessed without blocking. |
| ReadyCount (C) | VT_I4 | The number of items in the collection that can be accessed without blocking, which may be less than the total number of items in the collection. |
| ServerCount (N) | VT_I4 | Same as the Count property except it does not block if all the items are not immediately available. |
| Method Name | | |
| Item | VT_DISPATCH | Takes one argument of type VT_BSTR and returns one of the items in the collection. The argument must take the |

| | Return Type | Description |
|---|---|---|
| _NewEnum | VT_UNKNOWN | form of an integer and the item whose Index property matches the argument is returned. Returns the IUnknown interface of an object that implements the IEnumVariant interface. |

EditDisplays Collection

Property Name

| | Return Type | Description |
|---|---|---|
| Count (C) | VT_I4 | The number of items in the collection. This property blocks until all the items in the collection can be accessed without blocking. |
| ReadyCount (C) | VT_I4 | The number of items in the collection that can be accessed without blocking, which may be less than the total number of items in the collection. |
| ServerCount (N) | VT_I4 | Same as the Count property except it does not block if all the items are not immediately available |

Method Name

| | Return Type | Description |
|---|---|---|
| Item | VT_DISPATCH | Takes one argument of type VT_BSTR and returns one of the items in the collection. If the argument begins with a $, the rest of the string must take the form of an integer. The edit display whose ItemId property matches the argument is returned. If the argument begins with a digit, the string must take the form of an integer and the edit display whose Index property matches the argument is returned. Otherwise, the edit display whose Name property matches the argument is returned. |
| _NewEnum | VT_UNKNOWN | Returns the IUnknown interface of an object that implements the IEnumVariant interface. |

EditDisplay Object

Property Name

| | Return Type | Description |
|---|---|---|
| Count (C) | VT_I4 | The number of items in the collection. This property blocks until all the items in the collection can be accessed without blocking. |
| ReadyCount (C) | VT_I4 | The number of items in the collection that can be accessed without blocking, which may be less than all the items in the collection. |
| ServerCount (N) | VT_I4 | Same as the Count property except it does not block if all the items are not immediately available. |
| Name (R) | VT_BSTR | The edit display's name. |
| ItemId (R) | VT_I4 | The edit display's item ID. |
| Index (R) | VT_I4 | The edit display's index. |
| Label (R) | VT_BSTR | The edit display's label. |

Method Name

| | Return Type | Description |
|---|---|---|
| Item | VT_DISPATCH | Takes an argument of type VT_BSTR and returns one collection of the object. Collections: The "Edit" collection is an EditDisplayItems collection and contains the edit display's edit items. The "Display" collection is an EditDisplayItems collection and contains the edit display's display items. The "PreEdit" collection is a Methods collection and contains the edit display's pre-edit methods. The "PostEdit" collection is a Methods collection and contains the edit display's post-edit methods. |
| _NewEnum | VT_UNKNOWN | Returns the IUnknown interface of an object that implements the IEnumVariant interface. |
| ExecutePreEdit | VT_EMPTY | Executes the edit display's pre-edit methods. |
| ExecutePostEdit | VT_EMPTY | Executes the edit display's post-edit methods. |

Elements Collection

Property Name

| | Return Type | Description |
|---|---|---|
| Count (C) | VT_I4 | The number of items in the collection. This property blocks until all the items in the collection can be accessed without blocking. |
| ReadyCount (C) | VT_I4 | The number of items in the collection that can be accessed without blocking, which may be less than the total number of items in the collection. |
| ServerCount (N) | VT_I4 | Same as the Count property except it does not block if all the items are not immediately available. |

Method Name

| | Return Type | Description |
|---|---|---|
| Item | VT_DISPATCH | Takes one argument of type VT_BSTR and returns one of the items in the collection. If the argument begins with a $, the rest of the string must take the form of an integer. The element whose ItemId property matches the argument is returned. Otherwise, the string must take the form of an integer. The element whose ParamIndex property equals this integer is returned. |
| _NewEnum | VT_UNKNOWN | Returns the IUnknown interface of an object that implements the IEnumVariant interface. |

EnumerationValue Object

Property Name

| | Return Type | Description |
|---|---|---|
| Count (C) | VT_I4 | The number of items in the collection. This property blocks until all the items in the collection can be accessed without blocking. |
| ReadyCount (C) | VT_I4 | The number of items in the collection that can be accessed without blocking, which may be less than the total number of items in the collection. |

-continued

| | Return Type | Description |
|---|---|---|
| ServerCount (N) | VT_I4 | Same as the Count property except it does not block if all the items are not immediately available. |
| Description (R) | VT_BSTR | The enumeration value's description. |
| Value (R) | VT_I4 | The enumeration value. |
| Help (R) | VT_BSTR | The enumeration value's help. |
| Class (R) | VT_I4 | The enumeration value's class. |
| ClassAsString (R) | VT_BSTR | The enumeration value's class as a string. |
| StatusClasses (R) | VT_I4 | The enumeration value's status classes. |
| StatusClassesAsString (R) | VT_BSTR | The enumeration value's status classes as a string. |
| Method Name | | |
| Item | VT_DISPATCH | Takes one argument of type VT_BSTR and returns one of the collections provided by the object. Collections: The "Member" collection is a CollectionItems collection and contains the members of the DDL collection. |
| _NewEnum | VT_UNKNOWN | Returns the IUnknown interface of an object that implements the IEnumVariant interface. |
| ExecuteActions | VT_EMPTY | Executes the enumeration value's actions method. |
| EnumerationValues Collection | | |
| Property Name | | |
| Count (C) | VT_I4 | The number of items in the collection. This property blocks until all the items in the collection can be accessed without blocking. |
| ReadyCount (C) | VT_I4 | The number of items in the collection that can be accessed without blocking, which may be less than the total number of items in the collection. |
| ServerCount (R) | VT_I4 | Same as the Count property except it does not block if all the items are not immediately available. |
| Method Name | | |
| Item | VT_DISPATCH | Takes one argument of type VT_BSTR and returns one of the items in the collection. If the argument begins with a digit, the string must take the form of an integer and the enumeration value whose Value property matches the argument is returned. Otherwise, the enumeration value whose Description property matches the argument is returned. |
| _NewEnum | VT_UNKNOWN | Returns the IUnknown interface of an object that implements the IEnumVariant interface. |
| HIU Collection | | |
| Property Name | | |
| Count (C) | VT_I4 | The number of items in the collection. This property blocks until all the items in the collection can be accessed without blocking. |
| ReadyCount (C) | VT_I4 | The number of items in the collection that can be accessed without blocking, which may be less than the total number of items in the collection. |
| ServerCount (N) | VT_I4 | Same as the Count property except it does not block if all the items are not immediately available. |
| Method Name | | |
| Item | VT_DISPATCH | Takes one argument of type VT_BSTR and returns one of the items in the collection. The argument must take the form of an integer and the Interchange object whose StationAddress property matches the argument is returned. |
| _NewEnum | VT_UNKNOWN | Returns the IUnknown interface of an object that implements the IEnumVariant interface. |
| Interchange Object | | |
| Property Name | | |
| Count (C) | VT_I4 | The number of items in the collection. This property blocks until all the items in the collection can be accessed without blocking. |
| ReadyCount (C) | VT_I4 | The number of items in the collection that can be accessed without blocking, which may be less than the total number of items in the collection. |
| ServerCount (N) | VT_I4 | Same as the Count property except it does not block if all the items are not immediately available. |
| Tag (R) (†) | VT_BSTR | The HART Interchange's HART tag. |
| DeviceID (R) | VT_BSTR | The HART Interchange's unique identifier. |
| NetAddress (R) | VT_BSTR | The HART Interchange's network address as a moniker. |
| StationAddress (R) | VT_I4 | The HART Interchange's station address. |
| Method Name | | |
| Item | VT_DISPATCH | Returns the IDispatch interface of the specified device on the Instrument List. This method takes one argument which is a loop number, 0–31 inclusive. Or "Block," which returns the IDISPATCH interface to the Block Object that describes the HIU itself. |
| _NewEnum | VT_UNKNOWN | Returns the IUnknown interface of an object that implements the IEnumVariant interface. |
| ItemArray Object | | |
| Property Name | | |
| Count (C) | VT_I4 | The number of items in the collection. This property blocks until all the items in the collection can be accessed without blocking. |
| ReadyCount (C) | VT_I4 | The number of items in the |

-continued

|  | Return Type | Description |
|---|---|---|
| ServerCount (N) | VT_I4 | collection that can be accessed without blocking, which may be less than the total number of items in the collection. Same as the Count property except it does not block if all the items are not immediateiy avaliable. |
| Name (R) | VT_BSTR | The item array's name. |
| ItemId (R) | VT_I4 | The item array's item ID. |
| Index (R) | VT_I4 | The item array's index. |
| Label (R) | VT_BSTR | The item array's label. |
| Help (R) | VT_BSTR | The item array's help. |
| Type (R) | VT_I4 | The item array's type. |
| TypeAsString (R) | VT_BSTR | The item array's type as a string. |
| Method Name | | |
| Item | VT_DISPATCH | Takes one argument of type VT_BSTR and returns one of the collections provided by the object. Collections: The "Element" collection is an ItemArrayItems collection and contains the elements of the item array. |
| _NewEnum | VT_UNKNOWN | Returns the IUnknown interface of an object that implements the IEnumVariant interface. |
| ItemArrays Collection | | |
| Property Name | | |
| Count (C) | VT_I4 | The number of items in the collection. This property blocks until all the items in the collection can be accessed without blocking. |
| ReadyCount (C) | VT_I4 | The number of items in the collection that can be accessed without blocking, which may be less than the total number of items in the collection. |
| ServerCount (N) | VT_I4 | Same as the Count property except it does not block if all the items are not immediately available. |
| Method Name | | |
| Item | VT_DISPATCH | Takes one argument of type VT_BSTR and returns one of the items in the collection. If the argument begins with a $, the rest of the string must take the form of an integer. The item array whose ItemId property matches the argument is returned. If the argument begins with a digit, the string must take the form of an integer and the item array whose Index property matches the argument is returned. Otherwise, the item array whose Name property matches the argument is returned. |
| _NewEnum | VT_UNKNOWN | Returns the IUnknown interface of an object that implements the IEnumVariant interface. |
| ItemArrayItem Object | | |
| Property Name | | |
| ItemIndex (R) | VT_BSTR | The item array item's index. |
| ItemLabel (R) | VT_I4 | The item array item's label. |
| ItemHelp (R) | VT_BSTR | The item array item's help. |
| ItemArrayItems Collection | | |
| Property Name | | |
| Count (C) | VT_I4 | The number of items in the collection. This property blocks until all the items in the collection can be accessed without blocking. |
| ReadyCount (C) | VT_I4 | The number of items in the collection that can be accessed without blocking, which may be less than the total number of items in the collection. |
| ServerCount (N) | VT_I4 | Same as the Count property except it does not block if all the items are not immediately available. |
| Method Name | | |
| Item | VT_DISPATCH | Takes one argument of type VT_BSTR and returns one of the items in the collection. The argument must take the form of an integer and the item whose ItemIndex property matches the argument is returned. |
| _NewEnum | VT_UNKNOWN | Returns the IUnknown interface of an object that implements the IEnumVariant interface. |
| Members Collection | | |
| Property Name | | |
| Count (C) | VT_I4 | The number of items in the collection. This property blocks until all the items in the collection can be accessed without blocking. |
| ReadyCount (C) | VT_I4 | The number of items in the collection that can be accessed without blocking, which may be less than the total number of items in the collection. |
| ServerCount (N) | VT_I4 | Same as the Count property except it does not block if all the items are not immediately available. |
| Method Name | | |
| Item | VT_DISPATCH | Takes one argument of type VT_BSTR and returns one of the items in the collection. If the argument begins with a $, the rest of the string must take the form of a DDID (an integer). If the DDID is an item ID, the member whose ItemId property matches the argument is returned. If the DDID is a member ID, the member whose MemberId property matches the argument is returned. If the argument begins with a digit, the string must take the form of an integer and the |

-continued

| | Return Type | Description |
|---|---|---|
| | | parameter whose ParamIndex property matches the argument is returned. Otherwise, the parameter whose Name property matches the argument is returned. |
| _NewEnum | VT_UNKNOWN | Returns the IUnknown interface of an object that implements the IEnumVariant interface. |

MenuItems Collection

Property Name

| Count (C) | VT_I4 | The number of items in the collection. This property blocks until all the items in the collection can be accessed without blocking. |
|---|---|---|
| ReadyCount (C) | VT_I4 | The number of items in the collection that can be accessed without blocking, which may be less than the total number of items in the collection. |
| ServerCount (N) | VT_I4 | Same as the Count property except it does not block if all the items are not immediately available. |

Method Name

| Item | VT_DISPATCH | Takes one argument of type VT_BSTR and returns one of the items in the collection. The argument must take the form of an integer and the item whose Index property matches the argument is returned. |
|---|---|---|
| _NewEnum | VT_UNKNOWN | Returns the IUnknown interface of an object that implements the IEnumVariant interface. |

MenuItem Object

Property Name

| Flags (R) | VT_I4 | The menu item's flags. |
|---|---|---|
| FlagsAsString (R) | VT_BSTR | The menu item's flags as a string. |

Menu Object

Property Name

| Count (C) | VT_I4 | The number of items in the collection. This property blocks until all the items in the collection can be accessed without blocking. |
|---|---|---|
| ReadyCount (C) | VT_I4 | The number of items in the collection that can be accessed without blocking, which may be less than the total number of items in the collection. |
| ServerCount (N) | VT_I4 | Same as the Count property except it does not block if all the items are not immediately available. |
| Name (R) | VT_BSTR | The menu's name. |
| ItemId (R) | VT_I4 | The menu's item id. |
| Index (R) | VT_I4 | The menu's index. |
| Label (R) | VT_BSTR | The menu's label. |

Method Name

| Item | VT_DISPATCH | Takes one argument of type VT_BSTR and returns one of the collections provided by the object. |
|---|---|---|

-continued

| | Return Type | Description |
|---|---|---|
| | | Collections: The "MenuItem" collection is a MenuItems collection and contains the items of the menu. |
| _NewEnum | VT_UNKNOWN | Returns the IUnknown interface of an object that implements the IEnumVariant interface. |

Menus Collection

Property Name

| Count (C) | VT_I4 | The number of items in the collection. This property blocks until all the items in the collection can be accessed without blocking. |
|---|---|---|
| ReadyCount (C) | VT_I4 | The number of items in the collection that can be accessed without blocking, which may be less than the total number of items in the collection. |
| ServerCount (N) | VT_I4 | Same as the Count property except it does not block if all the items are not immediately available. |

Method Name

| Item | VT_DISPATCH | Takes one argument of type VT_BSTR and returns one of the items in the collection. If the argument begins with a $, the rest of the string must take the form of an integer. The menu whose ItemId property matches the argument is returned. If the argument begins with a digit the string must take the form of an integer and the menu whose Index property matches the argument is returned. Otherwise, the menu whose Name property matches the argument is returned. |
|---|---|---|
| _NewEnum | VT_UNKNOWN | Returns the IUnknown interface of an object that implements the IEnumVariant interface. |

Methods Collection

Property Name

| Count (C) | VT_I4 | The number of items in the collection. This property blocks until all the items in the collection can be accessed without blocking. |
|---|---|---|
| ReadyCount (C) | VT_I4 | The number of items in the collection that can be accessed without blocking, which may be less than the total number of items in the collection. |
| ServerCount (N) | VT_I4 | Same as the Count property except it does not block if all the items are not immediately available. |

Method Name

| Item | VT_DISPATCH | Takes one argument of type VT_BSTR and returns one of the items in the collection. If the argument begins with a $, the rest of the string must take the form of an integer. |
|---|---|---|

-continued

| | Return Type | Description |
|---|---|---|
| | | The method whose ItemId property matches the argument is returned. If the argument begins with a digit, the string must take the form of an integer and the method whose Index property matches the argument is returned. Otherwise, the method whose Name property matches the argument is returned. |
| _NewEnum | VT_UNKNOWN | Returns the IUnknown interface of an object that implements the IEnumVariant interface. |

Method Object

Property Name

| | | |
|---|---|---|
| Name (R) | VT_BSTR | The method's name. |
| ItemID (R) | VT_I4 | The method's item ID. |
| Index (R) | VT_I4 | The method's index. |
| Class (R) | VT_I4 | The method's class. |
| ClassAsString (R) | VT_BSTR | The method's class as a string. |
| Definition (R) | VT_BSTR | The method's definition. |
| Label (R) | VT_BSTR | The method's label. |
| Help (R) | VT_BSTR | The method's help. |
| Validity (R) | VT_I4 | The method's validity. |

Method Name

| | | |
|---|---|---|
| Execute | VT_EMPTY | Executes the method. |

Modem Collection

Property Name

| | | |
|---|---|---|
| Count (C) | VT_I4 | The number of items in the collection. This property blocks until all the items in the collection can be accessed without blocking. |
| ReadyCount (C) | VT_I4 | The number of items in the collection that can be accessed without blocking, which may be less than the total number of items in the collection. |
| ServerCount (N) | VT_I4 | Same as the Count property except it does not block if all the items are not immediately available. |

Method Name

| | | |
|---|---|---|
| Item | VT_DISPATCH | Takes one argument of type VT_BSTR and returns one of the items in the collection. The argument must take the form of an integer and the Device object whose StationAddress property matches the argument is returned. |
| _NewEnum | VT_UNKNOWN | Returns the IUnknown interface of an object that implements the IEnumVariant interface. |

NamedConfigs Collection

Property Name

| | | |
|---|---|---|
| Count (N) | VT_I4 | The number of items in the collection. This property blocks until all the items in the collection can be accessed without blocking. |
| ReadyCount (N) | VT_I4 | The number of items in the collection that can be accessed without blocking, which may be less than the |

-continued

| | Return Type | Description |
|---|---|---|
| | | total number of items in the collection. |
| ServerCount (N) | VT_I4 | Same as the Count property except it does not block if all the items are not immediately available. |

Method Name

| | | |
|---|---|---|
| Item | VT_DISPATCH | Takes one argument of type VT_BSTR and returns one of the items in the collection. The NamedConfig object whose Name property matches the argument is returned. |
| _NewEnum (N) | VT_UNKNOWN | Returns the IUnknown interface of an object that implements the IEnumVariant interface. |

NamedConfig Object

Property Name

| | | |
|---|---|---|
| Count (C) | VT_I4 | The number of items in the collection. This property blocks until all the items in the collection can be accessed without blocking. |
| ReadyCount (C) | VT_I4 | The number of items in the collection that can be accessed without blocking, which may be less than the total number of items in the collection. |
| ServerCount (N) | VT_I4 | Same as the Count property except it does not block if all the items are not immediately available. |
| Name (R) | VT_BSTR | The configuration's name. |
| Label (R) | VT_BSTR | The configuration's label. |
| Help (R) | VT_BSTR | The configuration's help. |
| Tag (R) | VT_BSTR | If set, the configuration only applies to a block with the specified internal tag. |
| BlockTag (R) | VT_BSTR | If set, the configuration only applies to a block with the specified external tag. |
| PhysicalTag (R) | VT_BSTR | If set, the configuration only applies to a device with the specified internal tag. |
| DeviceTag (R) | VT_BSTR | If set, the configuration only applies to a device with the specified external tag. |
| DeviceID (R) | VT_BSTR | If set, the configuration only applies to a device with the specified unique identifier. |

Net Collection

Property Name

| | | |
|---|---|---|
| Count (C) | VT_I4 | The number of items in the collection. This property blocks until all the items in the collection can be accessed without blocking. |
| ReadyCount (C) | VT_I4 | The number of items in the collection that can be accessed without blocking, which may be less than the total number of items in the collection. |
| ServerCount (N) | VT_I4 | Same as the Count property except it does not block if all the items are not immediately available. |

Method Name

| | | |
|---|---|---|
| Item | VT_DISPATCH | Takes one argument of type VT_BSTR and returns one of |

-continued

| | Return Type | Description |
|---|---|---|
| | | the items in the collection. The NetNode object whose Name property matches the argument is returned. |
| _NewEnum | VT_UNKNOWN | Returns the IUnknown interface of an object that implements the IEnumVariant interface. |

NetNode Object

Property Name

| | | |
|---|---|---|
| Count (C) | VT_I4 | The number of items in the collection. This property blocks until all the items in the collection can be accessed without blocking. |
| ReadyCount (C) | VT_I4 | The number of items in the collection that can be accessed without blocking, which may be less than the total number of items in the collection. |
| ServerCount (N) | VT_I4 | Same as the Count property except it does not block if all the items are not immediately available. |
| Name (R) | VT_BSTR | The node's TCP/IP node name. |
| Address (R) | VT_BSTR | The node's TCP/IP address in dot address format. |

Method Name

| | | |
|---|---|---|
| Item | VT_DISPATCH | Takes one argument of type VT_BSTR and returns one of the collections provided by the object. Collections: - port name (returns a Port collection, e.g., COM1 or COM2) Note: In the future, access to the RS3, PROVOX, and HAWK control systems will also be provided. |
| _NewEnum | VT_UNKNOWN | Returns the IUnknown interface of an object that implements the IEnumVariant interface. |

Parameters Collection

Property Name

| | | |
|---|---|---|
| Count (C) | VT_I4 | The number of items in the collection. This property blocks until all the items in the collection can be accessed without blocking. |
| ReadyCount (C) | VT_I4 | The number of items in the collection that can be accessed without blocking, which may be less than the total number of items in the collection. |
| ServerCount (N) | VT_I4 | Same as the Count property except it does not block if all the items are not immediately available. |

Method Name

| | | |
|---|---|---|
| Item | VT_DISPATCH | Takes one argument of type VT_BSTR and returns one of the items in the collection. If the argument begins with a $, the rest of the string must take the form of a DDID (an integer). If the DDID is an item id, the parameter whose ItemId property matches the |

-continued

| | Return Type | Description |
|---|---|---|
| | | argument is returned. If the DDID is a MemberId, the parameter whose MemberId property matches the argument is returned. If the argument begins with a digit, the string must take the form of an integer and the parameter whose ParamIndex property matches the argument is returned. Otherwise, the parameter whose Name property matches the argument is returned. |
| _NewEnum | VT_UNKNOWN | Returns the IUnknown interface of an object that implements the IEnumVariant interface. |

PhysicalTag Collection

Property Name

| | | |
|---|---|---|
| Count (N) | VT_I4 | The number of items in the collection. This property blocks until all the items in the collection can be accessed without blocking. |
| ReadyCount (N) | VT_I4 | The number of items in the collection that can be accessed without blocking, which may be less than the total number of items in the collection. |
| ServerCount (N) | VT_I4 | Same as the Count property except it does not block if all the items are not immediately available. |

Method Name

| | | |
|---|---|---|
| Item | VT_DISPATCH | Takes one argument of type VT_BSTR and returns one of the items in the collection. The Device object whose PhysicalTag property matches the argument is returned. |
| _NewEnum (N) | VT_UNKNOWN | Returns the IUnknown interface of an object that implements the IEnumVariant interface. |

Port Collection

Property Name

| | | |
|---|---|---|
| Count (C) | VT_I4 | The number of items in the collection. This property blocks until all the items in the collection can be accessed without blocking. |
| ReadyCount (C) | VT_I4 | The number of items in the collection that can be accessed without blocking, which may be less than the total number of items in the collection. |
| ServerCount (N) | VT_I4 | Same as the Count property except it does not block if all the items are not immediately available. |

Method Name

| | | |
|---|---|---|
| Item | VT_DISPATCH | Takes one argument of type. VT_BSTR and returns one of the collections provided by the object. Collections: The "HIU" collection is a HIU collection and contains all the HART Interchanges accessible via the port. |

|  | Return Type | Description |
|---|---|---|
| _NewEnum | VT_UNKNOWN | The "Modem" collection is a Modem collection and contains all the HART devices accessible via the port. Returns the IUnknown interface of an object that implements the IEnumVariant interface. |

RecordParameter Object

Property Name

|  | Return Type | Description |
|---|---|---|
| Count (C) | VT_I4 | The number of items in the collection. This property blocks until all the items in the collection can be accessed without blocking. |
| ReadyCount (C) | VT_I4 | The number of items in the collection that can be accessed without blocking, which may be less than the total number of items in the collection. |
| ServerCount (N) | VT_I4 | Same as the Count property except it does not block if all the items are not immediately available. |
| Name (R) | VT_BSTR | The parameter's (or record member's) name. |
| MemberId (R) | VT_I4 | The parameter's (or record member's) member id. |
| ItemId (R) | VT_I4 | The record's item id. |
| ParamIndex (R) | VT_I4 | The parameter's (or array element's) index. |
| ParamLabel (R) | VT_BSTR | The parameter-specific label. |
| Label (R) | VT_BSTR | The record-specific label. |
| ParamHelp (R) | VT_BSTR | The parameter-specific help. |
| Help (R) | VT_BSTR | The record-specific help. |

Method Name

| Item | VT_DISPATCH | Takes one argument of type VT_BSTR and returns one of the collections provided by the object. Collections: The "Member" collection is a Members collection and contains the record's members. The "RespCode" collection is a ResponseCodes collection and contains the record's response codes. |
|---|---|---|
| _NewEnum | VT_UNKNOWN | Returns the IUnknown interface of an object that implements the IEnumVariant interface. |

Refresh Relation Object

Property Name

| Count (C) | VT_I4 | The number of items in the collection. This property blocks until all the items in the collection can be accessed without blocking. |
|---|---|---|
| ReadyCount (C) | VT_I4 | The number of items in the collection that can be accessed without blocking, which may be less than the total number of items in the collection. |
| ServerCount (N) | VT_I4 | Same as the Count property except it does not block if all the items are not immediately available. |
| Name (R) | VT_BSTR | The refresh relation's name. |
| ItemId (R) | VT_I4 | The refresh relation's item ID. |
| Index (R) | VT_I4 | The refresh relation's index. |

|  | Return Type | Description |
|---|---|---|

Method Name

| Item | VT_DISPATCH | Takes one argument of type VT_BSTR and returns one of the collections provided by the object. Collections: The "Left" collection is a RelationItems collection and contains the parameters on the left side of the refresh relation. The "Right" collection is a RelationItems collection and contains the parameters on the right side of the refresh relation. |
|---|---|---|
| _NewEnum | VT_UNKNOWN | Returns the IUnknown interface of an object that implements the IEnumVariant interface. |

RefreshRelations Collection

Property Name

| Count (C) | VT_I4 | The number of items in the collection. This property blocks until all the items in the collection can be accessed without blocking. |
|---|---|---|
| ReadyCount (C) | VT_I4 | The number of items in the collection that can be accessed without blocking, which may be less than the total number of items in the collection. |
| ServerCount (N) | VT_I4 | Same as the Count property except it does not block if all the items are not immediately available. |

Method Name

| Item | VT_DISPATCH | Takes one argument of type VT_BSTR and returns one of the items in the collection. If the argument begins with a $, the rest of the string must take the form of an integer. The refresh relation whose ItemId property matches the argument is returned. If the argument begins with a digit, the string must take the form of an integer and the refresh relation whose Index property matches the argument is returned. Otherwise, the refresh relation whose Name property matches the argument is returned. |
|---|---|---|
| _NewEnum | VT_UNKNOWN | Returns the IUnknown interface of an object that implements the IEnumVariant interface. |

ResponseCode Object

Property Name

| Value (R) | VT_I4 | The response code's value. |
|---|---|---|
| Type (R) | VT_I4 | The response code's type. |
| Description (R) | VT_BSTR | The response code's description. |
| Help (R) | VT_BSTR | The response code's help. |

RelationItems Collection

Property Name

| Count (C) | VT_I4 | The number of items in the |

| | Return Type | Description |
|---|---|---|
| ReadyCount (C) | VT_I4 | collection. This property blocks until all the items in the collection can be accessed without blocking. |
| ReadyCount (C) | VT_I4 | The number of items in the collection that can be accessed without blocking, which may be less than the total number of items in the collection. |
| ServerCount (N) | VT_I4 | Same as the Count property except it does not block if all the items are not immediately available. |
| Method Name | | |
| Item | VT_DISPATCH | Takes one argument of type VT_BSTR and returns one of the items in the collection. The argument must take the form of an integer and the item whose Index property matches the argument is returned. |
| _NewEnum | VT_UNKNOWN | Returns the IUnknown interface of an object that implements the IEnumVariant interface. |

ResponseCodes Collection

| Property Name | Return Type | Description |
|---|---|---|
| Count (C) | VT_I4 | The number of items in the collection. This property blocks until all the items in the collection can be accessed without blocking. |
| ReadyCount (C) | VT_I4 | The number of items in the collection that can be accessed without blocking, which may be less than the total number of items in the collection. |
| ServerCount (N) | VT_I4 | Same as the Count property except it does not block if all the items are not immediately available. |
| Method Name | | |
| Item | VT_DISPATCH | Takes one argument of type VT_BSTR and returns one of the items in the collection. The argument must take the form of an integer and the response code whose Value property matches the argument is returned. |
| _NewEnum | VT_UNKNOWN | Returns the IUnknown interface of an object that implements the IEnumVariant interface. |

Root Object

| Property Name | Return Type | Description |
|---|---|---|
| Count (C) | VT_I4 | The number of items in the collection. This property blocks until all the items in the collection can be accessed without blocking. |
| ReadyCount (C) | VT_I4 | The number of items in the collection that can be accessed without blocking, which may be less than the total number of items in the collection. |
| ServerCount (N) | VT_I4 | Same as the Count property except it does not block if all the items are not immediately available. |
| Method Name | | |
| Item | VT_DISPATCH | Takes one argument of type VT_BSTR and returns one of the collections provided by the object. Collections: The "NamedConfig" collection is a NamedConfig collection and contains all the named configurations, 275 configurations, and device templates The "BlockTag" collection is a BlockTag collection and contains all the blocks in the database organized by tag. The "DeviceID" collection is a DeviceID collection and contains all the devices in the database organized by unique identifier. The "DeviceTag" collection is a DeviceTag collection and contains all the devices in the database organized by tag. The "PhysicalTag" collection is a PhysicalTag collection and contains all the devices in the database organized by HART tag. The "Net" collection is a Net collection and contains all the TCP/IP nodes. |
| _NewEnum | VT_UNKNOWN | Returns the IUnknown interface of an object that implements the IEnumVariant interface. |
| Item | VT_DISPATCH | Takes one argument of type VT_BSTR and returns one of the collections provided by the object. Collections: The "Param" collection is a Parameters collection and contains the block's parameters. The "Database" collection is a DatabaseParameters collection and contains the database parameters for the block. The "Method" collection is a Methods collection and contains the block's methods. The "Menu" collection is a Menus collection and contains the block's menus. The "EditDisplay" collection is an EditDisplays collection and contains the block's edit displays. The "ItemArray" collection is an ItemArrays collection and contains the block's item arrays. The "Collection" collection is a Collections collection and contains the block's collections. The "Refresh" collection is a RefreshRelations collection and contains the block's refresh relations. |

-continued

| | Return Type | Description |
|---|---|---|
| | | The "Unit" collection is a UnitRelations collection and contains the block's unit relations. |
| | | The "WAO" collection is a WriteAsOneRelations collection and contains the block's write as one relations. |
| _NewEnum | VT_UNKNOWN | Returns the IUnknown interface of an object that implements the IEnumVariant interface. |

Tag Collection

| Property Name | | |
|---|---|---|
| Count (C) | VT_I4 | The number of items in the collection. This property blocks until all the items in the collection can be accessed without blocking. |
| ReadyCount (C) | VT_I4 | The number of items in the accessed without blocking, which may be less than the total number of items in the collection. |
| ServerCount (N) | VT_I4 | Same as the Count property except it does not block if all the items are not immediately available. |

| Method Name | | |
|---|---|---|
| Item | VT_DISPATCH | Takes one argument of type VT_BSTR and returns one of the items in the collection. The Block object whose Tag property matches the argument is returned. |
| _NewEnum | VT_UNKNOWN | Returns the IUnknown interface of an object that implements the IEnumVariant interface. |

UnitRelation Object

| Property Name | | |
|---|---|---|
| Count (C) | VT_I4 | The number of items in the collection. This property blocks until all the items in the collection can be accessed without blocking. |
| ReadyCount (C) | VT_I4 | The number of items in the collection that can be accessed without blocking, which may be less than the total number of items in the collection. |
| ServerCount (N) | VT_I4 | Same as the Count property except it does not block if all the items are not immediately available. |
| Name (R) | VT_BSTR | The unit relation's name. |
| ItemId (R) | VT_I4 | The unit relation's item ID. |
| Index (R) | VT_I4 | The unit relation's index. |

| Method Name | | |
|---|---|---|
| Item | VT_DISPATCH | Takes one argument of type VT_BSTR and returns one of the collections provided by the object. Collections: The "Units" collection is a RelationItems collection and contains the parameter on the left side of the unit relation. The "Member" collection is a RelationItems collection and contains the parameters on the right side of the unit relation. |
| _NewEnum | VT_UNKNOWN | Returns the IUnknown interface of an object that implements the IEnumVariant interface. |

UnitRelation Object

| Property Name | | |
|---|---|---|
| Count (C) | VT_I4 | The number of items in the collection. This property blocks until all the items in the collection can be accessed without blocking. |
| ReadyCount (C) | VT_I4 | The number of items in the collection that can be accessed without blocking, which may be less than the total number of items in the collection. |
| ServerCount (N) | VT_I4 | Same as the Count property except it does not block if all the items are not immediately available. |
| Name (R) | VT_BSTR | The unit relation's name. |
| ItemId (R) | VT_I4 | The unit relation's item ID. |
| Index (R) | VT_I4 | The unit relation's index. |

| Method Name | | |
|---|---|---|
| Item | VT_DISPATCH | Takes one argument of type VT_BSTR and returns one of the collections provided by the object. Collections: The "Units" collection is a RelationItems collection and contains the parameter on the left side of the unit relation. The "Member" collection is a RelationItems collection and contains the parameters on the right side of the unit relation. |
| _NewEnum | VT_UNKNOWN | Returns the IUnknown interface of an object that implements the IEnumVariant interface. |

UnitRelations Collection

| Property Name | | |
|---|---|---|
| Count (C) | VT_I4 | The number of items in the collection. This property blocks until all the items in the collection can be accessed without blocking. |
| ReadyCount (C) | VT_I4 | The number of items in the collection that can be accessed without blocking, which may be less than the total number of items in the collection. |
| ServerCount (N) | VT_I4 | Same as the Count property except it does not block if all the items are not immediately available. |

| Method Name | | |
|---|---|---|
| Item | VT_DISPATCH | Takes one argument of type VT_BSTR and returns one of the items in the collection. If the argument begins with a $, the rest of the string must take the form of an integer. The unit relation whose ItemId |

-continued

| | Return Type | Description |
|---|---|---|
| | | property matches the argument is returned. If the argument begins with a digit, the string must take the form of an integer and the unit relation whose Index property matches the argument is returned. Otherwise, the unit relation whose Name property matches the argument is returned. |
| _NewEnum | VT_UNKNOWN | Returns the IUnknown interface of an object that implements the IEnumVariant interface. |

VariableParameter Object

| Property Name | Return Type | Description |
|---|---|---|
| Count (C) | VT_I4 | The number of items in the collection. This property blocks until all the items in the collection can be accessed without blocking. |
| ReadyCount (C) | VT_I4 | The number of items in the collection that can be accessed without blocking, which may be less than the total number of items in the collection. |
| ServerCount (N) | VT_I4 | Same as the Count property except it does not block if all the items are not immediately available. |
| Name (R) | VT_BSTR | The parameter's (or record member's) name. |
| MemberId (R) | VT_I4 | The parameter's (or record member's) member id. |
| ItemId (R) | VT_I4 | The variable's item id. |
| ParamIndex (R) | VT_I4 | The parameter's (or array element's) index. |
| Value (†) (R) | VT_VARIANT | The parameter's value. |
| ValueAsString (*) (R) | VT_BSTR | The parameter's value as a string. |
| Type (R) | VT_I4 | The parameter's type. |
| TypeAsString (R) | VT_BSTR | The parameter's type as a string. |
| Size (R) | VT_I4 | The parameter's size (in bytes). |
| ParamLabel (R) | VT_BSTR | The parameter-specific label. |
| Label (R) | VT_BSTR | The variable-specific label. |
| ParamHelp (R) | VT_BSTR | The parameter-specific help. |
| Help (R) | VT_BSTR | The variable-specific help. |
| Class (R) | VT_I4 | The parameter's class. |
| ClassAsString (R) | VT_BSTR | The parameter's class as a string. |
| Handling (R) | VT_I4 | Returns the parameter's handling. |
| HandlingAsString (R) | VT_BSTR | The parameter's handling as a string. |
| ReadTimeout (R) | VT_I4 | The parameter's read time-out. |
| WriteTimeout (R) | VT_I4 | The parameter's write time-out. |
| DisplayFormat (R) | VT_BSTR | The parameter's display format. |
| EditFormat (R) | VT_BSTR | The parameter's edit format. |
| MinCount (R) | VT_I4 | The number of min values. |
| MaxCount (R) | VT_I4 | The number of max values. |
| MinValueN (R) | VT_VARIANT | One of the parameter's min values. N indicates which min value is to be returned and must take the form of an integer. |
| MaxValueN (R) | VT_VARIANT | One of the parameter's max values. N indicates which max value is to be returned and must take the form of an integer. |
| EnumDescription (R) | VT_BSTR | The Description property of the Enumeration Value corresponding to the current value of the parameter. This property is only meaningful if the parameter's type is ENUMERATED. |
| EnumHelp (R) | VT_BSTR | The Help property of the Enumeration Value corresponding to the current value of the parameter. This property is only meaningful if the parameter's type is ENUMERATED. |
| Units (R) | VT_BSTR | The parameter's units. |
| Validity (R) | VT_I4 | The parameter's validity. |
| IndexItemArray (R) | VT_I4 | The Item ID of the Item Array which this variable indexes, if this variable is of type Index. |

| Method Name | Return Type | Description |
|---|---|---|
| Item | VT_DISPATCH | Takes one argument of type VT_BSTR and returns one of the collections provided by the object. Collections: The "Enum" collection is an EnumerationValues collection and contains the parameter's enumeration values. The "RespCode" collection is a ResponseCodes collection and contains the parameter's response codes. The "PreEdit" collection is a Methods collection and contains the parameter's pre-edit methods. The "PostEdit" collection is a Methods collection and contains the parameter's post-edit methods. The "IndexedItemArray" collection is an ItemArray object which corresponds to the ItemArray parameter, if this variable is of type Index. |
| _NewEnum | VT_UNKNOWN | Returns the IUnknown interface of an object that implements the IEnumVariant interface. |
| ExecutePreEdit | VT_EMPTY | Executes the parameter's pre-edit methods. |
| ExecutePostEdit | VT_EMPTY | Executes the parameter's post-edit methods. |

WriteAsOneRelation Object

| Property Name | Return Type | Description |
|---|---|---|
| Count (C) | VT_I4 | The number of items in the collection. This property blocks until all the items in the collection can be accessed without blocking. |
| ReadyCount (C) | VT_I4 | The number of items in the collection that can be accessed without blocking, which may be less than the total number of items in the collection. |
| ServerCount (N) | VT_I4 | Same as the Count property except it does not block if all the items are not immediately available. |
| Name (R) | VT_BSTR | The write as one relation's name. |

-continued

| | Return Type | Description |
|---|---|---|
| ItemId (R) | VT_I4 | The write as one relation's item ID. |
| Index (R) | VT_I4 | The write as one relation's index. |
| Method Name | | |
| Item | VT_DISPATCH | Takes one argument of type VT_BSTR and returns one of the items in the collection. Colections: The "Member" collection is a RelationItems collection and contains the parameters of the write as one relation. |
| _NewEnum | VT_UNKNOWN | Returns the IUnknown interface of an object that implements the IEnumVariant interface. |
| WriteAsOneRelations Collection | | |
| Property Name | | |
| Count (C) | VT_I4 | The number of items in the collection. This property blocks until all the items in the collection can be accessed without blocking. |
| ReadyCount (C) | VT_I4 | The number of items in the collection that can be accessed without blocking, which may be less than the total number of items in the collection. |
| ServerCount (N) | VT_I4 | Same as the Count property except it does not block if all the items are not immediately available. |
| Method Name | | |
| Item | VT_DISPATCH | Takes one argument of type VT_BSTR and returns one of the items in the collection. If the argument begins with a $, the rest of aha must take the form of an integer. The write as one relation whose ItemId property matches the argument is returned. If the argument begins with a digit, the string must take the form of an integer and the write as one relation whose Index property matches the argument is returned. Otherwise, the write as one relation whose Name property matches the argument is returned. |
| _NewEnum | VT_UNKNOWN | Returns the IUnknown interface of an object that implements the IEnumVariant interface. |

OLE OBJECT DDL EQUIVALENTS

The following table explains the correspondence between the OLE hierarchy described above and the related constructs in the DDL. As used in the table, the term "Host device" means an FMS system or an FMS application. Further, the actual keywords employed by a particular DDL may vary, and the proper keywords for a particular DDL will be provided in the specification provided for that DDL. The following table is based on the Fieldbus Device Description Language, which is similar to the HART Device Description Language.

| OLE OBJECT (Lower Hierarchy) | DDL EQUIVALENT |
|---|---|
| ArrayParameter object | The DDL equivalent is an array, which is a logical group of values. Each value, or element, is of the data type of a DDL variable. An element may be referenced from elsewhere in the device description via the array name and the element index. DDL arrays describe communication array objects. Therefore, from a communication perspective, the individual elements of the array are not treated as individual variables, but simply as individual values. |
| Block object | The DDL equivalent is a block, which defines the external characteristics of a DDL block. |
| Collection object This OLE object represents a particular object in the Collections collection object. (see Collections) | The DDL equivalent is a collection, which is a logical group of members. Each member in the group is assigned a name. The members may be referenced in the device description by using a collection name and a member name. |
| CollectionItems collection object ("Member") | The DDL equivalent is a collection, which is a logical group of members. Each member in the group is assigned a name. The members may be referenced in the device description by using a collection name and a member name. |
| Collections collection object ("Collection") | The closest DDL equivalent is a collection, which is a logical group of items (in this case collections). Each collection in the group) is assigned a name. The collections may be referenced from in the device description by using the collection name and the name of the collection of collections. |
| DatabaseParameters collection object ("Database") | There is no DDL equivalent to this OLE collection object, which exists only in the FMS database. This object relates to a collection of parameters stored in a database. |
| DatabaseParameter object | There is no DDL equivalent to this OLE object, which exists only in the FMS database. This object relates to a parameter stored in a database. |
| EditDisplay object | The DDL equivalent is an edit display, which defines how data will be presented to a user by a host. It is used to group items together during editing. |
| EditDisplayItems collection object ("Display" and "Edit") | The DDL equivalent is a collection of edit items, which are a set of block parameters and elements of block parameters to be edited by the user. The display items are provided to |

-continued

OLE OBJECT DDL EQUIVALENTS
The following table explains the correspondence between the OLE hierarchy described above and the related constructs in the DDL. As used in the table, the term "Host device" means an FMS system or an FMS application. Further, the actual keywords employed by a particular DDL may vary, and the proper keywords for a particular DDL will be provided in the specification provided for that DDL. The following table is based on the Fieldbus Device Description Language, which is similar to the HART Device Description Language.

| OLE OBJECT (Lower Hierarchy) | DDL EQUIVALENT |
| --- | --- |
| EditDisplays collection object ("EditDisplay") | allow the user to decide what the values of the edit items should be. The DDL equivalent is a collection of edit displays, which define how data will be presented to a user by a host. They are used to group items together during editing. |
| Elements collection object ("Element") | The DDL equivalent is a collection or group of elements, which specify one item (such as a variable or menu) in the group, and is defined by a group of four parameters (index, item, description and help). |
| EnumerationValue object | The DDL equivaient is a variable of the enumeration type. Such variables include enumerated variables, which are unsigned integers that have a text string associated with some or all values (useful for defining tables, for example), and bit-enumerated variables, which are unsigned integers that have a text string associated with some or all bits (useful in defining status octets). |
| EnumerationValues collection Object ("Enum") | The DDL equivalent is a collection of variables of the enumeration type. |
| ItemArray collection object ("IndexedItemArray") | The DDL equivalent is a collection of item arrays. |
| ItemArray object | The DDL equivalent is an item array, which is a logical group of items, such as variables or menus. Each item in the group is assigned a number, called an index. The items can be referenced from elsewhere in the device description via the item array name and the item number. Item arrays are merely groups of DDL items and are unrelated to communication arrays (item type "ARRAY"). Communication arrays are arrays of values. |
| ItemArrayItems collection object ("Element") | The DDL equivalent is an element, an attribute of an item array which identifies elements of the item array. Each item array element specifies one item (such as a variable or menu) in the group, and is defined by a group of four parameters (index, item, description and help). |
| ItemArrays collection object ("ItemArray") | The DDL equivalent is a collection of item arrays. |
| Members collection object ("Member") | The DDL equivalent is a collection of members, which are variables, records, and/or arrays. |
| Menu object | The DDL equivalent is a menu, which organizes parameters, methods, and other items |

-continued

OLE OBJECT DDL EQUIVALENTS
The following table explains the correspondence between the OLE hierarchy described above and the related constructs in the DDL. As used in the table, the term "Host device" means an FMS system or an FMS application. Further, the actual keywords employed by a particular DDL may vary, and the proper keywords for a particular DDL will be provided in the specification provided for that DDL. The following table is based on the Fieldbus Device Description Language, which is similar to the HART Device Description Language.

| OLE OBJECT (Lower Hierarchy) | DDL EQUIVALENT |
| --- | --- |
| | specified in the DDL into a hierarchical structure. A host application may use the menu items to display information to the user in an organized and consistent fashion. |
| MenuItems collection object ("MenuItem") | The DDL equivalent is a collection of menus items. The items of a menu specify the items associated with the menu plus an optional qualifier. |
| Menus collection object ("Menu") | The DDL equivalent is a collection of menus. |
| Method object | The DDL equivalent is a method, which describes the execution of complex interactions that must occur between host devices and a field device. |
| MethodsCollection object ("PreEdit", "PostEdit", and "Method") | The DDL equivalent is a collection of methods. |
| NamedConfig object | There is no DDL equivalent to a NamedConfig object because these objects correspond to blocks that are stored in the FMS database rather than in field devices. |
| Parameters collection object ("param") | The DDL equivalent is a collection of parameters, which may be records, arrays, or variables. |
| RecordParameter object | The DDL equivalent is a record, which is a logical group of variables. Each variable in the record is assigned a DDL variable name. Each variable may have a different data type. The variables may be referenced from elsewhere in the device description via the record name and the member name. DDL records describe communication record objects. Therefore, from a communication perspective, the individual members of the record are not treated as individual variables, but simply as a group of variable values. |
| RefreshRelation object | The DDL equivalent is a refresh relation, a particular type of relation which allows the host device to make decisions regarding parameter value consistency when a parameter value changes. It specifies a set of block parameters which may need to be refreshed (re-read from the device) whenever a block parameter from another set is modified. A block parameter can have a refresh relationship with itself, implying that the block parameter must be read after writing. Occasionally writing a block parameter to a field device |

OLE OBJECT DDL EQUIVALENTS

The following table explains the correspondence between the OLE hierarchy described above and the related constructs in the DDL. As used in the table, the term "Host device" means an FMS system or an FMS application. Further, the actual keywords employed by a particular DDL may vary, and the proper keywords for a particular DDL will be provided in the specification provided for that DDL. The following table is based on the Fieldbus Device Description Language, which is similar to the HART Device Description Language.

| OLE OBJECT (Lower Hierarchy) | DDL EQUIVALENT |
|---|---|
| | causes the field device to update the values of other block parameters. If the additional updated block parameters are dynamic, there is no conflict because the host device should re-read the parameter values from a failed device each time the values are needed. However, host devices may cache the values of static block parameters. Therefore, for host devices to maintain the correct values of all static block parameters, they need to know when the field device is changing its values. |
| RefreshRelations collection object ("Refresh") | The DDL equivalent is a collection of refresh relations. |
| RelationItems collection object ("Units", "Members", "Left", and "Right") | The DDL equivalent is a collection of parameters, which may be variables, records, and/or arrays |
| ResponseCode object | The DDL equivalent is a response codes, which specifies the values a field device may return as application-specific errors. Each variable, record, array, variable list, program, or domain can have its own set of response codes, because each one is eligible for FMS services. |
| ResponseCodes collection object ("RespCode") | The DDL equivalent is a collection of response codes. |
| UnitRelation object | The DDL equivalent is a unit relation, which specifies a units code parameter and the block parameters with those units. When a units code parameter is modified, the block parameters having that units code should be refreshed. In this respect, a unit relation is exactly like a refresh relation. In addition, when a block parameter with a units code is displayed, the value of its units code will also be displayed |
| UnitRelations collection object ("Unit") | The DDL equivalent is a collection of unit relations. |
| VariableParameter object | The DDL equivalent is a variable, which describes data contained in a device. |
| WriteAsOne Relation object | The DDL equivalent is a write-as-one relation, which informs the host device that a group of block parameters needs to be modified as a group. This relation does not necessarily mean the block parameters are written to the field device at the same time. Not all block parameters sent to the field device at the same time are necessarily part of a write-as- |

OLE OBJECT DDL EQUIVALENTS

The following table explains the correspondence between the OLE hierarchy described above and the related constructs in the DDL. As used in the table, the term "Host device" means an FMS system or an FMS application. Further, the actual keywords employed by a particular DDL may vary, and the proper keywords for a particular DDL will be provided in the specification provided for that DDL. The following table is based on the Fieldbus Device Description Language, which is similar to the HART Device Description Language.

| OLE OBJECT (Lower Hierarchy) | DDL EQUIVALENT |
|---|---|
| | one relation. If a field device requires specific block parameters to be examined and modified at the same time for proper operation, a write-as-one relation is required. |
| WriteAsOneRelations collection object ("WAO") | The DDL equivalent is a collection of write-as-one relations. |

What is claimed is:

1. A computer-based database management system for configuring a plurality of field devices each having a configuration including at least one adjustable device configuration parameter, the system comprising:

setting means for setting the adjustable device configuration parameter of one of the field devices to a first value at a first time and for setting the adjustable device configuration parameter of the one of the field devices to a second value at a second time; and a centralized database having a transaction memory accessible by multiple ones of the plurality of the field devices, said transaction memory responsive to the setting means for storing a plurality of transactions related to the multiple ones of the plurality of field devices in the order that the transactions were made, each transaction including a particular value to which a particular adjustable device configuration parameter is set and a corresponding time indication of a time when the particular adjustable device configuration parameter is set to the particular value, wherein the particular value and the corresponding time indication are stored in the transaction memory in response to a change in the particular adjustable device configuration parameter.

2. The system of claim 1, wherein the corresponding time indication of each transaction includes an indication of the date and a further indication of the time on that date when the particular device configuration parameter is set to the particular value.

3. The system of claim 1, wherein one transaction stored in the transaction memory comprises a value for each of a plurality of adjustable device configuration parameters of a particular field device as of the time indicated by the corresponding time indication of the transaction.

4. The system of claim 1, wherein one transaction stored in the transaction memory comprises a value for each adjustable device configuration parameter of a particular field device as of the time indicated by the corresponding time indication of the transaction.

5. A computer-based database management system for configuring a field device having a configuration including at least one adjustable device configuration parameter, the system comprising:

setting means for setting the adjustable device configuration parameter to a first value at a first time and for setting the adjustable device configuration parameter to a second value at a second time; and a transaction memory responsive to the setting means for storing a plurality of transactions, each including a particular value to which a particular adjustable device configuration parameter is set and a corresponding time indication of a time when the particular adjustable device configuration parameter is set to the particular value, wherein the particular value and the corresponding time indication are stored in the transaction memory in response to a change in the particular adjustable device configuration parameter and wherein each transaction stored in the transaction memory includes an indication of the type of the transaction, wherein the type is selected from the group consisting of historical type, current type, and future type.

6. A computer-based database management system for configuring a field device having a configuration including at least one adjustable device configuration parameter, the system comprising:

setting means for setting the adjustable device configuration parameter to a first value at a first time and for setting the adjustable device configuration parameter to a second value at a second time;

a transaction memory responsive to the setting means for storing a plurality of transactions each including a particular value to which a particular adjustable device configuration parameter is set and a corresponding time indication of a time when the particular adjustable device configuration parameter is set to the particular value wherein the particular value and the corresponding time indication are stored in the transaction memory in response to a change in the particular adjustable device configuration parameter; and constructing means for constructing a current state of a particular field device by scanning the transactions in reverse-chronological order to find the last value applied to each adjustable device configuration parameter of the particular field device and then displaying the last value applied to each adjustable device configuration parameter to a user as a device configuration display separate and apart from a display of the contents of the transaction memory.

7. The system of claim 6, wherein one transaction in the transaction memory includes a value for each adjustable device configuration parameter of a particular field device.

8. A computer-based database management system for configuring a field device having a configuration including at least one adjustable device configuration parameter, the system comprising:

setting means for setting the adjustable device configuration parameter to a first value at a first time and for setting the adjustable device configuration parameter to a second value at a second time; and a transaction memory responsive to the setting means for storing a plurality of transactions each including a particular value to which a particular adjustable device configuration parameter is set and a corresponding time indication of a time when the particular adjustable device configuration parameter is set to the particular value, wherein the particular value and the corresponding time indication are stored in the transaction memory in response to a change in the particular adjustable device configuration parameter;

wherein one transaction in the transaction memory includes a value for a particular adjustable device configuration parameter of a particular field device and wherein the time indication of the transaction indicates only that the value is to be applied to the particular adjustable device configuration parameter at an unspecified time in the future.

9. A computer-based database management system for configuring a field device having a configuration including at least one adjustable device configuration parameter, the system comprising:

setting means for setting the adjustable device configuration parameter to a first value at a first time and for setting the adjustable device configuration parameter to a second value at a second time;

a transaction memory responsive to the setting means for storing a plurality of transactions, each including a particular value to which a particular adjustable device configuration parameter is set and a corresponding time indication of a time when the particular adjustable device configuration parameter is set to the particular value, wherein the particular value and the corresponding time indication are stored in the transaction memory in response to a change in the particular adjustable device configuration parameter; and means for reconciling the transactions stored in the transaction memory with transactions stored in a secondary transaction memory.

10. A computer-based database management system for configuring a field device having a configuration including at least one adjustable device configuration parameter, the system comprising:

setting means for setting the adjustable device configuration parameter to a first value at a first time and for setting the adjustable device configuration parameter to a second value at a second time;

a transaction memory responsive to the setting means for storing a plurality of transactions, each including a particular value to which a particular adjustable device configuration parameter is set and a corresponding time indication of a time when the particular adjustable device configuration parameter is set to the particular value, wherein the particular value and the corresponding time indication are stored in the transaction memory in response to a change in the particular adjustable device configuration parameter; and means for reconciling the transactions stored in the transaction memory with transactions stored in a transaction memory of a functionally identical computer-based database management system.

11. A computer-based database management system for managing a configuration database associated with at least one of a plurality of field devices, said one field device having a changeable configuration which includes at least one adjustable device configuration parameter, the system comprising:

first selecting means for selecting a particular field device;

second selecting means for selecting a particular device configuration parameter of the particular field device;

assigning means for assigning a particular value for the particular device configuration parameter at a particular time;

communicating means coupled to the assigning means for communicating the particular value for the particular device configuration parameter to the particular field device;

recording means for creating a transaction record, wherein the transaction record includes an identifier uniquely identifying the particular field device and wherein the transaction record further specifies the particular device configuration parameter of the particular field device, the particular value for the particular device configuration parameter, and a time indication of a particular time at which the particular value is applied to the particular device configuration parameter; and storing means for storing the transaction record in a configuration database in response to a change in the particular value of the particular device configuration parameter;

wherein the assigning means reads an actual value of the particular device configuration parameter from the particular field device before the communicating means communicates the particular value for the particular device configuration parameter to the particular field device.

12. The system of claim 11, wherein the time indication of each transaction record includes an indication of the date and a further indication of the time on that date when the particular value is applied to the particular device configuration parameter.

13. The system of claim 11, wherein one transaction record stored in the configuration database comprises a value for each of a plurality of adjustable device configuration parameters of a particular field device as of the time indicated by the time indication of the transaction record.

14. The system of claim 11, wherein one transaction record stored in the configuration database comprises a value for each adjustable device configuration parameter of a particular field device as of the time indicated by the time indication of the transaction record.

15. The system of claim 11, wherein the assigning means determines an expected value of the particular device configuration parameter from the configuration database and compares the expected value of the particular device configuration parameter to the actual value of the particular device configuration parameter.

16. The system of claim 15, wherein the recording means creates a further transaction record for the actual value of the particular device configuration parameter and the storing means stores the further transaction record in the configuration database if the actual value of the particular device configuration parameter is not the same as the expected value of the particular device configuration parameter.

17. A computer-based database management system for managing a configuration database associated with at least one of a plurality of field devices said one field device having a changeable configuration which includes at least one adjustable device configuration parameter, the system comprising:

first selecting means for selecting a particular field device;

second selecting means for selecting a particular device configuration parameter of the particular field device;

assigning means for assigning a particular value for the particular device configuration parameter at a particular time;

communicating means coupled to the assigning means for communicating the particular value for the particular device configuration parameter to the particular field device;

recording means for creating a transaction record, wherein the transaction record includes an identifier uniquely identifying the particular field device and wherein the transaction record further specifies the particular device configuration parameter of the particular field device, the particular value for the particular device configuration parameter, and a time indication of a particular time at which the particular value is applied to the particular device configuration parameter; and storing means for storing the transaction record in a configuration database in response to a change in the particular value of the particular device configuration parameter;

wherein one transaction record stored in the configuration database represents a transaction of a type which is selected from the group consisting of historical type, current type, and future type, and wherein the transaction record includes an indication of the type of the transaction.

18. A computer-based database management system for managing a configuration database associated with at least one of a plurality of field devices, said one field device having a changeable configuration which includes at least one adjustable device configuration parameter the system comprising:

first selecting means for selecting a particular field device;

second selecting means for selecting a particular device configuration parameter of the particular field device;

assigning means for assigning a particular value for the particular device configuration parameter at a particular time;

communicating means coupled to the assigning means for communicating the particular value for the particular device configuration parameter to the particular field device;

recording means for creating a transaction record, wherein the transaction record includes an identifier uniquely identifying the particular field device and wherein the transaction record further specifies the particular device configuration parameter of the particular field device the particular value for the particular device configuration parameter, and a time indication of a particular time at which the particular value is applied to the particular device configuration parameter;

storing means for storing the transaction record in a configuration database in response to a change in the particular value of the particular device configuration parameter; and constructing means for constructing a current state of a particular field device by scanning the transaction records in the configuration database in reverse-chronological order to find the last value assigned to each adjustable device configuration parameter of the particular field device and then displaying the last value applied to each adjustable device configuration parameter to a user as a device configuration display separate and apart from a display of the contents of the configuration database.

19. The system of claim 18, wherein one transaction record in the configuration database includes a value for each adjustable device configuration parameter of a particular field device.

20. A computer-based database management system for managing a configuration database associated with at least one of a plurality of field devices, said one field device having a changeable configuration which includes at least one adjustable device configuration parameter, the system comprising:

first selecting means for selecting a particular field device;

second selecting means for selecting a particular device configuration parameter of the particular field device;

assigning means for assigning a particular value for the particular device configuration parameter at a particular time;

communicating means coupled to the assigning means for communicating the particular value for the particular device configuration parameter to the particular field device;

recording means for creating a transaction record wherein the transaction record includes an identifier uniquely identifying the particular field device and wherein the transaction record further specifies the particular device configuration parameter of the particular field device, the particular value for the particular device configuration parameter, and a time indication of a particular time at which the particular value is applied to the particular device configuration parameter; and storing means for storing the transaction record in a configuration database in response to a change in the particular value of the particular device configuration parameter;

wherein a transaction record in the configuration database includes a value for a particular device configuration adjustable parameter of a particular field device and wherein the time indication of that transaction record indicates only that the value is to be applied to the particular adjustable device configuration parameter at an unspecified time in the future.

21. A computer-based database management system for managing a configuration database associated with at least one of a plurality of field devices said one field device having a changeable configuration which includes at least one adjustable device configuration parameter, the system comprising:

first selecting means for selecting a particular field device;

second selecting means for selecting a particular device configuration parameter of the particular field device;

assigning means for assigning a particular value for the particular device configuration parameter at a particular time;

communicating means coupled to the assigning means for communicating the particular value for the particular device configuration parameter to the particular field device;

recording means for creating a transaction record, wherein the transaction record includes an identifier uniquely identifying the particular field device and wherein the transaction record further specifies the particular device configuration parameter of the particular field device, the particular value for the particular device configuration parameter, and a time indication of a particular time at which the particular value is applied to the particular device configuration parameter;

storing means for storing the transaction record in a configuration database in response to a change in the particular value of the particular device configuration parameter; and means for reconciling the transaction records stored in the configuration database with transaction records stored in a secondary configuration database.

22. A computer-based database management system for managing a configuration database associated with at least one of a plurality of field devices, said one field device having a changeable configuration which includes at least one adjustable device configuration parameter, the system comprising:

first selecting means for selecting a particular field device;

second selecting means for selecting a particular device configuration parameter of the particular field device;

assigning means for assigning a particular value for the particular device configuration parameter at a particular time;

communicating means coupled to the assigning means for communicating the particular value for the particular device configuration parameter to the particular field device;

recording means for creating a transaction record, wherein the transaction record includes an identifier uniquely identifying the particular field device and wherein the transaction record further specifies the particular device configuration parameter of the particular field device, the particular value for the particular device configuration parameter, and a time indication of a particular time at which the particular value is applied to the particular device configuration parameter;

storing means for storing the transaction record in a configuration database in response to a change in the particular value of the particular device configuration parameter; and means for reconciling the transaction records stored in the configuration database with transaction records stored in a configuration database of a functionally identical computer-based database management system.

* * * * *